US012433761B1

(12) United States Patent
Chiou et al.

(10) Patent No.: US 12,433,761 B1
(45) Date of Patent: Oct. 7, 2025

(54) SYSTEMS AND METHODS FOR DETERMINING THE SHAPE OF SPINAL RODS AND SPINAL INTERBODY DEVICES FOR USE WITH AUGMENTED REALITY DISPLAYS, NAVIGATION SYSTEMS AND ROBOTS IN MINIMALLY INVASIVE SPINE PROCEDURES

(71) Applicant: OnPoint Medical, Inc., Bedford, NH (US)

(72) Inventors: Chuang-Jang Chiou, Bedford, MA (US); Daniel Steines, Lexington, MA (US); Philipp K. Lang, Franconia, NH (US)

(73) Assignee: OnPoint Medical, Inc., Franconia, NH (US)

( * ) Notice: Subject to any disclaimer, the term of this patent is extended or adjusted under 35 U.S.C. 154(b) by 373 days.

(21) Appl. No.: 18/099,736

(22) Filed: Jan. 20, 2023

Related U.S. Application Data

(60) Provisional application No. 63/301,169, filed on Jan. 20, 2022.

(51) Int. Cl.
  *A61F 2/44* (2006.01)
  *A61B 17/70* (2006.01)
  *A61F 2/46* (2006.01)

(52) U.S. Cl.
  CPC ........ *A61F 2/4455* (2013.01); *A61B 17/7082* (2013.01); *A61F 2/4611* (2013.01); *A61F 2002/4627* (2013.01)

(58) Field of Classification Search
  CPC .. A61F 2/4455; A61F 2/4611; A61B 17/7083; A61B 17/7085
  See application file for complete search history.

(56) References Cited

U.S. PATENT DOCUMENTS

| 5,526,812 A | 6/1996 | Dumoulin et al. |
| 5,676,673 A | 10/1997 | Ferre et al. |
| 5,800,352 A | 9/1998 | Ferre et al. |
| 5,803,089 A | 9/1998 | Ferre et al. |
| 5,829,444 A | 11/1998 | Ferre et al. |
| 5,873,822 A | 2/1999 | Ferre et al. |

(Continued)

FOREIGN PATENT DOCUMENTS

| CN | 118102988 A | * | 5/2024 | ............ A61B 34/10 |
| EP | 1028659 | | 2/2004 | |

(Continued)

OTHER PUBLICATIONS

3D Optical Microscopy for Orthopedic Implants; Bruker Nano Surfaces, Jun. 17, 2016.

(Continued)

*Primary Examiner* — Ellen C Hammond
(74) *Attorney, Agent, or Firm* — Greenberg Traurig, LLP; Natalie Salem; Barry Schindler

(57) ABSTRACT

Systems, techniques, devices and methods are described for determining an axis, a curvature, and/or a 3D shape of spinal rods for optional display on a computer monitor and/or an augmented reality display. Systems, techniques, devices and methods are described for determining a leading edge, a curvature, and/or a 3D shape of interbody devices for optional display on a computer monitor and/or an augmented reality display.

20 Claims, 10 Drawing Sheets

(56) References Cited

U.S. PATENT DOCUMENTS

| | | |
|---|---|---|
| D415,146 S | 10/1999 | Hori |
| 5,967,980 A | 10/1999 | Ferre et al. |
| 6,175,756 B1 | 1/2001 | Ferre et al. |
| 6,341,231 B1 | 1/2002 | Ferre et al. |
| 6,396,497 B1 | 5/2002 | Reichlen |
| 6,445,943 B1 | 9/2002 | Ferre et al. |
| 6,599,247 B1 | 7/2003 | Stetten |
| 6,714,810 B2 | 3/2004 | Grzeszczuk et al. |
| 7,130,676 B2 | 10/2006 | Barrick |
| 7,774,044 B2 | 8/2010 | Sauer et al. |
| 7,812,815 B2 | 10/2010 | Banerjee et al. |
| 8,320,612 B2 | 11/2012 | Knobel et al. |
| 8,730,266 B2 | 5/2014 | Brown et al. |
| 8,989,843 B2 | 3/2015 | Chien |
| 9,068,820 B2 | 6/2015 | Kosmecki et al. |
| 9,068,824 B2 | 6/2015 | Findeisen et al. |
| 9,123,155 B2 | 9/2015 | Cunningham et al. |
| 9,183,560 B2 | 11/2015 | Abelow |
| 9,215,293 B2 | 12/2015 | Miller |
| 9,299,138 B2 | 3/2016 | Zellner et al. |
| 9,310,559 B2 | 4/2016 | Macnamara |
| 9,311,284 B2 | 4/2016 | Warila et al. |
| 9,389,424 B1 | 7/2016 | Schowengerdt |
| 9,417,452 B2 | 8/2016 | Schowengerdt et al. |
| 9,429,752 B2 | 8/2016 | Schowengerdt et al. |
| 9,503,681 B1 | 11/2016 | Popescu et al. |
| 9,547,940 B1 | 1/2017 | Sun et al. |
| 9,582,717 B2 | 2/2017 | Lee et al. |
| 9,792,721 B2 | 10/2017 | Kosmecki et al. |
| 9,861,446 B2 | 1/2018 | Lang |
| 9,901,463 B2 | 2/2018 | Mahfouz |
| 9,913,692 B2 | 3/2018 | Arata et al. |
| 9,918,658 B2 | 3/2018 | McCaulley et al. |
| 9,980,780 B2 | 5/2018 | Lang |
| 10,078,221 B2 | 9/2018 | Pilkinton et al. |
| 10,136,952 B2 | 11/2018 | Couture et al. |
| 10,154,239 B2 | 12/2018 | Casas |
| 10,159,530 B2 | 12/2018 | Lang |
| 10,278,777 B1 | 5/2019 | Lang |
| 10,292,768 B2 | 5/2019 | Lang |
| 10,368,947 B2 | 8/2019 | Lang |
| 10,405,927 B1 | 9/2019 | Lang |
| 10,603,113 B2 | 3/2020 | Lang |
| 10,742,949 B2 | 8/2020 | Casas |
| 10,743,939 B1 | 8/2020 | Lang |
| 10,799,296 B2 | 10/2020 | Lang |
| 10,841,556 B2 | 11/2020 | Casas |
| 10,849,693 B2 | 12/2020 | Lang |
| 10,951,872 B2 | 3/2021 | Casas |
| 11,013,560 B2 | 5/2021 | Lang |
| 11,153,549 B2 | 10/2021 | Casas |
| 11,172,990 B2 | 11/2021 | Lang |
| 11,272,151 B2 | 3/2022 | Casas |
| 11,311,341 B2 | 4/2022 | Lang |
| 11,350,072 B1 | 5/2022 | Casas |
| 11,452,568 B2 | 9/2022 | Lang |
| 11,602,395 B2 | 3/2023 | Lang |
| 2001/0041838 A1 | 11/2001 | Holupka et al. |
| 2002/0016349 A1 | 2/2002 | Heywang et al. |
| 2002/0082498 A1 | 6/2002 | Wendt et al. |
| 2005/0028146 A1 | 2/2005 | Quick |
| 2005/0113846 A1 | 5/2005 | Carson |
| 2005/0215879 A1 | 9/2005 | Chuanggui |
| 2005/0267353 A1 | 12/2005 | Marquart et al. |
| 2005/0281465 A1 | 12/2005 | Marquart et al. |
| 2006/0142739 A1 | 6/2006 | Disilestro et al. |
| 2007/0015999 A1 | 1/2007 | Heldreth et al. |
| 2007/0035511 A1 | 2/2007 | Banerjee et al. |
| 2007/0038944 A1 | 2/2007 | Carignano et al. |
| 2007/0236514 A1 | 10/2007 | Agusanto et al. |
| 2007/0276234 A1 | 11/2007 | Shahidi |
| 2009/0068620 A1 | 3/2009 | Knobel et al. |
| 2009/0089081 A1 | 4/2009 | Haddad |
| 2009/0138019 A1 | 5/2009 | Wasielewski |
| 2009/0267805 A1 | 10/2009 | Jin et al. |
| 2011/0190637 A1 | 8/2011 | Knobel et al. |
| 2013/0093829 A1 | 4/2013 | Rosenblatt et al. |
| 2013/0096373 A1 | 4/2013 | Chabanas et al. |
| 2013/0116574 A1 | 5/2013 | Knobel et al. |
| 2013/0169683 A1 | 7/2013 | Perez et al. |
| 2013/0261503 A1 | 10/2013 | Sherman et al. |
| 2013/0261504 A1 | 10/2013 | Claypool et al. |
| 2013/0261633 A1 | 10/2013 | Thornberry |
| 2013/0296682 A1 | 11/2013 | Clavin et al. |
| 2013/0326364 A1 | 12/2013 | Latta et al. |
| 2014/0081659 A1 | 3/2014 | Nawana et al. |
| 2014/0085203 A1 | 3/2014 | Kobayashi |
| 2014/0088941 A1 | 3/2014 | Banerjee et al. |
| 2014/0118335 A1 | 5/2014 | Gurman |
| 2014/0135746 A1 | 5/2014 | Schoepp |
| 2014/0198190 A1 | 7/2014 | Okumu |
| 2014/0218366 A1 | 8/2014 | Kosmecki et al. |
| 2014/0275760 A1 | 9/2014 | Lee et al. |
| 2014/0303491 A1 | 10/2014 | Shekhar et al. |
| 2014/0334670 A1 | 11/2014 | Guigues et al. |
| 2015/0045657 A1 | 2/2015 | Kim |
| 2015/0100067 A1 | 4/2015 | Cavanagh et al. |
| 2015/0206218 A1 | 7/2015 | Banerjee et al. |
| 2015/0366628 A1 | 12/2015 | Ingmanson |
| 2016/0163105 A1 | 6/2016 | Hong et al. |
| 2016/0182877 A1 | 6/2016 | DeLuca |
| 2016/0191887 A1 | 6/2016 | Casas |
| 2016/0206379 A1 | 7/2016 | Flett et al. |
| 2016/0220105 A1 | 8/2016 | Duret |
| 2016/0225192 A1 | 8/2016 | Jones et al. |
| 2016/0228193 A1 | 8/2016 | Moctezuma de la Barrera et al. |
| 2016/0287337 A1 | 10/2016 | Aram et al. |
| 2016/0324580 A1 | 11/2016 | Esterberg |
| 2016/0381256 A1 | 12/2016 | Aguirre-Valencia |
| 2017/0027651 A1 | 2/2017 | Esterberg |
| 2017/0035517 A1 | 2/2017 | Geri et al. |
| 2017/0071673 A1 | 3/2017 | Ferro et al. |
| 2017/0108930 A1 | 4/2017 | Banerjee et al. |
| 2017/0160549 A1 | 6/2017 | Badiali et al. |
| 2017/0178375 A1 | 6/2017 | Benishti et al. |
| 2017/0202633 A1 | 7/2017 | Liu |
| 2017/0231714 A1 | 8/2017 | Kosmecki et al. |
| 2017/0231715 A1 | 8/2017 | Roger et al. |
| 2017/0258526 A1 | 9/2017 | Lang |
| 2018/0049622 A1 | 2/2018 | Ryan et al. |
| 2018/0116728 A1 | 5/2018 | Lang |
| 2018/0125584 A1 | 5/2018 | Lang |
| 2018/0256256 A1 | 9/2018 | May et al. |
| 2018/0262743 A1 | 9/2018 | Casas |
| 2018/0263704 A1 | 9/2018 | Lang |
| 2019/0000564 A1 | 1/2019 | Navab et al. |
| 2019/0110842 A1 | 4/2019 | Lang |
| 2019/0149797 A1 | 5/2019 | Casas |
| 2019/0192226 A1 | 6/2019 | Lang |
| 2019/0216452 A1 | 7/2019 | Nawana et al. |
| 2019/0246088 A1 | 8/2019 | Casas |
| 2019/0262078 A1 | 8/2019 | Lang |
| 2019/0349559 A1 | 11/2019 | Casas |
| 2019/0380784 A1 | 12/2019 | Lang |
| 2020/0053335 A1 | 2/2020 | Casas |
| 2020/0060767 A1 | 2/2020 | Lang |
| 2020/0107002 A1 | 4/2020 | Casas |
| 2020/0221060 A1 | 7/2020 | Casas |
| 2020/0246074 A1 | 8/2020 | Lang |
| 2020/0305980 A1 | 10/2020 | Lang |
| 2020/0336721 A1 | 10/2020 | Casas |
| 2021/0022808 A1 | 1/2021 | Lang |
| 2021/0030209 A1 | 2/2021 | Golino |
| 2021/0037224 A1 | 2/2021 | Casas |
| 2021/0106386 A1 | 4/2021 | Lang |
| 2021/0160472 A1 | 5/2021 | Casas |
| 2021/0267691 A1 | 9/2021 | Lang |
| 2021/0289188 A1 | 9/2021 | Casas |
| 2021/0400247 A1 | 12/2021 | Casas |
| 2022/0087746 A1 | 3/2022 | Lang |
| 2022/0159227 A1 | 5/2022 | Casas |

(56) References Cited

U.S. PATENT DOCUMENTS

| | | |
|---|---|---|
| 2022/0249171 A1 | 8/2022 | Lang |
| 2022/0295033 A1 | 9/2022 | Casas |

FOREIGN PATENT DOCUMENTS

| | | |
|---|---|---|
| GB | 2498833 | 12/2016 |
| WO | WO1993025157 | 12/1993 |
| WO | WO 2005088539 | 9/2005 |
| WO | WO 2010034117 | 4/2010 |
| WO | WO 2014057352 | 4/2014 |
| WO | WO 2015110859 | 7/2015 |
| WO | WO 2015145395 | 10/2015 |
| WO | WO 2016028828 | 2/2016 |
| WO | WO 2016162789 | 10/2016 |
| WO | WO 2016195401 | 12/2016 |
| WO | WO 2016207628 | 12/2016 |
| WO | WO 2017160651 | 9/2017 |
| WO | WO 2018085417 | 5/2018 |
| WO | WO 2018085691 | 5/2018 |
| WO | WO 2018052966 | 10/2018 |

OTHER PUBLICATIONS

A Look into the Body—Augmented Reality in Computer Aided Surgery, Department of Informatics, Research-Highlights; Technische Universitat Munchen.
Abe et al., "A Novel 3D Guidance System Using Augmented Reality for Percutaneous Vertebroplasty", Journal of Neurological Spine, vol. 19, pp. 492-501, Oct. 2013.
Aguerreche L. et al., "Reconfigurable Tangible Devices for 3D Virtual Object Manipulation by Single or Multiple Users." VRST 2010, Nov. 2010, Hong Kong, Hong Kong SAR China. ffinria-00534095.
Aichert et al., "Image-Based Tracking of the Teeth for Orthodontic Augmented Reality", Medical Image Computing and Computer-Assisted Intervention, Lecture Notes in Computer Science, vol. 7511, Springer, pp. 601-608, 2012.
Anderson et al., "Virtual annotations of the surgical field through an augmented reality transparent display", The Visual Computer, vol. 32, Issue 11, pp. 1481-1498, Nov. 2016.
Armstrong et al., "A Heads-Up Display for Diabetic Limb Salvage Surgery: A View Through the Google Looking Glass"; Journal of Diabetes Science and Technology 2014, vol. 8(5) 951-956.
Azura, R., "A survey of augmented reality." Teleoperators and Virtual Environments, vol. 6, Issue 4, Aug. 1997, pp. 355-385.
Bajura, M., et al., "Merging Virtual Objects with the Real World: Seeing Ultrasound Imagery Within the Patient.", In Proceedings of SIGGRAPH '92, 1992, New York: ACM Press, pp. 203-210.
Baker et al., "The Emergence of Augmented Reality in Orthopaedic Surgery and Education", The Orthopaedic Journal at Harvard Medical School, vol. 16, pp. 8-16, Jun. 2015.
Bauer et al., "Joint ToF Image Denoising and Registration with a CT Surface in Radiation Therapy", Scale Space and Variational Methods in Computer Vision, Lecture Notes in Computer Science, Springer, vol. 6667, pp. 98-109.
Bauer et al., "Multi-Modal Surface Registration for Markerless Initial Patient Setup in Radiation Therapy Using Microsoft's Kinect Sensor", 2011 IEEE International Conference on Computer Vision Workshops (ICCV Workshops), Barcelona, Nov. 2011, pp. 1175-1181, Jan. 16, 2012.
Bauer et al., "Real-Time Range Imaging in Health Care: A Survey", Time-of-Flight and Depth Imaging, Sensors, Algorithms, and Applications. Lecture Notes in Computer Science, vol. 8200, pp. 228-254, 2017.
Bauer, Sebastian, Doctoral Thesis, "Rigid and Non-Rigid Surface Registration for Range Imaging Applications in Medicine", urn:nbn:de:bvb:29-opus4-54665, Nov. 27, 2014.
Benford, S. et al., "User embodiment in collaborative virtual environments", Proceedings of the SIGCHI conference on Human factors in computing systems, CHI '95, pp. 242-249, 1995.

Besl PJ, McKay ND. 2, 1992. A method for registration of 3-D shapes. IEEE Trans PAMI, vol. 14, pp. 239-256.
Bichlmeier C., et al. "Contextual Anatomic Mimesis Hybrid In-Situ Visualization Method for Improving Multi-Sensory Depth Perception in Medical Augmented Reality.", IEEE 2007, 2007 6th IEEE and ACM International Symposium on Mixed and Augmented Reality.
Bichlmeier et al., "Virtually Extended Surgical Drilling Device: Virtual Mirror for Navigated Spine Surgery"; MICCAI 2007, Part I, LNCS 4791, pp. 434-441.
Billinghurst, et al., "The MagicBook: A Transitional AR Interface.", Computers and Graphics, Nov. 2001, pp. 745-753.
Billinghurst, M., et al., "Collaborative Mixed Reality", First International Symposium on Mixed Reality (ISMR '99). Mixed Reality—Merging Real and Virtual Worlds, pp. 261-284. Berlin: Springer Verlag.
Billinghurst, M., et al., "Experiments with Face to Face Collaborative AR Interfaces.", Virtual Reality Journal, vol. 4, No. 2, (2002).
Birkfellner et al., "A Head-Mounted Operating Binocular for Augmented Reality Visualization in Medicine—Design and Initial Evaluation", IEEE Transactions on Medical Imaging, vol. 21, No. 8, pp. 991-997, Aug. 2002.
Birkfellner et al., "Computer-enhanced stereoscopic vision in a head-mounted operating binocular", Physics in Medicine & Biology, vol. 48, No. 3, pp. 49-57, Feb. 7, 2003.
Birkfellner et al., "In-Vitro Aassessment of a Registration Protocol for Image Guided Implant Dentistry", Clinical Oral Implants Research, vol. 12, Issue 1, pp. 69-78, Feb. 2001.
Blackwell et al., "An Image Overlay System for Medical Data Visualization", In: Wells W.M., Colchester A., Delp S. (eds) Medical Image Computing and Computer-Assisted Intervention—MICCAI'98. MICCAI 1998. Lecture Notes in Computer Science, vol. 1496. Springer, Berlin, Heidelberg; pp. 232-240.
Blackwell et al., "An Image Overlay System for Medical Data Visualization", Medical Image Analysis vol. 4, pp. 67-72, 2000.
Blackwell et al., "Augmented Reality and Its Future in Orthopaedics", Clinical Orthopaedics & Related Research, vol. 354, pp. 111-122, Sep. 1998.
Castillo et al., "Augmented Reality for Assistance of Total Knee Replacement", Journal of Electrical and Computer Engineering, vol. 2016, Article 9358369, pp. 1-6, 2016.
Catani et al., "Knee Surgery Using Computer Assisted Surgery and Robotics", Springer Heidelberg Publishing, Book, pp. 1-221, 2013.
Chandak, "MEMS Based Wireless Controlled Robot with Voice and Video Camera"; International Journal of Scientific & Engineering Research, vol. 5, Issue 4, Apr. 2014.
Charbonnier et al., "Real Virtuality: Perspectives offered by the combination of Virtual Reality headsets and Motion Capture", Artanim, Real Virtuality White Paper, Aug. 23, 2015.
Chen et al., "Development of a surgical navigation system based on augmented reality using an optical see-through head-mounted display"; Journal of Biomedical Informatics 55 (2015) 124-131.
Cruz-Neira C. et al., "The cave: audio visual experience automatic virtual environment.", Commun. ACM, vol. 35, No. 6, pp. 64-72, Jun. 1992.
Cui et al., "KinectAvatar: Fully Automatic Body Capture Using a Single Kinect", ACCV'12 Proceedings of the 11th International Conference on Computer Vision—vol. 2, pp. 133-147, Nov. 2012.
Daniel and Ramos, "Augmented Reality for Assistance of Total Knee Replacement", Journal of Electrical and Computer Engineering, vol. 2016, Article ID 9358369, Hindawi Publishing Corporation.
Davies et al., "Computer Assisted Orthopaedic Surgery", 8th Annual Meeting of CAOS-International Proceedings, Apr. 2008.
deLambert et al., "Electromagnetic Tracking for Registration and Navigation in Endovascular Aneurysm Repair: A Phantom Study" European Journal of Vascular and Endovascular Surgery, vol. 43, pp. 684-689, 2012.
Draelos, Mark, "The Kinect Up Close: Modifications for Short-Range Depth Imaging", NC State Theses and Dissertations, pp. 1-88, Mar. 26, 2012.

(56) References Cited

OTHER PUBLICATIONS

Elmi-Terander et al., "Surgical Navigation Technology Based on Augmented Reality and Integrated 3D Intraoperative Imaging"; Spine Surgery, vol. 41, No. 21, pp. E1303-1311, 2016.
Ferrari et al., "Video See-Through in the Clinical Practice", 1st International Workshop on Engineering Interactive Computing Systems for Medicine and Health Care, EICS4Med. vol. 727, pp. 19-24, 2011.
Fischer et al., "Medical Augmented Reality Based on Commercial Image Guided Surgery", European Association for Computer Graphics, Proceedings of the 10th Eurographics Symposium on Virtual Environments, pp. 83-86, Jun. 2004.
Fitzmaurice, G., et al., "Bricks: Laying the Foundations for Graspable User Interfaces.", Proceedings of Conference on Human Factors in Computing Systems (CHI '95), Denver, Colorado, ACM Press, 442-449, (1995).
Flusser et al., "Image Fusion: Principles, Methods and Applications", Tutorial EISIPCO 2007 Lecture Notes.
Fritz et al., "Augmented Reality Visualization with Image Overlay for MRI-Guided Intervention: Accuracy for Lumbar Spinal Procedures with a 1.5-T MRI System", Vascular and Interventional Radiology, AJR: 198, Mar. 2012.
Fritz et al., "Augmented Reality Visualization with Use of Image Overlay Technology for MR Imaging - guided Interventions: Assessment of Performance in Cadaveric Shoulder and Hip Arthrography at 1.5T"; Radiology: vol. 265, No. 1, Oct. 2012, pp. 254-259.
Garon, Mathieu; Boulet, Pierre-Olivier; Doiron, Jean-Philippe; Beaulieu, Luc; Lalonde, Jean-François (2016): Real-time High Resolution 3D Data on the HoloLens. In: International Symposium on Mixed and Augmented Reality (ISMAR).
Garrido-Jurado, S.; Muñoz-Salinas, R.; Madrid-Cuevas, F. J.; Marín-Jiménez, M. J. (2014): Automatic generation and detection of highly reliable fiducial markers under occlusion. In: Pattern Recognition 47 (6), S. 2280-2292. DOI: 10.1016/j.patcog.2014.01.005.
Gavaghan et al., "Augmented Reality Image Overlay Projection for Image Guided Open Liver Ablation of Metastatic Liver Cancer"; C.A. Linte et al. (Eds.): AE-CAI 2011, LNCS, pp. 36-46, 2012.
Gee A, et al., "Processing and visualizing three-dimensional ultrasound data.", The British Journal of Radiology, vol. 77, S186-S193, (2004).
George et al., "Low Cost Augmented Reality for Training of MRI-Guided Needle Biopsy of the Spine", Medicine Meets Virtual Reality 16, pp. 138-140, IOS Press, 2008.
Germano et al., Advanced Techniques in Image-Guided Brain and Spine Surgery, Thieme Medical Publishers, Incorporated, 2002.
Gonzalez, Smart Multi-Level Tool for Remote Patient Monitoring Based on a Wireless Sensor Network and Mobile Augmented Reality, Sensors, Sep. 2014; 14(9): 17212-17234.
Gorbert, M. et al., "Triangles: Tangible Interface for Manipulation and Exploration of Digital Information Topography.", Proceedings of CHI '98, Apr. 18-23, 1998, © 1998 ACM.
Gromov et al., "What is the optimal alignment of the tibial and femoral components in knee arthroplasty?: An overview of the literature"; Acta Orthopaedica 2014; 85(5): 480-487.
Hayashibe et al., "Surgical Navigation Display System Using Volume Rendering of Intraoperatively Scanned CT Images", Computer Aided Surgery, vol. 11, No. 5, pp. 240-246, Sep. 2006.
Hinterstoisser et al., "Multimodal Templates for Real-Time Detection of Texture-less Objects in Heavily Cluttered Scenes" In 2011 International Conference on Computer Vision, pp. 858-865, Nov. 6, 2011.
Hinterstoisser et al., "Gradient Response Maps for Real-Time Detection of Texture-Less Objects". In: IEEE Transactions on Pattern Analysis and Machine Intelligence IEEE Transactions on Pattern Analysis and Machine Intelligence, vol. 34, No. 5, pp. 876-888, Oct. 13, 2011.
Hinterstoisser et al., "Real-Time Learning of Accurate Patch Rectification", 2009 IEEE Conference on Computer Vision and Pattern Recognition, Miami, FL, USA, 2009, pp. 2945-2952, doi: 10.1109/CVPR.2009.5206794.
Hinterstoisser et al., "Model Based Training, Detection and Pose Estimation of Texture-Less 3D Objects in Heavily Cluttered Scenes" Computer Vision—ACCV 2012: 11th Asian Conference on Computer Vision, Daejeon, Korea, Nov. 5-9, 2012, Revised Selected Papers, Part I 11. Springer Berlin Heidelberg, 2013.
Hoff, "Fusion of Data from Head-Mounted and Fixed Sensors"; First International Workshop on Augmented Reality, 1, 1998, pp. 1-15.
Holographic weapon sight—Wikipedia https://en.wikipedia.org/wiki/Holographic_weapon_sight retrieved on Nov. 22, 2016.
Hu et al., "A Convenient Method of Video See-through Augmented Reality Based on Image-Guided Surgery System", Internet Computing for Engineering and Science, 2013 Seventh International Conference on Internet Computing for Engineering and Science, Shanghai, pp. 100-103, Dec. 12, 2013.
Hua et al., "A 3D Integral Imaging Optical See-Through Head-Mounted Display", Optical Society of America, vol. 22, No. 11, pp. 1-8, Jun. 2, 2014.
Ishii, H., et al., "Iterative Design of Seamless Collaboration Media.", Communications of the ACM, vol. 37, No. 8, Aug. 1994, pp. 83-97.
Ji et al., "Real-Time Eye, Gaze, and Face Pose Tracking for Monitoring Driver Vigilance"; Real-Time Imaging 8, pp. 357-377, 2002.
Jiang et al., "A Robust Automated Markerless Registration Framework for Neurosurgery Navigation", The International Journal of Medical Robotics and Computer Assisted Surgery, vol. 11, pp. 436-447, Oct. 19, 2014.
Jolesz, Ferenc A., "Intraoperative Imaging and Image-Guided Therapy", Springer Science & Business Media, 893 pages, Jan. 14, 2014.
Kanade et al., "Simulation, Planning, and Execution of Computer-Assisted Surgery", Proceedings of the NSF Grand Challenges Workshop, 1996.
Kato, H.; Billinghurst, M. (1999): Marker tracking and HMD calibration for a video-based augmented reality conferencing system. In: Augmented Reality, 1999. (IWAR '99) Proceedings. 2nd IEEE and ACM International Workshop on, S. 85-94.
Kersten-Oertel et al., "The State of the Art of Visualization in Mixed Reality Image Guided Surgery", Computerized Medical Imaging and Graphics, vol. 37, pp. 98-112, Jan. 2013.
Kim et al., "Registration Accuracy Enhancement of a Surgical Navigation System for Anterior Cruciate Ligament Reconstruction: A Phantom and Cadaveric Study", The Knee, vol. 24, pp. 329-339, 2017.
Kolodzey et al., "Wearable technology in the operating room: a systematic review"; GMJ Innov 2017; 3:55-63.
Kumar et al., "A Portable Wireless Head Movement Controlled Human-Computer Interface for People with Disabilities", International Journal of Advanced Research in Electrical, Electronics and Instrumentation Engineering, vol. 3, Issue 7, Jul. 2014.
Kutter et al., "Real-time Volume Rendering for High Quality Visualization in Augmented Reality", International Workshop on Augmented Environments for Medical Imaging including Augmented Reality in Computer-aided Surgery (AMI-ARCS 2008), New York, MICCAI Society, Sep. 2008.
Lamata et al., "Augmented Reality for Minimally Invasive Surgery: Overview and Some Recent Advances"; Augmented Reality, Jan. 2010.
Liao et al., "3-D Augmented Reality for MRI-Guided Surgery Using Integral Videography Autostereoscopic Image Overlay", IEEE Transactions on Biomedical Engineering, vol. 57, No. 6, pp. 1476-1486, Jun. 2010.
Liao et al., "Surgical Navigation by Autostereoscopic Image Overlay of Integral Videography", IEEE Transactions on Information Technology in Biomedicine, vol. 8, No. 2, pp. 114-121, Jun. 2004.
Lievin et al., "Stereoscopic Augmented Reality System for Computer-Assisted Surgery", International Congress Series, vol. 1230, pp. 107-111, Jun. 2001.
Lindert et al., "The use of a head-mounted display for visualization in neuroendoscopy", Computer Aided Surgery, 2004; 9(6): 251-256.
Linte et al., "On Mixed Reality Environments for Minimally Invasive Therapy Guidance: Systems Architecture, Successes and Challenges in their Implementation from Laboratory to Clinic",

(56) References Cited

OTHER PUBLICATIONS

Comput Med Imaging Graph, Mar. 2013; 37(2): 83-97, DOI: 10.1016/j.compmedimag.2012.12.002.

Liu et al., "An Optical See-Through Head Mounted Display with Addressable Focal Planes" IEEE International Symposium on Mixed and Augmented Reality, Cambridge, UK, pp. 33-42, Oct. 3, 2008.

Lorensen WE, Cline HE. [ed.], in M.C. Stone. 1987. Marching cubes: A high resolution 3d surface construction algorithm. Proceedings of SIGGRAPH 87. pp. 163-169.

Maier-Hein et al., "Optical Techniques for 3D Surface Reconstruction in Computer-Assisted Laparoscopic Surgery", Medical Image Analysis, vol. 17, pp. 974-996, May 3, 2013.

Maier-Hein, L. et al., "Towards Mobile Augmented Reality for On-Patient Visualization of Medical Images.", Bildverarbeitung für die Medizin 2011: Algorithmen—Systeme—Anwendungen Proceedings des Workshops in Lubeck, vol. 20, pp. 389-393, Mar. 22, 2011.

Masamune et al., "An Image Overlay System with Enhanced Reality for Percutaneous Therapy Performed Inside CT Scanner", Medical Image Computing and Computer-Assisted Intervention, Lecture Notes in Computer Science, vol. 2489, pp. 77-84, Oct. 2002.

Maurer et al., "Augmented-Reality Visualization of Brain Structures with Stereo and Kinetic Depth Cues: System Description and Initial Evaluation with Head Phantom", Proceedings, vol. 4319, Medical Imaging 2001: Visualization, Display, and Image-Guided Procedures, pp. 445-456, May 28, 2001.

Medeiros D. et al., "Proposal and evaluation of a tablet-based tool for 3D virtual environments.", SBC Journal on 3D Interactive Systems, vol. 4, No. 2, pp. 30-40, 2013.

Melzer, "Head-Mounted Displays", The Avionics Handbook, 2001.

Menozzi et al., "Development of Vision-Aided Navigation for a Wearable Outdoor Augmented Reality System", IEEE Plans, Position Location and Navigation Symposium, Article No. 6851442, pp. 760-772, 2014.

Micro Vision 2015 Annual Report and Proxy Statement for 2016 Annual Meeting of Shareholders.

Moore et al., "Image Guidance for Spinal Facet Injections Using Tracked Ultrasound", MICCAI 2009, Part I, LNCS 5761, pp. 516-523 2009.

Muller et al., "Automatic Multi-Modal ToF/CT Organ Surface Registration", Bildverarbeitung für die Medizin, pp. 154-158, Mar. 2011.

Newcombe et al., "KinectFusion. Real-time dense surface mapping and tracking" In: 2011 10th IEEE International Symposium on Mixed and Augmented Reality, S. pp. 127-136, Oct. 26, 2011.

Nicolau et al., "Augmented Reality in Laparoscopic Surgical Oncology.", Surgical Oncology, vol. 20, Issue 3, pp. 189-201, Sep. 1, 2011.

Nikou et al., "Augmented Reality Imaging Technology for Orthopaedic Surgery", Operative Techniques in Orthopaedics, vol. 10, No. 1, pp. 82-86, Jan. 1, 2000.

Noonan et al., "The Design and Initial Calibration of an Optical Tracking System Using the Microsoft Kinect", IEEE Nuclear Science Symposium Conference Record, pp. 3614-3617, Oct. 2011.

Okamura, Allison, "Tracking and Surgical Navigation, Registration", Stanford Lecture 8: ME 328: Medical Robotics, pp. 1-19, Spring 2013.

Ortega et al., "Usefulness of a head mounted monitor device for viewing intraoperative fluoroscopy during orthopaedic procedures", Arch Orthop Trauma Surg, vol. 128, pp. 1123-1126, Oct. 2008.

Paprosky et al., "Intellijoint HIP: a 3D mini-optical navigation tool for improving intraoperative accuracy during total hip arthroplasty", Medical Devices: Evidence and Research, pp. 401-408, Nov. 18, 2016.

Pauly et al., "Machine Learning-Based Augmented Reality for Improved Surgical Scene Understanding", Computerized Medical Imaging and Graphics, vol. 1280, pp. 1-6, Jun. 2014.

Peters et al., "Image-Guided Interventions, Technology and Applications", Springer Science and Business Media, 576 pages, 2018.

Ponce et al., "Emerging Technology in Surgical Education: Combining Real-Time Augmented Reality and Wearable Computing Devices", The Cutting Edge, vol. 37, No. 11, Nov. 2014.

Qian et al., Comprehensive Tracker Based Display Calibration for Holographic Optical See-Through Head-Mounted Display, 2017.

Ren et al., "Marker-Based Surgical Instrument Tracking Using Dual Kinect Sensors", IEEE Transactions on Automation Science and Engineering, vol. 11, No. 3, pp. 921-924, Jul. 2014.

Rhodes, "A brief history of wearable computing", MIT Wearable Computing Project, Feb. 1997.

Rinaldi et al., "Computer-Guided Applications for Dental Implants, Bone Grafting, and Reconstructive Surgery", Elsevier Inc., 556 pages, 2016.

Robinett et al., "A Computational Model for the Stereoscopic Optics of a Head-Mounted Display", Proceedings vol. 1457, Stereoscopic Displays and Applications II, pp. 140-160, 1991.

Rolland et al., "A Comparison of Optical and Video See-through Head-mounted Displays", Proceedings vol. 2351, Telemanipulator and Telepresence Technologies, pp. 293-307, Dec. 21, 1995.

Rolland et al., "Optical Versus Video See-Through Head-Mounted Displays in Medical Visualization", Presence: Teleoperators and Virtual Environments, vol. 9, Issue 3, pp. 287-309, Jun. 2000.

Rosenthal et al., "Augmented Reality Guidance for Needle Biopsies: A Randomized, Controlled Trial in Phantoms"; MICCAI 2001, The Netherlands, Oct. 14-17, 2001, Proceedings, vol. 2208, pp. 240-248, Oct. 2, 2001.

Rosman et al., "Articulated Motion Segmentation of Point Clouds by Group-Valued Regularization", Eurographics Workshop on 3D Object Retrieval, EG 3DOR, pp. 77-84, May 2012.

Salmi Jamali, S. et al., "Utilising Mobile-Augmented Reality for Learning Human Anatomy.", 7th World Conference on Educational Sciences, (WCES-2015), Feb. 5-7, 2015, Novotel Athens Convention Center, Athens, Greece, Procedia-Social and Behavioral Sciences, vol. 197, pp. 659-668, Jul. 25, 2015.

Sanko, "Microvision's Nomad Augmented Vision System: The How and the Why"; SID Pacific Northwest Chapter Meeting, Jun. 11, 2003.

Sauer et al., "An Augmented Reality Navigation System with a Single-Camera Tracker: System Design and Needle Biopsy Phantom Trial", Proceedings of the 5th International Conference on Medical Image Computing and Computer-Assisted Intervention—Part II, pp. 116-124, Sep. 2002.

Sauer et al., "Augmented Workspace: Designing an AR Testbed", Proceedings IEEE and ACM International Symposium on Augmented Reality, pp. 47-53, Munich 2000.

Schramm, Kinect: The Company Behind the Tech Explains How it Works, Jun. 19, 2010, https://www.engadget.com/2010/06/19/kinect-how-it-works-from-the-company-behind-the-tech/?guccounter=1&guce_referrer=aHR0cHM6Ly93d3cuZ29vZ2xILmNvbS8&guce_referrer_sig=AQAAAKHcnRaFMexHHXiiRrcGjKYjWQ2VJGsMA556eCVncvte7f0VM4aN3GpWj1WqU3RfCnTwHcTbxmibv1Iz_TUFgILvsRhShqXDrSM63OcvvjlSzpUoBvsC2LsOmHqf-zifqdYelctf0D0MDM78YhH-u7w9JUfxuLDGVUxUi9hDQLZo.

Scuderi et al., "Total Knee Arthroplasty with a Novel Navigation System Within the Surgical Field", Orthopedic Clinics, vol. 45, Issue 2, pp. 167-173, Apr. 2014.

Shen et al., "3D Augmented Reality with Integral Imaging Display", Proceedings of SPIE—The International Society for Optical Engineering, vol. 9867, Article No. 9867OY, Apr. 2016.

Sherstyuk et al., "Dynamic Eye Convergence for Head-Mounted Displays Improves User Performance in Virtual Environments", Proceedings of the ACM SIGGRAPH Symposium on Interactive 3D Graphics and Games, pp. 23-30, Mar. 2012.

State et al., "Stereo Imagery from the UNC Augmented Reality System for Breast Biopsy Guidance", MMVR 2003.

Tan, D. J.; Tombari, F.; Ilic, S.; Navab, N. (2015): A Versatile Learning-Based 3D Temporal Tracker. Scalable, Robust, Online. In: 2015 IEEE International Conference on Computer Vision (ICCV), S. 693-701.

Tong et al., "Scanning 3D Full Human Bodies Using Kinects", IEEE Transactions on Visualization and Computer Graphics, vol. 18, Issue 4, pp. 643-650, Apr. 1, 2012.

(56) References Cited

OTHER PUBLICATIONS

Traub, J., Stefan, P., Heining, S.M., Sielhorst, T., Riquarts, C., Eulerz, E., Navab, N. (2006): Hybrid Navigation Interface for Orthopedic and Trauma Surgery. R. Larsen, M. Nielsen, and J. Sporring (Eds.): MICCAI 2006, LNCS 4190, pp. 373-380.

Trevisan et al., "Towards Markerless Augmented Medical Visualization", AMI-ARCS, pp. 57-66, 2004.

Vagvolgyi et al., "Video to CT Registration for Image Overlay on Solid Organs", Procedural Augmented Reality in Medical Imaging and Augmented Reality in Computer-Aided Surgery (AMIARCS) pp. 78-86, 2008.

Vercauteren et al., "Real Time Autonomous Video Image Registration for Endomicroscopy: Fighting the Compromises", Three-Dimensional and Multidimensional Microscopy: Image Acquisition and Processing XV., vol. 6861, pp. 68610C. International Society for Optics and Photonics, Feb. 12, 2008.

Vogt et al., "Reality Augmentation for Medical Procedures: System Architecture, Single Camera Marker Tracking, and System Evaluation", International Journal of Computer Vision, vol. 70, No. 2, pp. 179-190, 2006.

Vogt, Sebastian, "Real-Time Augmented Reality for Image-Guided Interventions", PhD Thesis, Nürnberg: Der Technischen Fakultät der Universität Erlangen, 2009.

Wang et al., "3D Modeling from Wide Baseline Range Scans Using Contour Coherence", Proceedings of the IEEE Conference on Computer Vision and Pattern Recognition, pp. 4018-4025, 2014.

Wang et al., "Augmented Reality 3D Displays with Micro Integral Imaging"; Journal of Display Technology, vol. 11, No. 11, Nov. 1, 2015.

Wang et al., "Augmented Reality Navigation with Automatic Marker-Free Image Registration Using 3-D Image Overlay for Dental Surgery", IEEE Transactions on Biomedical Engineering, vol. 61, No. 4, pp. 1295-1304, Apr. 2014.

Wang H. et al., "Precision insertion of percutaneous sacroiliac screws using a novel augmented reality-based navigation system: a pilot study", Intl. Orthop. (SICOT) vol. 40, pp. 1941-1947, Sep. 2016.

Watsen, K., et al., "A Handheld Computer as an Interaction Device to a Virtual Environment.", Proceedings of the International Projection Technologies Workshop, Stuttgart, Germany, pp. 1-7, May 10-11, 1999.

Weiss et al., "Augmented Reality Visualization Using Image-Overlay for MR-Guided Interventions: System Description, Feasibility, and Initial Evaluation in a Spine Phantom", Musculoskeletal Imaging, AJR:196, Mar. 2011, DOI: 10.2214/AJR.10.5038.

Wellner, P., "Interacting with Paper on the DigitalDesk.", Communications of the ACM. vol. 36, No. 7, pp. 87-96, Jul. 1, 1993.

Wilson et al., "Validation of Three-Dimensional Models of the Distal Femur Created from Surgical Navigation Point Cloud Data"; CAOS 2015.

Xiaojun et al., "Development of a Surgical Navigation System Based on Augmented Reality Using an Optical See-Through Head-Mounted Display", Journal of Biomedical Informatics, vol. 55, pp. 124-131, 2015.

Yamazaki, K et al., "Gesture Laser and Gesture Laser Car—Development of an Embodied Space to Support Remote Instruction.", In Proceedings of the Sixth European Conference on Computer Supported Cooperative Work—ECSC W'99, Sep. 12-16, Copenhagen, Denmark. Kluwer Academic Publishers, Dordrecht, pp. 239-258, Sep. 1999.

Yang H. et al., "Exploring Collaborative Navigation: the Effect of Perspectives on Group Performance", Proceedings of the 4th international conference on Collaborative virtual environments, pp. 135-142, Sep. 30, 2002.

Ye et al., "Accurate 3D Pose Estimation from a Single Depth Image", IEEE International Conference on Computer Vision (ICCV), pp. 731-738, Nov. 2011.

Yoon et al., "Technical Feasibility and Safety of an Intraoperative Head-Up Display Device During Spine Instrumentation", The International Journal of Medical Robotics and Computer Assisted Surgery, vol. 13, No. 3, pp. 1-9, Sep. 2017.

\* cited by examiner

SYSTEMS AND METHODS FOR DETERMINING THE SHAPE OF SPINAL RODS AND SPINAL INTERBODY DEVICES FOR USE WITH AUGMENTED REALITY DISPLAYS, NAVIGATION SYSTEMS AND ROBOTS IN MINIMALLY INVASIVE SPINE PROCEDURES

CROSS REFERENCE TO RELATED APPLICATIONS

This application claims the benefit of and priority to U.S. Provisional Application Ser. No. 63/301,169, filed Jan. 20, 2022, the entire content of which is hereby incorporated by reference in its entirety.

TECHNICAL FIELD

Aspects of the present disclosure relate to systems and methods for determining the shape of spinal rods and spinal interbody devices for use with augmented reality displays, navigation systems and robots in minimally invasive spine surgery in a spine.

BACKGROUND

With minimally invasive surgery for spinal fusion, a spinal rod cannot be seen during insertion into tulips since it is hidden underneath a patient's skin and/or subcutaneous and/or muscle tissue.

SUMMARY

Aspects of the disclosure relate to a system for performing spinal fusion surgery. In some embodiments, the system comprises: a tracking system for tracking one or more markers; a computer processor; a physical spinal rod having a length; an inserter configured for insertion of the physical spinal rod; and an engagement member. In some embodiments the rod inserter is configured for connecting to a proximal end of the physical spinal rod. In some embodiments, the rod inserter comprises a first marker attached to the rod inserter. In some embodiments, the engagement member comprises a second marker attached to the engagement member. In some embodiments, the engagement member is configured to slideably engage with the physical spinal rod. In some embodiments, the tracking system is configured to track the engagement member during movement of the engagement member from the proximal end to a distal end or from a distal end to the proximal end along a length of the physical spinal rod. In some embodiments, the computer processor is configured to determine an axis, a curvature, a shape or a combination thereof of the physical spinal rod based on tracking information of the engagement member in relationship to the spinal rod connected to the tracked rod inserter.

In some embodiments, the system comprises: a tracking system for tracking one or more markers; a computer processor; a physical spinal rod having a length; an inserter configured for insertion of the physical spinal rod; and an engagement member; wherein the rod inserter is configured for connecting to a proximal end of the physical spinal rod, wherein the rod inserter comprises a first marker attached to the rod inserter, wherein the engagement member comprises a second marker attached to the engagement member, wherein the engagement member is configured to slideably engage with the physical spinal rod, wherein the tracking system is configured to track the engagement member during movement of the engagement member from the proximal end to a distal end or from a distal end to the proximal end along a length of the physical spinal rod, and wherein the computer processor is configured to determine an axis, a curvature, a shape or a combination thereof of the physical spinal rod based on tracking information of the engagement member in relationship to the spinal rod connected to the tracked rod inserter.

In some embodiments, the computer processor is configured to receive information about a radius or a diameter of the physical spinal rod. In some embodiments, the computer processor is configured to determine a shape of the physical spinal rod based on the tracking information generated by the movement of the second marker attached to the engagement member and the information about the radius or the diameter. In some embodiments, the axis is a central axis of the physical spinal rod and the shape is determined, by the computer processor, based on the radius or the diameter and the central axis. In some embodiments, the system comprises an augmented reality device, wherein the system is configured to display, by the augmented reality device, a virtual spinal rod based on the determined axis, curvature, or shape, or combination thereof of the physical spinal rod, wherein the virtual spinal rod is a virtual representation of the physical spinal rod. In some embodiments, the virtual representation comprises at least a portion of a surface of the physical spinal rod. In some embodiments, the augmented reality device comprises an optical see-through head mounted device or a video see-through head mounted device. In some embodiments, the system is configured to display at least a portion of at least one virtual spinal screw, interbody device, physical plate or combination thereof implanted in a patient, wherein the at least one virtual device is virtual representations of a physical spinal screw, a physical interbody device, or a physical plate or combination thereof. In some embodiments, system is configured to display at least a portion of a virtual screw corresponding to at least a portion of physical spinal screw, at least a portion of a virtual interbody device corresponding to at least a portion of a physical interbody device, at least a portion of a virtual plate corresponding to at least a portion of a physical plate, at least a portion of a virtual spinal rod corresponding to at least a portion of the physical spinal rod, or a combination thereof.

In some embodiments, the at least a portion of the virtual screw corresponding to at least a portion of physical spinal screw is superimposed, aligned or superimposed and aligned with the at least portion of the physical screw. In some embodiments, the at least a portion of the virtual interbody device corresponding to at least a portion of the physical interbody device is superimposed, aligned or superimposed and aligned with the at least portion of the physical interbody device. In some embodiments, the at least a portion of the virtual plate corresponding to at least a portion of the physical plate is superimposed, aligned or superimposed and aligned with the at least portion of the physical plate. In some embodiments, the at least a portion of the virtual spinal rod corresponding to at least a portion of the physical rod is superimposed, aligned or superimposed and aligned with the at least portion of the physical spinal rod. In some embodiments, the physical interbody device is attached to an inserter. In some embodiments, the physical spinal rod is attached to the inserter.

In some embodiments, the system is configured to display a receiving portion of a virtual screw tulip, wherein the receiving portion of the virtual screw tulip is configured to receive the virtual spinal rod.

In some embodiments, the display of the virtual screw tulip comprises a virtual representation of a thread or of a fastening mechanism for a locking screw for fastening the physical spinal rod.

In some embodiments, the augmented reality device is configured to provide a magnified view of the virtual spinal rod, a virtual spinal screw, a virtual screw tulip, a spinal rod receiving portion of the virtual screw tulip, or a combination thereof. In some embodiments, the magnification comprises a 1.5×, 2.0×, 3.0×, 4.0×, 5.0× magnification.

In some embodiments, system is configured to facilitate advancing the virtual spinal rod towards the receiving portion of one or more virtual screw tulip, wherein the system is configured to keep the virtual spinal rod superimposed and aligned with the physical spinal rod during the advancing. In some embodiments, the tracking system is configured to determine one or more coordinates of the one or more markers.

In some embodiments, the one or more markers comprise at least one optical marker, at least one geometric pattern, at least one retroreflective marker, at least one infrared marker, at least one radiofrequency emitting and/or receiving marker, at least one light emitting diode, at least one inertial measurement unit or a combination thereof.

In some embodiments, the system is configured to highlight a receiving portion of a virtual screw tulip using at least one of a color, brightness, shading, transparency, texture or combination thereof different from at least one color, brightness, shading, transparency, texture or combination thereof of a virtual representation of other portions of the screw when the virtual representation of the spinal rod is inserted into the receiving portion of the virtual screw tulip.

In some embodiments, the system is configured to change a color, brightness, shading, transparency, texture or combination thereof of a receiving portion of a virtual screw tulip when the virtual representation of the spinal rod is inserted into the receiving portion of the virtual screw tulip.

In some embodiments, the system comprises at least one subarray, array, or combination thereof, wherein the least one subarray, array, or combination thereof comprises the one or more markers.

In some embodiments, the physical spinal rod is attached to or engageably connected to the rod inserter, wherein the attachment or connection is in a defined geometric relationship.

In some embodiments, the system comprises a rod bender, wherein the rod bender is configured for bending the physical spinal rod. In some embodiments, the rod bender comprises at least one marker.

In some embodiments, the tracking system if configured to track the rod bender.

In some embodiments, the augmented reality display device is configured to display a virtual spinal rod superimposed onto the rod bender.

In some embodiments, the rod bender is configured to facilitate bending of a physical spinal rod to match the shape of a displayed virtual rod. In some embodiments, the rod bender is configured to facilitate bending of a physical spinal rod to superimpose and align the physical spinal rod with the virtual rod.

In some embodiments, the shape of a virtual spinal rod is based on one or more intra-operative measurements of the position and/or orientation of one or more physical screws, physical screw tulips, or combination thereof inserted into a patient's spine.

In some embodiments, the one or more intra-operative measurements comprise coordinate data obtained from a tracked pointer, screwdriver or instrument inserted into or touching a screw tulip.

In some embodiments, the tracking system is an optical tracking system. In some embodiments, the tracking system comprises one or more cameras. In some embodiments, the tracking system comprises one or more inertial measurement units.

In some embodiments, the engagement member comprises an opening. In some embodiments, the opening has a radius that is larger than the radius of the spinal rod. In some embodiments, the radius of the circular opening is 0.01, 0.02, 0.03, 0.04, 0.05, 0.1, 0.15, 0.20, 0.25 mm larger than the radius of the spinal rod. In some embodiments, the opening is circular. In some embodiments, the opening is ellipsoid. In some embodiments, the engagement member comprises a semi-circular opening. In some embodiments, the engagement member comprises an opening with at least one flat surface. In some embodiments, the opening is wedge shaped.

In some embodiments, the engagement member is shipped in a kit within the spinal rod. In some embodiments, the kit is sterile.

In some embodiments, the system is configured to change a color, brightness, shading, transparency, texture or combination thereof of a receiving portion of a virtual screw tulip when the virtual representation of the spinal rod is inserted into the receiving portion of the virtual screw tulip.

In some embodiments, the system is configured for minimally invasive surgery of the spine.

Aspects of the disclosure relate to a system for performing spinal surgery. In some embodiments, the system comprises a tracking system for tracking one or more markers; a computer processor; an inserter configured for insertion of a physical spinal interbody device; a physical spinal interbody device; a registration device. In some embodiments, the inserter is configured for connecting to the physical spinal interbody device. In some embodiments, the inserter comprises a first marker attached to inserter. In some embodiments, the registration device comprises a second marker attached to the registration device. In some embodiments, the registration device comprises a surface for slideable, rotatable, and/or moveable engagement of the physical spinal interbody device with the registration device. In some embodiments, the tracking system is configured to track the inserter during movement of the physical spinal interbody device on the surface of the registration device. In some embodiments, the computer processor is configured to determine at least a portion of a shape of the physical spinal interbody device based on tracking information of the inserter with the connected physical interbody device in relationship to the tracking information of the second marker attached to the registration device.

In some embodiments, the system for performing spinal surgery comprises a tracking system for tracking one or more markers; a computer processor; an inserter configured for insertion of a physical spinal interbody device; a physical spinal interbody device; a registration device; wherein the inserter is configured for connecting to the physical spinal interbody device, wherein the inserter comprises a first marker attached to inserter, wherein the registration device comprises a second marker attached to the registration device, wherein the registration device comprises a surface for slideable, rotatable, and/or moveable engagement of the physical spinal interbody device with the registration device, wherein the tracking system is configured to track the inserter during movement of the physical spinal interbody device on the surface of the registration device, wherein the computer processor is configured to determine at least a portion of a shape of the physical spinal interbody device based on tracking information of the inserter with the connected physical interbody device in relationship to the tracking information of the second marker attached to the registration device.

In some embodiments, the at least a portion of the shape is an edge of the physical spinal interbody device, wherein the edge is at least a portion of a leading edge of the physical spinal interbody device configured for insertion into an intervertebral disc space.

In some embodiments, the computer processor is configured to determine a dimension of the physical spinal interbody device based on a distance between the leading edge of the physical spinal interbody device and the attachment of the physical spinal interbody device to the inserter. In some embodiments, the dimension is a width or a depth of the physical spinal interbody device.

In some embodiments, the tracking system is configured to determine one or more coordinates of the one or more markers.

In some embodiments, the one or more markers comprise at least one optical marker, at least one geometric pattern, at least one retroreflective marker, at least one infrared marker, at least one radiofrequency emitting and/or receiving marker, at least one light emitting diode, at least one inertial measurement unit or a combination thereof.

In some embodiments, the system comprises an augmented reality device, wherein the system is configured to display, by the augmented reality device, a virtual representation of the physical interbody device.

In some embodiments, the system is configured to display at least a portion of a virtual interbody device, wherein the at least portion of the virtual interbody device is a virtual representation of at least a portion of the physical interbody device.

In some embodiments, the physical interbody device is attached to an inserter.

In some embodiments, the virtual interbody device is superimposed, aligned or superimposed and aligned with the physical interbody device.

In some embodiments, the first marker attached to the inserter comprises information about the position and orientation of the attached physical interbody device in relationship to the inserter. In some embodiments, the system is configured to determine a first set of coordinates of the physical interbody device when an undersurface of the physical interbody device is placed on the registration device, wherein the system is configured to determine a second set of coordinates of the physical interbody device when a top surface of the physical interbody device is placed on the registration device, wherein the computer processor is configured to determine a thickness of the physical interbody device based on the difference in coordinates between the first set of coordinates and the second set of coordinates.

Aspects of the disclosure relate to a system for performing spinal fusion surgery, the system comprising a tracking system for tracking one or more markers; a computer processor; a physical spinal rod; and an engagement member; wherein the engagement member comprises a marker attached to the engagement member, wherein the engagement member is configured to slideably engage with the physical spinal rod, herein the tracking system is configured to track the engagement member during movement of the engagement member from a distal end to a proximal end along a length of the physical spinal rod, and wherein the computer processor is configured to determine an axis, a curvature, a shape, or a combination thereof of the physical spinal rod based on the tracking information of the engagement member.

Aspects of the disclosure relate to a method of for performing minimally invasive spinal fusion surgery, the method of comprising: generating tracking information about a surface of a physical spinal rod to determine a curvature, a three dimensional shape or combination thereof of the physical spinal rod; generating a virtual representation of the physical spinal rod based on the determined curvature, three dimensional shape or combination thereof; generating positional or tracking information about one or more physical screw, wherein the one or more screws are implanted into a spine of a patient; generating a virtual representation of the one or more screw tulip; superimposing and aligning the virtual representation of the spinal rod onto the physical spinal rod; and advancing a distal end of the virtual representation of the spinal rod toward a receiving portion of the virtual representation of a screw tulip thereby engaging the physical spinal rod with the one or more implanted screws.

In some embodiments, a proximal end the physical spinal rod is connected to an inserter, and wherein the method comprises receiving tracking information of the inserter while advancing the distal end of the virtual representation of the spinal rod toward a receiving portion of the virtual representation of the screw tulip.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1A:
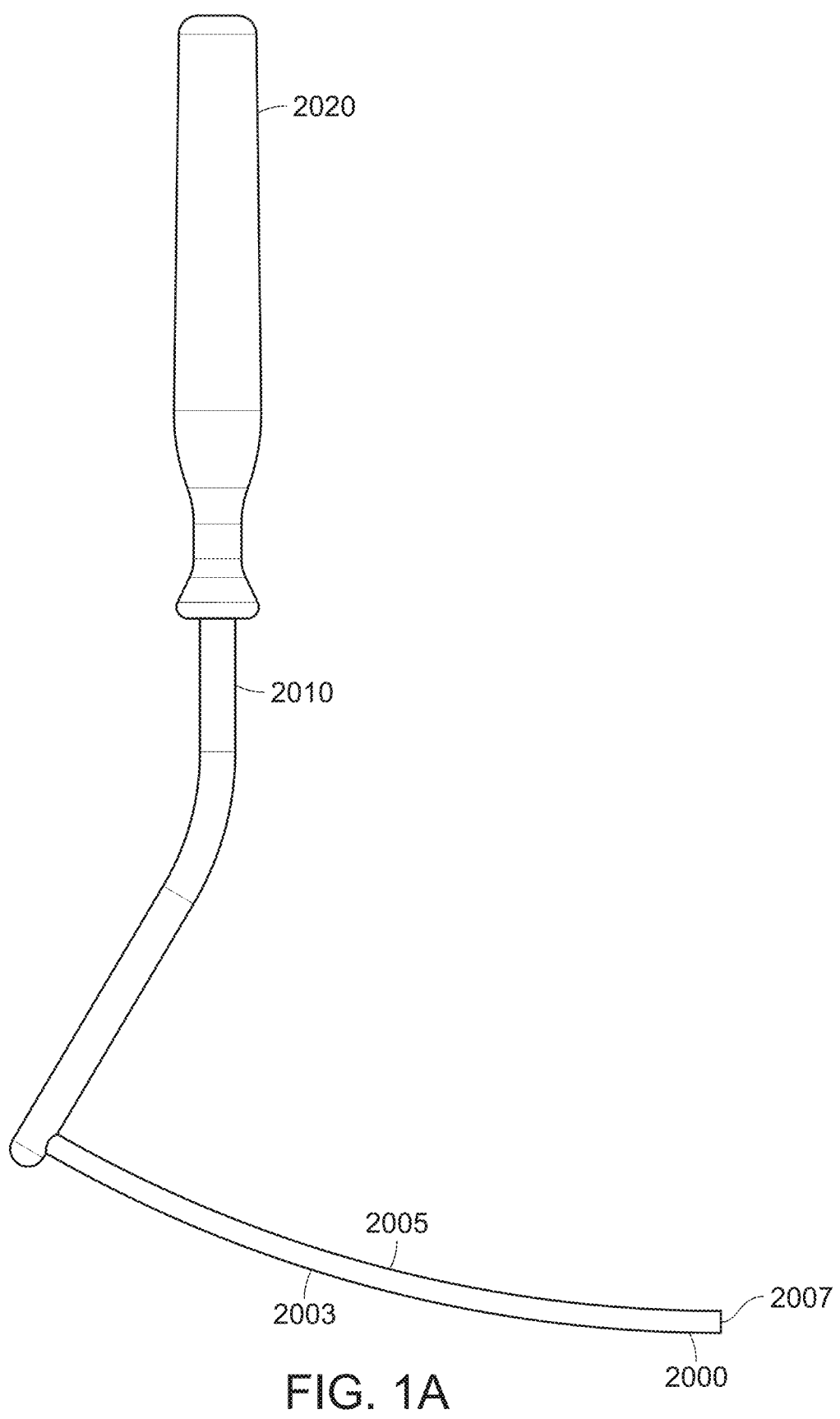
FIG. 1A shows a non-limiting example of a rod inserter with an attached spinal rod that has been bent according to some embodiments of the disclosure.
Figure 1B:
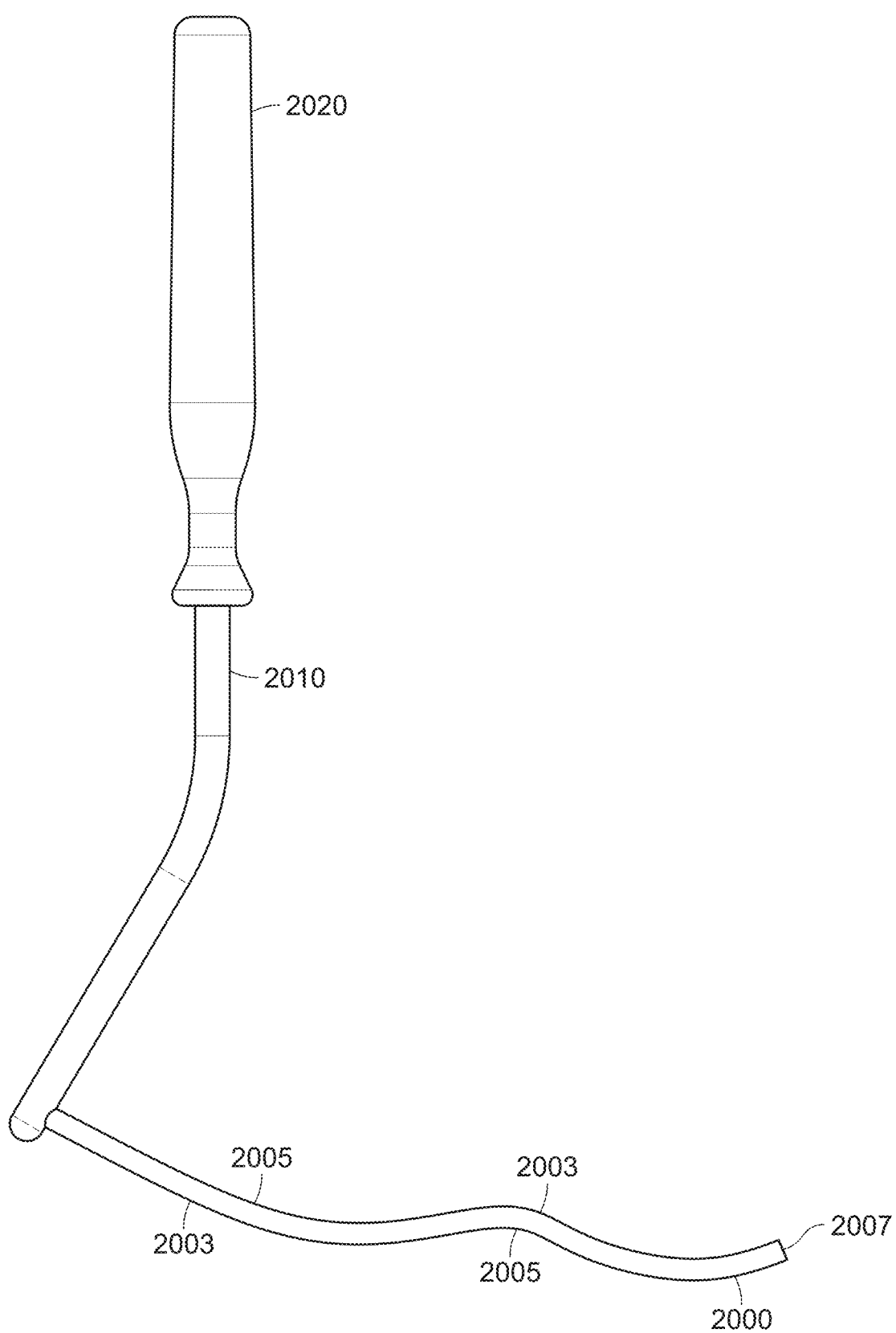
FIG. 1B shows a non-limiting example of a rod inserter with an attached spinal rod that has been bent with convex and concave shape portions according to some embodiments of the disclosure.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the presently disclosed embodiments Specific details are given in the following description to provide a thorough understanding of the embodiments. However, it will be understood by one of ordinary skill in the art that the embodiments may be practiced without these specific details.

Subject matter will now be described more fully with reference to the accompanying drawings, which form a part hereof, and which show, by way of illustration, specific example aspects and embodiments of the present disclosure. Subject matter may, however, be embodied in a variety of different forms and, therefore, covered or claimed subject matter is intended to be construed as not being limited to any example embodiments set forth herein; example embodiments are provided merely to be illustrative. The following detailed description is, therefore, not intended to be taken in a limiting sense.

As used herein and in the appended claims, the singular forms "a", "an" and "the" include plural referents unless the contents clearly dictates otherwise.

The terms physical device and physical implant are used interchangeably throughout the application.

The terms physical instrument, physical device, physical implant do not include virtual instruments, virtual devices, or virtual implants. For example, the physical surgical instruments can be surgical instruments provided by manufacturers or vendors for spinal surgery, pedicle screw instrumentation, or anterior spinal fusion. Physical surgical instruments can be re-useable or disposable or combinations thereof. Physical surgical instruments can be patient specific. For example, the physical devices or physical implants can be a pedicle screw, a spinal rod, a spinal cage. A physical instrument can be a rod inserter, an inserter for an interbody device or the like. The term virtual surgical instrument, virtual device, or virtual implant does not include physical surgical instrument, physical device, or physical surgical instrument.

Aspects of the present disclosure provide, among other things, systems, devices and methods for a simultaneous visualization of live data of the patient and digital representations of virtual data such as virtual cuts and/or virtual surgical guides including cut blocks or drilling guides through a head mounted display (HMD). In some embodiments, the system can include one or more HMD, one or more processor and one or more user interfaces. In some embodiments, the surgical site including live data of the patient, the HMD, and the virtual data are registered in a common coordinate system. In some embodiments, the virtual data are superimposed onto and aligned with the live data of the patient. In some embodiments, the head mounted display is a see-through HMD. Unlike virtual reality head systems that blend out live data, the HMD allows the surgeon to see the live data of the patient through the HMD, e.g. the surgical field, while at the same time observing virtual data of the patient and/or virtual surgical instruments or implants with a predetermined position and/or orientation using the display of the HMD unit.

In some embodiments, an operator such as a surgeon can look through an HMD observing physical data or information on a patient, e.g. a surgical site or changes induced on a surgical site, while pre-existing data of the patient are superimposed onto the physical visual representation of the live patient. Systems, methods and techniques to improve the accuracy of the display of the virtual data superimposed onto the live data of the patient are described in U.S. Pat. No. 9,861,446 or International Patent Application No. PCT/US2018/012459, which are incorporated herein by reference in their entirety.

Methods and systems of registration and cross-referencing including registration and cross-referencing surgical sites and one or more HMDs, for tracking tools, instruments, devices (including pedicle screws, screw drivers, inserters, interbody devices), HMDs such as the ones described in U.S. Pat. No. 9,861,446, International Application Serial Nos. PCT/US2017/021859, PCT/US2018/13774 and PCT/US2019/015522 can be used. Methods and systems of displaying virtual data (e.g. virtual pedicle screws, spinal rods, interbody devices) in various surgical applications using one or more HMDs such as the ones described in U.S. Pat. No. 9,861,446, PCT International Application Serial Nos. PCT/US2017/021859, PCT/US2018/13774 and PCT/US2019/015522. These applications are hereby incorporated by reference in their entireties.

Aspects of the present disclosure relate to systems, devices and methods for performing a surgical step or surgical procedure with visual guidance using a head mounted display. In some embodiments, the head mounted display can be a see-through head mounted display, e.g. an optical see through head mounted display, for example for augmented reality applications. In some embodiments, the head mounted display can be a non-see-through head mounted display, e.g. video see through type, for virtual reality applications, optionally with video display including video streaming of live data from the patient, e.g. video feed from a camera integrated into, attached to, or separate from the head mounted display. The head mounted display can provide surgical guidance in a mixed reality environment. Various embodiments are described for adjusting the focal plane or focal point or selecting the focal plane or focal point for displaying virtual structures, objects, instruments, implants (e.g. implant components) or device using, for example, the distance between the head mounted display and the surgical site, e.g. an uncut or a cut bone in an osteotomy, e.g. of a vertebral body, or spinal element in a spinal procedure.

Some aspects of the disclosure relate to a system for performing a surgical procedure, the system comprising: a processor; a see-through head mounted display; and a marker attached to a patient, wherein the system is configured to generate a 3D stereoscopic view of a virtual surgical guide, wherein the virtual surgical guide is a placement indicator at one or more predetermined coordinates indicating a predetermined position, predetermined orientation or combination thereof for aligning a physical surgical tool or a physical surgical instrument, wherein the system is configured to display the 3D stereoscopic view by the see through head mounted display onto the patient, wherein the processor is configured to determine a distance between the one or more predetermined coordinates of the virtual surgical guide and the see through head mounted display, wherein the one or more predetermined coordinates of the virtual surgical guide are referenced to or based on the marker, wherein the processor is configured to adjust at least one focal plane, focal point, or combination thereof of the display of the 3D stereoscopic view based on the determined distance.

In some embodiments, the system comprises one or more markers. In some embodiments, the marker is configured to reflect or emit light with a wavelength between 380 nm and 700 nm. In some embodiments, the marker is configured to reflect or emit light with a wavelength greater than 700 nm. In some embodiments, the marker is a radiofrequency marker, or wherein the marker is an optical marker, wherein the optical marker includes a geometric pattern. In some embodiments, the one or more markers comprise at least one marker attached to the patient, at least one marker attached to the see-through head mounted display, at least one marker attached to a structure in the operating room or any combination thereof.

In some embodiments, the system is configured to determine one or more coordinates using one or more cameras.

In some embodiments, the one or more cameras detect light with a wavelength between 380 nm and 700 nm. In some embodiments, the one or more cameras detect light with a wavelength above 700 nm. In some embodiments, the system comprises at least one camera integrated into or attached to the see-through head mounted display. In some embodiments, at least one camera is separate from the head mounted display. In some embodiments, the one or more cameras are configured to determine the position, orientation, or position and orientation of the one or more marker. In some embodiments, the one or more cameras are configured to determine one or more coordinates of the one or more marker. In some embodiments, the one or more cameras are configured to track the one or more coordinates of the one or more marker during movement of the one or more marker. In some embodiments, the one or more cameras are configured to determine one or more coordinates of the see-through head mounted display.

In some embodiments, the system is configured to track the one or more coordinates of the see-through head mounted display during movement of the patient, the see-through head mounted display, or the patient and the see-through head mounted display.

In some embodiments, the system comprises one or more processors. In some embodiments, the one or more processors are configured to generate the 3D stereoscopic view of the virtual surgical guide. In some embodiments, the one or more processors are configured to determine the distance between the one or more predetermined coordinates of the virtual surgical guide and the see-through head mounted display. In some embodiments, the one or more processors are configured to track one or more coordinates of at least one or more markers, one or more see through head mounted displays, or combinations thereof during movement of the patient, the see-through head mounted display or the patient and the see-through head mounted display.

In some embodiments, the one or more processors are configured to determine the distance between the one or more predetermined coordinates of the virtual surgical guide and the see through head mounted display during movement of the marker, movement of the see through head mounted display, or movement of the marker and the see through head mounted display, and wherein the one or more processors are configured to adjust the at least one focal plane, focal point, or combination thereof based on the change in the determined distance.

In some embodiments, the one or more processors are configured to adjust the at least one focal plane, focal point or combination thereof intermittently. In some embodiments, the one or more processors are configured to adjust the at least one focal plane, focal point or combination thereof continuously.

In some embodiments, the physical surgical tool or physical surgical instrument is configured to effect a tissue removal in the patient. The tissue removal can be a removal of bone or a removal of cartilage or a removal of bone and cartilage.

In some embodiments, the system comprises one or more see-through head mounted displays. The one or more see-through head mounted displays can comprise one or more combiners and/or one or more waveguides. The one or more see-through head mounted displays can comprise one or more mirrors.

In some embodiments, the one or more see-through head mounted displays comprise a first display unit for the left eye and a second display unit for the right eye. In some embodiments, the one or more see-through head mounted displays comprise a stack of one or more planar or non-planar display units. The one or more planar or non-planar display units comprise at least one of a combiner, a mirror, a waveguide, or combinations thereof. In some embodiments, the at least one focal plane, focal point or combination thereof matching the determined distance coincides with at least one of the planar or non-planar display units in the stack. In some embodiments, the stack of one or more planar or non-planar display units display a range of focal planes, focal points or combination thereof and wherein the range of focal planes, focal points or combination thereof includes a focal plane, focal point or combination thereof near the determined distance.

In some embodiments, the one or more see-through head mounted displays comprise at least one active optical element for adjustment of the at least one focal plane, focal point or combination thereof. The system comprises one or more mechanical, electrical, electromagnetic, piezoelectric adjustment effectors, or combinations thereof, and wherein the mechanical, electrical, electromagnetic, piezoelectric adjustment effectors, or combination thereof are configured to move at least a portion of the at least one active optical element to adjust the at least one focal plane, focal point or combination thereof. In some embodiments, the movement of the at least portion of the at least one active optical element comprises at least one translation, rotation, pivoting, or combination thereof of the of the at least portion of the at least one active optical element. In some embodiments, the at least one active optical element comprises a deformable lens or a deformable mirror or combinations thereof.

In some embodiments, the virtual surgical guide is a virtual path, a virtual trajectory, a virtual surgical tool, a virtual surgical instrument, a virtual cut block, a virtual trial implant, a virtual implant component, a virtual implant, a virtual device, a predetermined start point, a predetermined start position, a predetermined start orientation or alignment, a predetermined intermediate point, a predetermined intermediate position, a predetermined intermediate orientation or alignment, a predetermined end point, a predetermined end position, a predetermined end orientation or alignment, a predetermined plane, a predetermined cut plane, a predetermined depth marker, a predetermined stop, a predetermined angle or orientation or rotation marker, a predetermined axis, or a predetermined tissue change or alteration.

Aspects of the disclosure relate to a system for performing a surgical procedure in a patient, the system comprising: a processor; a see through head mounted display; and a marker attached to a patient, wherein the see through head mounted display comprises a first display unit for the left eye and a second display unit for the right eye, wherein the system is configured to generate a first view of a virtual surgical guide for the first display unit and a second view of the virtual surgical guide for the second display unit, wherein the virtual surgical guide is a placement indicator at one or more predetermined coordinates indicating a predetermined position, predetermined orientation or combination thereof for aligning a physical surgical tool or a physical surgical instrument, wherein the system is configured to generate using the first view and using the second view a 3D stereoscopic view of the virtual surgical guide based on the one or more predetermined coordinates, wherein the system is configured to display the 3D stereoscopic view by the see through head mounted display onto the patient, wherein the system is configured to determine a distance between the one or more predetermined coordinates and the see through head mounted display, wherein the one or more predetermined coordinates are referenced to or based on the marker, wherein the system is configured to adjust the convergence between the first and second views displayed by the first display unit and the second display unit of the virtual surgical guide based on the determined distance.

In some embodiments, the system comprises one or more processors, one or more markers, one or more see through head mounted display or combinations thereof. In some embodiments, the one or more processors are configured to generate the 3D stereoscopic view of the virtual surgical guide. In some embodiments, the one or more processors are configured to determine the distance between the one or more predetermined coordinates of the virtual surgical guide and the see-through head mounted display. In some embodiments, the one or more processors are configured to track one or more coordinates of one or more markers, one or more see through head mounted displays, or combinations thereof during movement of the patient, movement of the see-through head mounted display or movement of the patient and the see-through head mounted display. In some embodiments, the one or more processors are configured to determine the distance between the one or more predetermined coordinates of the virtual surgical guide and the see through head mounted display during movement of the marker, movement of the see through head mounted display, or movement of the marker and the see through head mounted display, and wherein the one or more processors are configured to adjust the convergence based on a change in the determined distance. In some embodiments, the one or more processors are configured to adjust the convergence intermittently. In some embodiments, the one or more processors are configured to adjust the convergence continuously.

In some embodiments, the system comprises one or more see through head mounted displays.

The one or more see through head mounted displays can comprise one or more combiners and/or one or more waveguides. The one or more see through head mounted displays can comprise one or more mirrors.

In some embodiments, the one or more see through head mounted displays comprise a stack of planar or non-planar display units. The one or more planar or non-planar display units comprise at least one combiner, a mirror, a waveguide, or combinations thereof.

In some embodiments, the one or more see through head mounted displays comprise at least one active optical element to adjust the convergence. In some embodiments, the system comprises one or more mechanical, electrical, electromagnetic, piezoelectric adjustment effectors, or combination thereof and wherein the mechanical, electrical, electromagnetic, piezoelectric adjustment effectors, or combination thereof are configured to move at least a portion of the at least one active optical element to adjust the convergence. The movement can comprise a translation, rotation, pivoting, or combination thereof of the at least one active optical element. In some embodiments, the at least one active optical element comprises a deformable lens or a deformable mirror or combinations thereof.

In some embodiments, the convergence between the first and second views is adjusted by adjusting a size, dimension, position, orientation or combination thereof of the first and second views on the first and second display units based on the determined distance.

In some embodiments, the virtual surgical guide is a virtual path, a virtual trajectory, a virtual surgical tool, a virtual surgical instrument, a virtual cut block, a virtual trial implant, a virtual implant component, a virtual implant, a virtual device, a predetermined start point, a predetermined start position, a predetermined start orientation or alignment, a predetermined intermediate point, a predetermined intermediate position, a predetermined intermediate orientation or alignment, a predetermined end point, a predetermined end position, a predetermined end orientation or alignment, a predetermined plane, a predetermined cut plane, a predetermined depth marker, a predetermined stop, a predetermined angle or orientation or rotation marker, a predetermined axis, or a predetermined tissue change or alteration.

In some embodiments, the system is configured to determine one or more coordinates using one or more cameras. The one or more cameras can detect light with a wavelength between 380 nm and 700 nm or with a wavelength above 700 nm. In some embodiments, at least one camera integrated into or attached to the see-through head mounted display. In some embodiments, at least one camera is separate from the head mounted display. In some embodiments, the one or more cameras are configured to determine the position, orientation, or position and orientation of the marker. In some embodiments, the one or more cameras are configured to determine one or more coordinates of the marker.

In some embodiments, the system is configured to track the one or more coordinates of the marker during movement of the marker.

In some embodiments, the one or more cameras are configured to determine one or more coordinates of the see-through head mounted display. In some embodiments, the system is configured to track the one or more coordinates of the see-through head mounted display during movement of the patient, movement of the see-through head mounted display, or movement of the patient and the see-through head mounted display.

In some embodiments, the physical surgical tool or physical surgical instrument is configured to effect a tissue removal in the patient. In some embodiments, the tissue removal is a removal of bone or a removal of cartilage or a removal of bone and cartilage.

In some embodiments, the marker is configured to reflect or emit light with a wavelength between 380 nm and 700 nm. In some embodiments, the marker is configured to reflect or emit light with a wavelength greater than 700 nm. In some embodiments, the marker is a radiofrequency marker, or wherein the marker is an optical marker, wherein the optical marker includes a geometric pattern.

In some embodiments, the system comprises one or more markers. In some embodiments, the one or more markers comprise at least one marker attached to the patient, at least one marker attached to the see-through head mounted display, at least one marker attached to a structure in the operating room or any combination thereof.

Aspects of the present disclosure describe novel systems, devices and methods for performing a surgical step or surgical procedure with visual guidance using a head mounted display, e.g. by displaying virtual representations of one or more of a virtual surgical tool, virtual surgical instrument including a virtual surgical guide or cut block, virtual trial implant, virtual implant component, virtual implant or virtual device, a predetermined start point, predetermined start position, predetermined start orientation or alignment, predetermined intermediate point(s), predetermined intermediate position(s), predetermined intermediate orientation or alignment, predetermined end point, predetermined end position, predetermined end orientation or alignment, predetermined path, predetermined plane, predetermined cut plane, predetermined contour or outline or cross-section or surface features or shape or projection, predetermined depth marker or depth gauge, predetermined stop, predetermined angle or orientation or rotation marker, predetermined axis, e.g. rotation axis, flexion axis, extension axis, predetermined axis of the virtual surgical tool, virtual surgical instrument including virtual surgical guide or cut block, virtual trial implant, virtual implant component, implant or device, non-visualized portions for one or more devices or implants or implant components or surgical instruments or surgical tools, and/or one or more of a predetermined tissue change or alteration, on a live patient. In some embodiments, the head mounted (HMD) is a see-through head mounted display. In some embodiments, an optical see through HMD is used. In some embodiments, a video see through HMD can be used, for example with a camera integrated into, attached to, or separate from the HMD, generating video feed.

In some embodiments, registration of one or more of HMDs, surgical site, joint, spine, surgical instruments or implant components can be performed using spatial mapping techniques.

In some embodiments, registration of one or more of HMDs, surgical site, joint, spine, surgical instruments or implant components can be performed using depth sensors.

In some embodiments, a virtual surgical guide, tool, instrument or implant can be superimposed onto the physical spine, portions thereof, or surgical site. Further, the physical guide, tool, instrument or implant can be aligned with the virtual surgical guide, tool, instrument or implant displayed or projected by the HMD. Thus, guidance in mixed reality environment does not need to use a plurality of virtual representations of the guide, tool, instrument or implant and does not need to compare the positions and/or orientations of the plurality of virtual representations of the virtual guide, tool, instrument or implant.

In some embodiments, the HMD can display one or more of a virtual surgical tool, virtual surgical instrument including a virtual surgical guide or virtual cut block, virtual trial implant, virtual implant component, virtual implant or virtual device, predetermined start point, predetermined start position, predetermined start orientation or alignment, predetermined intermediate point(s), predetermined intermediate position(s), predetermined intermediate orientation or alignment, predetermined end point, predetermined end position, predetermined end orientation or alignment, predetermined path, predetermined plane, predetermined cut plane, predetermined contour or outline or cross-section or surface features or shape or projection, predetermined depth marker or depth gauge, predetermined stop, predetermined angle or orientation or rotation marker, predetermined axis, e.g. rotation axis, flexion axis, extension axis, predetermined axis of the virtual surgical tool, virtual surgical instrument including virtual surgical guide or cut block, virtual trial implant, virtual implant component, implant or device, estimated or predetermined non-visualized portions for one or more devices or implants or implant components or surgical instruments or surgical tools, and/or one or more of a predetermined tissue change or alteration.

In some embodiments, the one or more of a virtual surgical tool, virtual surgical instrument including a virtual surgical guide or virtual cut block, virtual trial implant, virtual implant component, virtual implant or virtual device, predetermined start point, predetermined start position, predetermined start orientation or alignment, predetermined intermediate point(s), predetermined intermediate position(s), predetermined intermediate orientation or alignment, predetermined end point, predetermined end position, predetermined end orientation or alignment, predetermined path, predetermined plane, predetermined cut plane, predetermined contour or outline or cross-section or surface features or shape or projection, predetermined depth marker or depth gauge, predetermined stop, predetermined angle or orientation or rotation marker, predetermined axis, e.g. rotation axis, flexion axis, extension axis, predetermined axis of the virtual surgical tool, virtual surgical instrument including virtual surgical guide or cut block, virtual trial implant, virtual implant component, implant or device, estimated or predetermined non-visualized portions for one or more devices or implants or implant components or surgical instruments or surgical tools, and/or one or more of a predetermined tissue change or alteration can be displayed by the HMD at one or more predetermined coordinates, e.g. indicating a predetermined position predetermined orientation or combination thereof for superimposing and/or aligning a physical surgical tool, physical surgical instrument, physical implant, or a physical device.

In some embodiments, one or more of a virtual surgical tool, virtual surgical instrument including a virtual surgical guide or virtual cut block, virtual trial implant, virtual implant component, virtual implant or virtual device, predetermined start point, predetermined start position, predetermined start orientation or alignment, predetermined intermediate point(s), predetermined intermediate position(s), predetermined intermediate orientation or alignment, predetermined end point, predetermined end position, predetermined end orientation or alignment, predetermined path, predetermined plane, predetermined cut plane, predetermined contour or outline or cross-section or surface features or shape or projection, predetermined depth marker or depth gauge, predetermined stop, predetermined angle or orientation or rotation marker, predetermined axis, e.g. rotation axis, flexion axis, extension axis, predetermined axis of the virtual surgical tool, virtual surgical instrument including virtual surgical guide or cut block, virtual trial implant, virtual implant component, implant or device, estimated or predetermined non-visualized portions for one or more devices or implants or implant components or surgical instruments or surgical tools, and/or one or more of a predetermined tissue change or alteration displayed by the HMD can be a placement indicator for one or more of a physical surgical tool, physical surgical instrument, physical implant, or a physical device.

Any of a position, location, orientation, alignment, direction, speed of movement, force applied of a surgical instrument or tool, virtual and/or physical, can be predetermined using, for example, pre-operative imaging studies, pre-operative data, pre-operative measurements, intra-operative imaging studies, intra-operative data, and/or intra-operative measurements.

Any of a position, location, orientation, alignment, sagittal plane alignment, coronal plane alignment, axial plane alignment, rotation, slope of implantation, angle of implantation, flexion of implant component, offset, anteversion, retroversion, and position, location, orientation, alignment relative to one or more anatomic landmarks, position, location, orientation, alignment relative to one or more anatomic planes, position, location, orientation, alignment relative to one or more anatomic axes, position, location, orientation, alignment relative to one or more biomechanical axes, position, location, orientation, alignment relative to a mechanical axis of a trial implant, an implant component or implant, virtual and/or physical, can be predetermined using, for example, pre-operative imaging studies, pre-operative data, pre-operative measurements, intra-operative imaging studies, intra-operative data, and/or intra-operative measurements. Intra-operative measurements can include measurements for purposes of registration, e.g. of a joint, a spine, a surgical site, a bone, a cartilage, a HMD, a surgical tool or instrument, a trial implant, an implant component or an implant.

In some embodiments throughout the specification, measurements can include measurements of coordinate(s) or coordinate information. A coordinate can be a set of numbers used in specifying the location of a point on a line, on a surface, or in space, e.g. x, y, z. Coordinate can be predetermined, e.g. for a virtual surgical guide.

In some embodiments, multiple coordinate systems can be used instead of a common or shared coordinate system. In this case, coordinate transfers can be applied from one coordinate system to another coordinate system, for example for registering the HMD, live data of the patient including the surgical site, virtual instruments and/or virtual implants and physical instruments and physical implants.

Head Mounted Displays

In some embodiments, head mounted displays (HMDs) can be used. Head mounted displays can be of non-see through type (such as the Oculus VR HMD (Facebook, San Mateo, CA)), optionally with a video camera to image the live data of the patient as a video-see through head mounted display, or they can be of optical see through type as an optical see-through head mounted display or see-through optical head mounted display.

A head mounted display can include a first display unit for the left eye and a second display unit for the right eye. The first and second display units can be transparent, semi-transparent or non-transparent. The system, comprising, for example, the head mounted display, one or more computer processors and/or an optional marker attached to the patient, can be configured to generate a first view of virtual data, e.g. a virtual surgical guide, for the first display unit and a second view of virtual data, e.g. a virtual surgical guide, for the second display unit. The virtual data can be a placement indicator for a physical surgical tool, physical surgical instrument, physical implant or physical device. The virtual data, e.g. a virtual surgical guide, can be a three-dimensional digital representation at one or more predetermined coordinates indicating, for example, a predetermined position, predetermined orientation or combination thereof for superimposing and/or aligning a physical surgical tool, physical surgical instrument, physical implant or physical device.

The system can be configured to generate a first view displayed by a first display unit (e.g. for the left eye) and a second view displayed by a second display unit (e.g. for the right eye), wherein the first view and the second view create a 3D stereoscopic view of the virtual data, e.g. a virtual surgical guide, which can optionally be based on one or more predetermined coordinates. The system can be configured to display the 3D stereoscopic view by the head mounted display onto the patient.

In some embodiments, a pair of glasses is utilized. The glasses can include an optical head-mounted display. An optical see-through head-mounted display (OHMD) can be a wearable display that has the capability of reflecting projected images as well as allowing the user to see through it. Various types of OHMDs known in the art can be used in order to practice embodiments of the present disclosure. These include curved mirror or curved combiner OHMDs as well as wave-guide or light-guide OHMDs. The OHMDs can optionally utilize diffraction optics, holographic optics, polarized optics, and reflective optics.

Traditional input devices that can be used with the HMDs include, but are not limited to touchpad or buttons, smartphone controllers, speech recognition, and gesture recognition. Advanced interfaces are possible, e.g. a brain-computer interface.

Optionally, a computer or server or a workstation can transmit data to the HMD. The data transmission can occur via cable, Bluetooth, WiFi, optical signals and any other method or mode of data transmission known in the art. The HMD can display virtual data, e.g. virtual data of the patient, in uncompressed form or in compressed form. Virtual data of a patient can optionally be reduced in resolution when transmitted to the HMD or when displayed by the HMD.

When virtual data are transmitted to the HMD, they can be in compressed form during the transmission. The HMD can then optionally decompress them so that uncompressed virtual data are being displayed by the HMD.

Alternatively, when virtual data are transmitted to the HMD, they can be of reduced resolution during the transmission, for example by increasing the slice thickness of image data prior to the transmission. The HMD can then optionally increase the resolution, for example by re-interpolating to the original slice thickness of the image data or even thinner slices so that virtual data with resolution equal to or greater than the original virtual data or at least greater in resolution than the transmitted data are being displayed by the HMD.

In some embodiments, the HMD can transmit data back to a computer, a server or a workstation. Such data can include, but are not limited to:

Positional, orientational or directional information about the HMD or the operator or surgeon wearing the HMD Changes in position, orientation or direction of the HMD Data generated by one or more IMU's Data generated by markers (radiofrequency, optical, light, other) attached to, integrated with or coupled to the HMD Data generated by a surgical navigation system attached to, integrated with or coupled to the HMD Data generated by an image and/or video capture system attached to, integrated with or coupled to the HMD Parallax data, e.g. using two or more image and/or video capture systems attached to, integrated with or coupled to the HMD, for example one positioned over or under or near the left eye and a second positioned over or under or near the right eye Distance data, e.g. parallax data generated by two or more image and/or video capture systems evaluating changes in distance between the HMD and a surgical field or an object Motion parallax data Data related to calibration or registration phantoms (see other sections of this specification)

Any type of live data of the patient captured by the HMD including image and/or video capture systems attached to, integrated with or coupled to the HMD For example, alterations to a live surgical site For example, use of certain surgical instruments detected by the image and/or video capture system For example, use of certain medical devices or trial implants detected by the image and/or video capture system Any type of modification to a surgical plan Portions or aspects of a live surgical plan Portions or aspects of a virtual surgical plan Radiofrequency tags used throughout the embodiments can be of active or passive kind with or without a battery.

Exemplary optical see-through head mounted displays include the ODG R-7, R-8 and R-8 smart glasses from ODG (Osterhout Group, San Francisco, CA), the NVIDIA 942 3-D vision wireless glasses (NVIDIA, Santa Clara, CA) the Microsoft Hololens and Hololens 2 (Microsoft, Redmond, WI), the Daqri Smart Glass (Daqri, Los Angeles, CA) the Meta2 (Meta Vision, San Mateo, CA), the Moverio BT-300 (Epson, Suwa, Japan), the Blade 3000 and the Blade M300 (Vuzix, West Henrietta, NY), and the Lenovo ThinkA6 (Lenovo, Beijing, China). The Microsoft Hololens is manufactured by Microsoft. It is a pair of augmented reality smart glasses. Hololens is a see-through optical head mounted display (or optical see through head mounted display). Hololens can use the Windows 10 operating system. The front portion of the Hololens includes, among others, sensors, related hardware, several cameras and processors. The visor includes a pair of transparent combiner lenses, in which the projected images are displayed. The Hololens can be adjusted for the interpupillary distance (IPD) using an integrated program that recognizes gestures. A pair of speakers is also integrated. The speakers do not exclude external sounds and allow the user to hear virtual sounds. A USB 2.0 micro-B receptacle is integrated. A 3.5 mm audio jack is also present. The Hololens has an inertial measurement unit (IMU) with an accelerometer, gyroscope, and a magnetometer, four environment mapping sensors/cameras (two on each side), a depth camera with a 120°×120° angle of view, a 2.4-megapixel photographic video camera, a four-microphone array, and an ambient light sensor. Hololens has an Intel Cherry Trail SoC containing the CPU and GPU. Hololens includes also a custom-made Microsoft Holographic Processing Unit (HPU). The SoC and the HPU each have 1 GB LPDDR3 and share 8 MB SRAM, with the SoC also controlling 64 GB eMMC and running the Windows 10 operating system. The HPU processes and integrates data from the sensors, as well as handling tasks such as spatial mapping, gesture recognition, and voice and speech recognition. Hololens includes a IEEE 802.11ac Wi-Fi and Bluetooth 4.1 Low Energy (LE) wireless connectivity. The headset uses Bluetooth LE and can connect to a clicker, a finger-operating input device that can be used for selecting menus and functions.

A number of applications are available for Microsoft Hololens, for example a catalogue of holograms, HoloStudio, 3D modelling application by Microsoft with a 3D print capability, Autodesk Maya 3D creation application, FreeForm, integrating Hololens with the Autodesk Fusion 360 cloud-based 3D development application, and others. HoloLens utilizing the HPU can employ sensual and natural interface commands-voice, gesture, and gesture. Gaze commands, e.g. head-tracking, allows the user to bring application focus to whatever the user is perceiving. Any virtual application or button can be selected using an air tap method, similar to clicking a virtual computer mouse. The tap can be held for a drag simulation to move a display. Voice commands can also be utilized. The Hololens shell utilizes many components or concepts from the Windows desktop environment. A bloom gesture for opening the main menu is performed by opening one's hand, with the palm facing up and the fingers spread. Windows can be dragged to a particular position, locked and/or resized. Virtual windows or menus can be fixed at locations or physical objects. Virtual windows or menus can move with the user or can be fixed in relationship to the user. Or they can follow the user as he or she moves around. The Microsoft Hololens App for Windows 10 PC's and Windows 10 Mobile devices can be used by developers to run apps and to view live stream from the Hololens user's point of view, and to capture augmented reality photos and videos. Almost all Universal Windows Platform apps can run on Hololens. These apps can be projected in 2D. Select Windows 10 APIs are currently supported by Hololens. Hololens apps can also be developed on Windows 10 PC's. Holographic applications can use Windows Holographic APIs. Unity (Unity Technologies, San Francisco, CA) and Vuforia (PTC, Inc., Needham, MA) are some apps that can be utilized. Applications can also be developed using DirectX and Windows API's.

Many of the embodiments throughout the specification can be implemented also using non-see-through head mounted displays, e.g. virtual reality head mounted displays. Non-see through head mounted displays can be used, for example, with one or more image or video capture systems (e.g. cameras) or 3D scanners to image the live data of the patient, e.g. a skin, a subcutaneous tissue, a surgical site, an anatomic landmark, an organ, or an altered tissue, e.g. a surgically altered tissue, as well as any physical surgical tools, instruments, devices and/or implants, or portions of the surgeon's body, e.g. his or her fingers, hands or arms. Non see through HMDs can be used, for example, for displaying virtual data, e.g. pre- or intra-operative imaging data of the patient, virtual surgical guides, virtual tools, virtual instruments, virtual implants and/or virtual implants, for example together with live data of the patient, e.g. from the surgical site, imaged through the one or more cameras or video or image capture systems or 3D scanners, for knee replacement surgery, hip replacement surgery, shoulder replacement surgery, ankle replacement surgery, spinal surgery, e.g. spinal fusion, brain surgery, heart surgery, lung surgery, liver surgery, spleen surgery, kidney surgery vascular surgery or procedures, prostate, genitourinary, uterine or other abdominal or pelvic surgery, and trauma surgery. Exemplary non-see through head mounted displays, e.g. virtual reality head mounted displays, are, for example, the Oculus Rift (Google, Mountain View, CA), the HTC Vive (HTC, Taipei, Taiwan) and the Totem (Vrvana, Apple, Cupertino, CA).

Computer Graphics Viewing Pipeline

In some embodiments, the head mounted display uses a computer graphics viewing pipeline that consists of the following steps to display 3D objects or 2D objects positioned in 3D space or other computer-generated objects and models:

1. Registration
2. View projection

Registration:

In some embodiments, the different objects to be displayed by the HMD computer graphics system (for instance virtual anatomical models, virtual models of instruments, geometric and surgical references and guides) are initially all defined in their own independent model coordinate system. During the registration process, spatial relationships between the different objects are defined, and each object is transformed from its own model coordinate system into a common global coordinate system. Different techniques that are described below can be applied for the registration process.

For augmented reality HMDs that superimpose computer-generated objects with live views of the physical environment, the global coordinate system is defined by the environment. A process called spatial mapping, described below, creates a computer representation of the environment that allows for merging and registration with the computer-generated objects, thus defining a spatial relationship between the computer-generated objects and the physical environment.

View Projection:

In some embodiments, once all objects to be displayed have been registered and transformed into the common global coordinate system, they are prepared for viewing on a display by transforming their coordinates from the global coordinate system into the view coordinate system and subsequently projecting them onto the display plane. This view projection step can use the viewpoint and view direction to define the transformations applied in this step. For stereoscopic displays, such as an HMD, two different view projections can be used, one for the left eye and the other one for the right eye. For see-through HMDs (augmented reality HMDs) the position of the viewpoint and view direction relative to the physical environment can be known in order to correctly superimpose the computer-generated objects with the physical environment. As the viewpoint and view direction change, for example due to head movement, the view projections are updated so that the computer-generated display follows the new view.

Positional Tracking Systems

In some embodiments, the position and/or orientation of the HMDs can be tracked. For example, in order to calculate and update the view projection of the computer graphics view pipeline as described in the previous section and to display the computer-generated overlay images in the HMD, the view position and direction needs to be known.

Different methods to track the HMDs can be used. For example, the HMDs can be tracked using outside-in tracking. For outside-in tracking, one or more external sensors or cameras can be installed in a stationary location, e.g. on the ceiling, the wall or on a stand. The sensors or camera capture the movement of the HMDs, for example through shape detection or markers attached to the HMDs or the user's head. The sensor data or camera image is typically processed on a central computer to which the one or more sensors or cameras are connected. The tracking information obtained on the central computer can then be used to compute the view projection for the HMD (including multiple HMDs). The view projection can be computed on the central computer or on the HMD. Outside-in tracking can be performed with use of surgical navigation system using, for example, infrared and/or RF markers, active and/or passive markers. One or more external infrared or RF emitters and receivers or cameras can be installed in a stationary location, e.g. on the ceiling, the wall or a stand or attached to the OR table. One or more infrared and/or RF markers, active and/or passive markers can be applied to the HMD for tracking the coordinates and/or the position and/or orientation of the HMD. One or more infrared and/or RF markers, active and/or passive markers can be applied to the anatomic structure or near the anatomic structure tracking the coordinates and/or the position and/or orientation of the anatomic structure. One or more infrared and/or RF markers, active and/or passive markers can be applied to a physical tool, physical instrument, physical implant or physical device tracking the coordinates and/or the position and/or orientation of the physical tool, physical instrument, physical implant or physical device. One or more infrared and/or RF markers, active and/or passive markers can be applied to the surgeon.

In any of the embodiments, a surgical navigation system can be used as known in the art, e.g. for registering a patient, one or more instruments, one or more implants or devices, one or more OHMDs in a coordinate system. Navigation systems known in the art include, for example, Medtronic Stealth Station (Medtronic Minneapolis, MN), for example in combination with a patient imaging system such as the Medtronic O-arm (Medtronic Minneapolis, MN), Brainlab navigation (Brainlab, Munich, Germany), and Stryker nav3i (Stryker, Kalamazoo, MI). Navigation systems can be used for outside-in tracking of anatomic structures, e.g. spinal structures, instruments, spinal rods, inserters, interbody devices, robots, robotic arms, end effectors, and/or HMDs.

In some embodiments, outside-in tracking can be performed with use of an image capture or video capture system using, for example, optical markers, e.g. with geometric patterns. One or more external cameras can be installed in a stationary location, e.g. on the ceiling, the wall or a stand or attached to the OR table. One or more optical markers can be applied to the HMD for tracking the coordinates and/or the position and/or orientation of the HMD. One or more optical markers can be applied to the anatomic structure or near the anatomic structure tracking the coordinates and/or the position and/or orientation of the anatomic structure. One or more optical markers can be applied to a physical tool, physical instrument, physical implant or physical device tracking the coordinates and/or the position and/or orientation of the physical tool, physical instrument, physical implant or physical device. One or more optical markers can be applied to the surgeon.

In some embodiments, including for outside-in and inside-out tracking, a camera, image capture or video capture system can detect light from the spectrum visible to the human eye, e.g. from about 380 to 750 nanometers wavelength, or from about 400 to 720 nanometers wavelength, or from about 420 to 680 nanometers wavelength, or similar combinations. In embodiments throughout the specification, including for outside-in and inside-out tracking, a camera, image capture or video capture system can detect light from the spectrum not visible to the human eye, e.g. from the infrared spectrum, e.g. from 700 nm or above to, for example, 1 mm wavelength, 720 nm or above to, for example, 1 mm wavelength, 740 nm or above to, for example, 1 mm wavelength, or similar combinations. In embodiments throughout the specification, including for outside-in and inside-out tracking, a camera, image capture or video capture system can detect light from the spectrum visible and from the spectrum not visible to the human eye.

In some embodiments, including for outside-in and inside-out tracking, a marker, e.g. a marker with a geometric pattern and/or a marker used with a navigation system, can be configured to reflect or emit light from the spectrum visible to the human eye, e.g. from about 380 to 750 nanometers wavelength, or from about 400 to 720 nanometers wavelength, or from about 420 to 680 nanometers wavelength, or similar combinations. In embodiments throughout the specification, including for outside-in and inside-out tracking, a marker, e.g. a marker with a geometric pattern and/or a marker used with a navigation system, can be configured to reflect or emit light from the spectrum not visible to the human eye, e.g. from the infrared spectrum, e.g. from 700 nm or above to, for example, 1 mm wavelength, 720 nm or above to, for example, 1 mm wavelength, 740 nm or above to, for example, 1 mm wavelength, or similar combinations. In embodiments throughout the specification, including for outside-in and inside-out tracking, a marker, e.g. a marker with a geometric pattern and/or a marker used with a navigation system, can be configured to reflect or emit light from the spectrum visible and from the spectrum not visible to the human eye.

In some embodiments, outside-in tracking can be performed with use of a 3D scanner or a laser scanner. One or more external 3D scanners or laser scanners can be installed in a stationary location, e.g. on the ceiling, the wall or a stand or attached to the OR table. The 3D scanner or laser scanner can be used to track objects directly, e.g. the HMD, the anatomic structure, the physical tool, physical instrument, physical implant or physical device or the surgeon. Optionally, markers can be applied to one or more of the HMD, the anatomic structure, the physical tool, physical instrument, physical implant or physical device or the surgeon for tracking any of the foregoing using the 3D scanner or laser scanner.

In some embodiments, the inside-out tracking method can be employed. One or more sensors or cameras can be attached to the HMD or the user's head or integrated with the HMD. The sensors or cameras can be dedicated to the tracking functionality. The cameras attached or integrated into the HMD can include infrared cameras. Infrared LED's or emitters can also be included in the HMD. The sensors or cameras attached or integrated into the HMD can include an image capture system, a video capture system, a 3D scanner, a laser scanner, a surgical navigation system or a depth camera. In some embodiments, the data collected by the sensors or cameras is used for positional tracking as well as for other purposes, e.g. image recording or spatial mapping. Information gathered by the sensors and/or cameras is used to determine the HMD's position and orientation in 3D space. This can be done, for example, by detecting optical, infrared, RF or electromagnetic markers attached to the external environment. Changes in the position of the markers relative to the sensors or cameras are used to continuously determine the position and orientation of the HMD. Data processing of the sensor and camera information can be performed by a mobile processing unit attached to or integrated with the HMD, which can allow for increased mobility of the HMD user as compared to outside-in tracking. Alternatively, the data can be transmitted to and processed on the central computer.

Inside-out tracking can also utilize markerless techniques. For example, spatial mapping data acquired by the HMD sensors can be aligned with a virtual model of the environment, thus determining the position and orientation of the HMD in the 3D environment. Alternatively, or additionally, information from inertial measurement units can be used. Potential advantages of inside-out tracking include greater mobility for the HMD user, a greater field of view not limited by the viewing angle of stationary cameras and reduced or eliminated problems with marker occlusion.

Measuring Location, Orientation, Acceleration

The location, orientation, and acceleration of the human head, portions of the human body, e.g. hands, arms, legs or feet, as well as portions of the patient's body, e.g. the patient's head or extremities, including the hip, knee, ankle, foot, shoulder, elbow, hand or wrist and any other body part, can, for example, be measured with a combination of gyroscopes and accelerometers. In select applications, magnetometers may also be used. Such measurement systems using any of these components can be defined as inertial measurement units (IMU).

As used herein, the term IMU can relate to an electronic device that can measure and transmit information on a body's specific force, angular rate, and, optionally, the magnetic field surrounding the body, using a combination of accelerometers and gyroscopes, and, optionally, magnetometers. An IMU or components thereof can be coupled with or registered with a navigation system or a robot, for example by registering a body or portions of a body within a shared coordinate system. Optionally, an IMU can be wireless, for example using WiFi networks or Bluetooth networks.

Pairs of accelerometers extended over a region of space can be used to detect differences (gradients) in the proper accelerations of frames of references associated with those points. Single- and multi-axis models of accelerometer are available to detect magnitude and direction of the acceleration, as a vector quantity, and can be used to sense orientation (because direction of weight changes), coordinate acceleration (so long as it produces g-force or a change in g-force), vibration, shock. Micromachined accelerometers can be utilized in some embodiments to detect the position of the device or the operator's head.

Piezoelectric, piezoresistive and capacitive devices can be used to convert the mechanical motion into an electrical signal. Piezoelectric accelerometers rely on piezoceramics or single crystals Piezoresistive accelerometers can also be utilized. Capacitive accelerometers typically use a silicon micro-machined sensing element.

Accelerometers used in some of the embodiments can include small micro electro-mechanical systems (MEMS), consisting, for example, of little more than a cantilever beam with a proof mass. Optionally, the accelerometer can be integrated in the optical head mounted devices and both the outputs from the eye tracking system and the accelerometer (s) can be utilized for command execution.

With an IMU, the following exemplary information can be captured about the operator and the patient and respective body parts including a moving joint: Speed, velocity, acceleration, position in space, positional change, angular orientation, change in angular orientation, alignment, orientation, and/or direction of movement and or speed of movement (e.g. through sequential measurements). Operator and/or patient body parts about which such information can be transmitted by the IMU include, but are not limited to: head, chest, trunk, shoulder, elbow, wrist, hand, fingers, arm, hip, knee, ankle, foot, toes, leg, inner organs, e.g. brain, heart, lungs, liver, spleen, bowel, bladder, etc.

Any number of IMUs can be placed on the HMD, the operator and/or the patient and, optionally, these IMUs can be cross-referenced to each other within a single or multiple coordinate systems or, optionally, they can be cross-referenced in relationship to an HMD, a second and third or more HMDs, a navigation system or a robot and one or more coordinate systems used by such navigation system and/or robot. A navigation system can be used in conjunction with an HMD without the use of an IMU. For example, navigation markers including infrared markers, retroreflective markers, RF markers can be attached to an HMD and, optionally, portions or segments of the patient or the patient's anatomy. The HMD and the patient or the patient's anatomy can be cross-referenced in this manner or registered in one or more coordinate systems used by the navigation system and movements of the HMD or the operator wearing the HMD can be registered in relationship to the patient within these one or more coordinate systems.

Once the virtual data and the live data of the patient and the HMD are registered in the same coordinate system, e.g. using IMUs, optical markers, navigation markers including infrared markers, retroreflective markers, RF markers, and any other registration method described in the specification or known in the art, any change in position of any of the HMD in relationship to the patient measured in this fashion can be used to move virtual data of the patient in relationship to live data of the patient, so that the visual image of the virtual data of the patient and the live data of the patient seen through the HMD are always aligned, irrespective of movement of the HMD and/or the operator's head and/or the operator wearing the HMD. Similarly, when multiple HMDs are used, e.g. one for the primary surgeon and additional ones, e.g. two, three, four or more, for other surgeons, assistants, residents, fellows, nurses and/or visitors, the HMDs worn by the other staff, not the primary surgeon, will also display the virtual representation(s) of the virtual data of the patient aligned with the corresponding live data of the patient seen through the HMD, wherein the perspective of the virtual data that is with the patient and/or the surgical site for the location, position, and/or orientation of the viewer's eyes for each of the HMDs used and each viewer. The foregoing embodiments can be achieved since the IMU's, optical markers, RF markers, infrared markers and/or navigation markers placed on the operator and/or the patient as well as any spatial anchors can be registered in the same coordinate system as the primary HMD and any additional HMDs. The position, orientation, alignment, and change in position, orientation and alignment in relationship to the patient and/or the surgical site of each additional HMD can be individually monitored thereby maintaining alignment and/or superimposition of corresponding structures in the live data of the patient and the virtual data of the patient for each additional HMD irrespective of their position, orientation, and/or alignment in relationship to the patient and/or the surgical site.

Fusing Physical World with Imaging and Other Data of a Patient

In some embodiments, an operator such as a surgeon may look through an HMD observing physical data or information on a patient, e.g. a surgical site or changes induced on a surgical site, while pre-existing data of the patient are superimposed onto the physical visual representation of the live patient. Systems, methods and techniques to improve the accuracy of the display of the virtual data superimposed onto the live data of the patient are described in Patent Application No. PCT/US2018/012459, which is incorporated herein by reference in its entirety. The pre-existing data of the patient can be an imaging test or imaging data or other types of data including metabolic information or functional information.

The pre-existing data of the patient including one or more imaging tests or other types of data including metabolic or functional information can be obtained at a time different from the time of the surgical procedure. For example, the pre-existing data of the patient can be obtained one, two, three or more days or weeks prior to the surgical procedure.

The pre-existing data of the patient including one or more imaging tests or other types of data including metabolic or functional information are typically obtained with the patient or the surgical site being located in a different location or a different object coordinate system in the pre-existing data when compared to the location or the object coordinate system of the live patient or the surgical site in the live patient. Thus, pre-existing data of the patient or the surgical site are typically located in a first object coordinate system and live data of the patient or the surgical site are typically located in a second object coordinate systems; the first and the second object coordinate system are typically different from each other. The first object coordinate system with the pre-existing data needs to be registered with the second object coordinate system with the live data of the patient including, for example, the live surgical site.

Scan Technology

The following is an exemplary list of scanning and imaging techniques that can be used or applied for various aspects of the present disclosure; this list is not exhaustive, but only exemplary. Anyone skilled in the art can identify other scanning or imaging techniques that can be used in practicing the present disclosure: X-ray imaging, 2D, 3D, supine, upright or in other body positions and poses, including analog and digital x-ray imaging; Digital tomosynthesis; Cone beam CT; Ultrasound; Doppler ultrasound; Elastography, e.g. using ultrasound or MRI; CT; MRI, including, for example, fMRI, diffusion imaging, stroke imaging, MRI with contrast media; Functional MRI (fMRI), e.g. for brain imaging and functional brain mapping; Magnetic resonance spectroscopy; PET; SPECT-CT; PET-CT; PET-MRI; Upright scanning, optionally in multiple planes or in 3D using any of the foregoing modalities, including x-ray imaging, ultrasound etc.; Contrast media (e.g. iodinated contrast agents for x-ray and CT scanning, or MRI contrast agents; contrast agents can include antigens or antibodies for cell or tissue specific targeting; other targeting techniques, e.g. using liposomes, can also be applied; molecular imaging, e.g. to highlight metabolic abnormalities in the brain and target surgical instruments towards area of metabolic abnormality; any contrast agent known in the art can be used in conjunction with the present disclosure); 3D optical imaging, including Laser scanning, Confocal imaging, e.g. including with use of fiberoptics, single bundle, multiple bundle, Confocal microscopy, e.g. including with use of fiberoptics, single bundle, multiple bundles, Optical coherence tomography, Photogrammetry, Stereovision (active or passive), Triangulation (active or passive), Interferometry, Phase shift imaging, Active wavefront sampling, Structured light imaging, Other optical techniques to acquire 3D surface information, Combination of imaging data, e.g. optical imaging, wavefront imaging, interferometry, optical coherence tomography and/or confocal laser imaging or scanning, Image fusion or co-display of different imaging modalities, e.g. in 2D or 3D, optionally registered, optionally more than two modalities combined, fused or co-displayed, e.g. optical imaging, e.g. direct visualization or through an arthroscope, and/or laser scan data, e.g. direct visualization or through an arthroscope, and/or virtual data, e.g. intra-articular, extra-articular, intra-osseous, hidden, not directly visible, and/or external to skin, and/or confocal imaging or microscopy images/data, e.g. direct visualization or through an arthroscope. For a detailed description of illustrative scanning and imaging techniques, see for example, Bushberg et al. The Essential Physics of Medical Imaging, $3^{rd}$ edition, Wolters, Kluwer, Lippincott, 2012.

In some embodiments, 3D scanning can be used for imaging of the patient and/or the surgical site and/or anatomic landmarks and/or pathologic structures and/or tissues (e.g. damaged or diseased cartilage or exposed subchondral bone) and/or the surgeon's hands and/or fingers and/or the OR table and/or reference areas or points and/or marker, e.g. optical markers, in the operating room and/or on the patient and/or on the surgical field. In some embodiments, optical imaging and/or 3D scanning can be used for tracking, e.g. in a coordinate system, physical surgical tools, instruments, and/or implants/devices, e.g. a spinal rod, spinal screws, interbody devices etc. 3D scanning can be accomplished with multiple different modalities including combinations thereof, for example, optical imaging, e.g. using a video or image capture system integrated into, attached to, or separate from one or more HMDs, laser scanning, confocal imaging, optical coherence tomography, photogrammetry, active and passive stereovision and triangulation, interferometry and phase shift principles and/or imaging, wavefront sampling and/or imaging. One or more optical imaging systems or 3D scanners can, for example, be used to image and/or monitor, e.g. the coordinates, position, orientation, alignment, direction of movement, speed of movement of,
- Anatomic landmarks, patient surface(s), organ surface(s), tissue surface(s), pathologic tissues and/or surface(s), e.g. for purposes of registration, e.g. of the patient and/or the surgical site, e.g. one or more bones or cartilage, and/or one or more HMDs, e.g. in a common coordinate system
- The surgeon's hands and/or fingers, e.g. for
  - Monitoring steps in a surgical procedure. Select hand and/or finger movements can be associated with corresponding surgical steps. When the 3D scanner system detects a particular hand and/or finger movement, it can trigger the display of the corresponding surgical step or the next surgical step, e.g. by displaying a predetermined virtual axis, e.g. a reaming, broaching or drilling axis, a virtual cut plane, a virtual instrument, a virtual implant component etc.
  - Executing virtual commands, e.g. using gesture recognition or a virtual interface, e.g. a virtual touch pad
- One or more HMDs, e.g. registered in a common coordinate system, e.g. with the surgical site and/or the surgeon's hands and/or fingers The use of optical imaging systems and/or 3D scanners for registration, e.g. of the surgical site and/or one or more HMDs can be helpful when markerless registration is desired, e.g. without use of optical markers, e.g. with geometric patterns, and/or IMUs, and/or LEDs, and/or navigation markers. The use of optical imaging systems and/or 3D scanners for registration can also be combined with the use of one or more of optical markers, e.g. with geometric patterns, and/or IMUs, and/or LEDs, and/or navigation markers.

In some embodiments, one or more 3D models and/or 3D surfaces generated by an optical imaging system and/or a 3D scanner can be registered with, superimposed with and/or aligned with one or more 3D models and/or 3D surfaces generated by another imaging test, e.g. a CT scan, MRI scan, PET scan, other scan, or combinations thereof, and/or a 3D model and/or 3D surfaces generated from or derived from an x-ray or multiple x-rays, e.g. using bone morphing technologies, as described in the specification or known in the art.

With optical imaging systems or 3D scanners, a virtual 3D model can be reconstructed by postprocessing single images, e.g. acquired from a single perspective. In this case, the reconstruction cannot be performed in real time with continuous data capture. Optical imaging systems or 3D scanners can also operate in real time generating true 3D data.

In some embodiments, virtual data of a patient can be superimposed onto live data seen through the head mounted display. The virtual data can be raw data in unprocessed form, e.g. preoperative images of a patient, or they can be processed data, e.g. filtered data or segmented data.

Data Segmentation

When images of the patient are superimposed onto live data seen through the head mounted display, in many embodiments image segmentation can be desirable. Any known algorithm in the art can be used for this purpose, for example thresholding, seed point techniques, live wire, deformable models, statistical models, active shape models, level set methods, marching cubes algorithms, artificial neural networks, deep learning techniques, or combinations thereof and the like. Many of these algorithms are available is part of open-source or commercial libraries, for instance the Insight Segmentation and Registration Toolkit (ITK), the Open Source Computer Vision Library OpenCV, G'MIC (GREYC's Magic for Image Computing), Caffe, or MAT-LAB (MathWorks, Natick, Mass.).

Software and Algorithms for Registration

Registration of virtual data with live data can be performed using a variety of techniques know in the art. These include, but are not limited to, surface registration algorithms such as the Iterative Closest Point algorithm, statistical models, Active Shape Models, mutual information-based or other volume registration algorithms, object recognition, pattern recognition or computer vision techniques, deep learning or other artificial intelligence methods. The processed data can, for example, consist of mesh data, parametric surface data, point cloud data, volume data or a combination thereof. These methods are known in the art and have been implemented in publicly and/or commercially available code libraries and application programming interfaces (APIs), such as the Insight Segmentation and Registration Toolkit (ITK), the open-source computer vision library OpenCV, Elastix, Plastimatch, or the Medical Image Registration Toolkit (MIRTK).

Superimposition of Virtual Data and Live Data by the HMD

In some embodiments, segmented data or raw data can be superimposed on the patient's live data seen through the head mounted display. This superimposition can occur in unregistered form, i.e. the patient's virtual data may not be aligned with the live data seen through the head mounted display. In this case, the operator who is wearing the HMD may move his/her head in a direction of orientation that will superimpose corresponding features of virtual data and live patient data. The surgeon or operator can also move and re-orient the virtual data using other means, e.g. a trackball or a virtual display interface displayed in the HMD, unrelated to the surgeon/operator head movement, and/or gaze tracking. The operator can adjust the magnification of the live data so that the size, shape, length, thickness of certain features of the virtual data matches that of the live data for a given distance to the object/patient. In some embodiments, an HMD can superimpose and align virtual structures or objects, e.g. a virtual spinal rod or a virtual interbody device or portions thereof, onto corresponding physical structures or objects, e.g. a physical spinal rod or a physical interbody device or portions thereof. Superimposition or alignment can be facilitated, for example, by registering virtual and/or physical structures or objects in a coordinate system, e.g. the same coordinate system.

For example, during spine surgery, the surgeon may visually look at the exposed spine of the patient. The HMD can display a virtual 3D model of the spine of the patient or of virtual tools, instruments, and/or devices, e.g. a spinal rod, spinal screws, rod receiving portions of the screw head, one or more interbody devices. The surgeon can optionally adjust the magnification of the 3D model so that the model will match the size or width or the length of the corresponding physical structures. The surgeon can optionally adjust the transparency or opacity of the virtual data displayed in the HMD. Any combination of transparency or opacity of virtual data is possible. The surgeon can move his/her head in a direction or orientation that will superimpose virtual features, e.g. the patient's spine, with the live spine.

Once the data have been superimposed, the surgeon can optionally register the virtual data with the physical anatomy. This registration can be as simple as described here, e.g. a visual confirmation from the surgeon that virtual and live data are substantially matching or substantially superimposed. At this time, the surgeon can optionally reference the virtual data and/or the coordinate system of the virtual data in 2, 3 or more dimensions with the physical anatomy and/or the coordinate system of the physical anatomy. Once the data are registered, the surgeon can move his/her head into any desired position or orientation, for example for viewing the patient's spine or a lesion and adjacent, e.g. sensitive, anatomy from different view angles. An IMU of the HMD can track the head movement, the direction of the head movement, the new head position and head orientation. The change in location and orientation of the surgeon's head can be simultaneously or, if desired, non-simultaneously applied to the virtual data which can now be superimposed with the resultant new position and orientation in relationship to the physical anatomy. Similarly, virtual instruments, tools, devices can be superimposed and/or aligned with corresponding physical instruments, tools, devices in this manner. In addition, when the surgeon moves his/her head or body further away from the target anatomy, the change in position and the increase in distance from the target anatomy can be measured by an IMU. Depending on the distance from the IMU, a magnification or minification factor can be applied to the virtual data so that the size, shape and dimensions of the virtual data will, in some embodiments, be close to or match the size, shape and dimensions of the live data, irrespective of the distance, location and orientation of the surgeon's head.

The virtual data can be registered with the physical structures (e.g. anatomic structures, tools, instruments, devices) seen through the head mounted display. The registration can occur using any method known in the art for registering or cross-referencing virtual and physical structures, in 2, 3, or more dimensions.

In some embodiments, the registration of the virtual data and the live data can be maintained through the surgical procedure. In some embodiments, the registration of the virtual data and the live data can be maintained during select portions of the surgical procedure or the surgical plan, which can be or can include a virtual, e.g. a preoperatively generated, surgical plan. In some embodiments, the superimposition of the virtual data and the live data by the HMD occurs simultaneously. In some embodiments, the superimposition of the virtual data and the live data by the HMD is not simultaneous. For example, the virtual data can be superimposed intermittently.

Virtual data can be transparent, translucent or opaque. If virtual data are opaque, they may be displayed intermittently so that the operator or surgeon can see how they project in relationship to the physical structures of the patient and/or physical tools, instruments, devices. If combinations of virtual data are displayed simultaneously, the different types of virtual data can be displayed with different colors.

Outside-In Tracking

With outside-in tracking an image capture or video capture system using, for example, optical markers, e.g. with geometric patterns, calibration phantoms or reference phantoms can be used for coordinate determination in the common coordinate system and distance measurements. One or more external cameras can be installed in a stationary location, e.g. on the ceiling, the wall or a stand or attached to the OR table. One or more optical markers can be applied to the HMD for tracking the coordinates and/or the position and/or orientation of the HMD. One or more optical markers can be applied to the surgeon for tracking the coordinates and/or the position and/or orientation of the surgeon. One or more optical markers can be applied to the anatomic structure or near the anatomic structure tracking the coordinates and/or the position and/or orientation of the anatomic structure. One or more optical markers can be applied to a physical tool, physical instrument, physical implant or physical device tracking the coordinates and/or the position and/or orientation of the physical tool, physical instrument, physical implant or physical device.

Multiple different technical approaches are possible to track the surgical instruments in the surgeon's live view of the patient through the HMD and to project the invisible parts of an instrument hidden by the tissue and its direction with the HMD. None of these approaches are meant to be limiting, but are only exemplary in nature. Someone skilled in the art can recognize other approaches for tracking surgical instruments using embodiments of the present disclosure. Multiple optical markers can be attached to a surgical instrument. For example, the markers can be fixed at defined positions on the instrument. With the geometry of the instrument known, the position and orientation of the instrument can be calculated, e.g. for an instrument like an awl with a tip for which its rotary orientation is aligned with the pointing axis only two markers are needed. More markers can be used, e.g. in different geometric locations on the instrument with overlapping or separate, distinct x, y, and z coordinates. The markers' 3D coordinates are recognized by the HMD using the methods described in the preceding sections. Using the coordinates of a first and second marker, a vector, pointing in the direction of the tip is calculated and displayed by the HMD to indicate the direction of the hidden portions of the instrument superimposed onto the surgical site, enabling the surgeon to align the physical awl or pedicle screw including its hidden portions with the intended path defined using the standard or virtual planning interface and also projected by the HMD. Rather than using two or more markers, a single marker can be used, for example with sufficient geometric information, e.g. along the long axis or other axis of the instrument, for accurate coordinate determination, e.g. 2, 3, 4, 5, 6, 7, 8, 9 or 10 cm long and, for example, 1, 2, 3, 4, 5, 6, or 7 cm or other cm wide, depending also on the spatial resolution of the camera system. In general, the greater the spatial resolution of the camera or video system, the smaller the marker size that can be used for accurate coordinate and/or vector determination. In addition, smaller marker sizes can be possible when markers are stationary, e.g. rigidly attached to a non-moving anatomic part of the patient or the OR table. Larger marker sizes can be used, for example, when markers are attached to a moveable anatomic landmark, e.g. a distal femoral condyle or a proximal tibial plateau, or a humerus, or a humeral tuberosity, or when they are attached to the HMD and are thus, for example, subject to movement as the surgeon moves his or her head.

Another approach uses pivoting, a mathematical technique for determining the position of the tip. With pivoting, the instruments tip is fixed in one position on the tissue while the whole instrument is moved. The attached optical markers move on a spherical surface. This leads, for example, to an accurate registration of an entry point. In some embodiments, the computer processor can be configured to maintain the 2D imaging slice or imaging cross-section projected by the HMD superimposed and/or aligned with the physical tissue of the patient always in a constant or the same position relative to the physical tool, physical instrument, physical implant, e.g. intersecting with the tip or located at the tip, while maintaining a fixed anatomic orientation, e.g. sagittal, coronal, axial, oblique sagittal, oblique coronal, oblique axial, curved sagittal, curved coronal, curved axial. This can be advantageous, for example, when a biopsy needle or a tissue harvester is moved or advanced through soft-tissue or hard tissue, e.g. during a brain, heart, lung, thyroid, parathyroid, liver, spleen, kidney, adrenal, prostate, ovary, bone, cartilage or any other biopsy. This can also be advantageous, for example, for any surgical procedure where a physical surgical tool, physical surgical instrument, physical implant or any other physical surgical device is moved or advanced through soft-tissue or hard tissue, e.g. through a brain, heart, lung, thyroid, parathyroid, liver, spleen, kidney, adrenal, prostate, ovary, bone, cartilage or any other tissue.

For example, as a surgeon moves and advances a physical needle, physical awl, physical screw through a vertebra or a portion of a vertebra, e.g. a pedicle [for example for a spinal fusion], the computer processor can be configured to move and/or advance 2D imaging slices through the vertebra, portion of the vertebra, e.g. the pedicle, and the imaging slices can always be located at the tip of the tracked physical needle, physical awl or physical screw and can always be in a fixed anatomic orientation, e.g. in a sagittal, coronal, axial, oblique sagittal, oblique coronal, oblique axial, curved sagittal, curved coronal, or curved axial plane. Thus, as the surgeon moves the physical needle, physical awl or physical screw from a first position with a first set of coordinates to a second position with a second set of coordinates, the HMD can display a first 2D imaging slice through the pedicle at the first position, with the 2D imaging slices intersecting with or located at the tip of the physical needle, physical awl or physical screw and, for example, oriented in a coronal plane or a sagittal plane or an axial plane at the first position or first coordinates and the HMD can then display a second 2D imaging slice through the pedicle at the second position, with the 2D imaging slices intersecting with or located at the tip of the physical needle, physical awl or physical screw and, for example, oriented in a coronal plane or a sagittal plane or an axial plane at the second position or second coordinates. In this manner, the surgeon can always monitor the location of the physical needle, physical awl or physical screw inside the physical tissue of the patient and relative to the 2D images obtained pre- or intra-operatively from the patient. This can be beneficial, for example, when complex 3D structures, e.g. a spine reconstructed in 3D from a CT scan or MRI scan, can potentially obscure fine anatomic detail inside the patient due to superimposition of multiple structures. This can also be beneficial during spinal fusion surgery with pedicle screws since the cortex of the pedicle and the inner pedicle wall or endosteum can be difficult to see on a superimposed and/or aligned 3D display of the spine, e.g. reconstructed from a CT scan, while it can be readily visible on the superimposed and/or aligned 2D imaging, e.g. a CT slice superimposed and/or aligned with the corresponding physical tissue/pedicle slice of the patient. In some embodiments, the 2D image(s) displayed by the HMD can be maintained by the computer processor in a fixed location, e.g. the center of a pedicle, while the physical tool, physical instrument, physical implant or physical device is moved, e.g. inside the pedicle.

In some embodiments, more than one 2D slice can be displayed by the HMD, for example at least two or more of a sagittal, coronal, axial, oblique sagittal, oblique coronal, oblique axial, curved sagittal, curved coronal, or curved axial slices or images. The two or more 2D slices can be moved through the tissue, e.g. anterior, posterior, medial, lateral, superior, inferior, by the computer processor of the HMD display following the movement of a tracked physical tool, physical instrument, physical implant or physical device so that the two or more 2D slices displayed by the computer processor of the HMD display are always superimposed onto and/or aligned with a corresponding slice of the patient's physical tissue in the coordinate system while the physical tool, physical instrument, physical implant or physical device is moved in the patient's tissue and in the coordinate system and their position and/or orientation relative to the physical tool, physical instrument, physical implant or physical device can be maintained during the movement. The two or more 2D slices or cross-sections can intersect in the display of the HMD. The intersection can be, for example, centered around an anatomic structure or maintained [e.g. during movement of the patient, the surgical site, the HMD, the physical tool, physical instrument, physical implant or physical device] at or over an anatomic structure or site, e.g. the center of a pedicle or a line through the pedicle. The intersection can be centered around or maintained at or around a physical surgical tool, physical surgical instrument, physical implant or any other physical surgical device, e.g. around a long axis or other portion of the physical surgical tool, physical surgical instrument, physical implant or any other physical surgical device. The maintaining of the intersection of the two or more imaging planes over a portion of the physical surgical tool, physical surgical instrument, physical implant or any other physical surgical device can be performed by the computer processor while the tracked physical surgical tool, physical surgical instrument, physical implant or any other physical surgical device are moved inside the physical tissue of the patient, e.g. while an awl is advanced inside a pedicle.

2D imaging data or imaging slices or cross-sections as well as 3D displays, e.g. a 3D reconstruction from a CT or MRI scan (e.g. of a spine, a hip, or a knee) and any virtual data, e.g. a predetermined path, predetermined start or end point, predetermined virtual axis, virtual tool, virtual instrument, virtual implant, virtual device, displayed by the HMD can be magnified by the HMD display in any of the embodiments throughout the specification. The magnification can be centered around an anatomic structure, e.g. the center of a pedicle or a line through the pedicle, e.g. a center line of a pedicle. The magnification can be centered around the center of a left pedicle, the center of a right pedicle, the center of both pedicles, a left facet joint, a right facet joint, a lamina, a spinous process, a posterior vertebral wall or an anterior vertebral wall. Other locations are possible, e.g. an anterior third of a pedicle, a posterior third of a pedicle. The magnification can be centered around a physical surgical tool, physical surgical instrument, physical implant or any other physical surgical device, e.g. around a long axis of the physical surgical tool, physical surgical instrument, physical implant or any other physical surgical device. The magnification can be centered around a virtual surgical guide (e.g. a virtual axis), a virtual surgical tool, virtual surgical instrument, virtual implant or any other virtual surgical device, e.g. around a long axis of the virtual surgical tool, virtual surgical instrument, virtual implant or any other virtual surgical device.

In surgery employing a surgical microscope, 2D or 3D images [e.g. pre- or intra-operatively obtained images] and any virtual data, e.g. a predetermined path, predetermined start or end point, predetermined virtual axis, virtual tool, virtual instrument, virtual implant, virtual device, can be magnified in the HMD display by a computer processor, optionally matching the magnification of the microscope. Optionally, the magnification of the 2D or 3D imaging studies and any virtual data, e.g. a predetermined path, predetermined start or end point, predetermined virtual axis, virtual tool, virtual instrument, virtual implant, virtual device, displayed by the HMD can be greater than that of the microscope and the microscopic view of the physical tissue of the patient or it can be less than that of the microscope and the microscopic view of the physical tissue of the patient. The magnification of the 2D or 3D imaging studies and any virtual data, e.g. a predetermined path, predetermined start or end point, predetermined virtual axis, virtual tool, virtual instrument, virtual implant, virtual device, displayed by the HMD can be centered around the center of the microscopic view or the central axis of the lens system of the microscopy system. The magnification of the 2D or 3D imaging studies and any virtual data, e.g. a predetermined path, predetermined start or end point, predetermined virtual axis, virtual tool, virtual instrument, virtual implant, virtual device, displayed by the HMD can be centered around an anatomic structure, e.g. the center of a pedicle or a line through the pedicle, e.g. a center line of a pedicle. The magnification can be centered around the center of a left pedicle, the center of a right pedicle, the center of both pedicles, a left facet joint, a right facet joint, a lamina, a spinous process, a posterior vertebral wall or an anterior vertebral wall. Other locations are possible, e.g. an anterior third of a pedicle, a posterior third of a pedicle. The magnification can be centered around a physical surgical tool, physical surgical instrument, physical implant or any other physical surgical device, e.g. around a long axis of the physical surgical tool, physical surgical instrument, physical implant or any other physical surgical device. The magnification can be centered around a virtual surgical guide [e.g. a virtual axis], a virtual surgical tool, virtual surgical instrument, virtual implant or any other virtual surgical device, e.g. around a long axis of the virtual surgical tool, virtual surgical instrument, virtual implant or any other virtual surgical device.

In some embodiments, virtual data can move in relationship to the surgeon or operator or in relationship to the patient or a certain target anatomy within a patient. This means if the surgeon moves his or her head or the body or parts of the patient's anatomy are being moved, the virtual data will move in the HMD display. For example, once registration of the HMD, the virtual data of the patient and the physical anatomy, e.g. spine, of the patient in a coordinate system has occurred, the HMD can display a virtual image of a target tissue or adjacent tissue or a virtual tool, rod, instrument and/or interbody device. The virtual image of the target tissue or adjacent tissue can be, for example, an image of or through a tumor or other type of pathologic tissue or a spine or a spinal pedicle. As the surgeon or operator moves his or her head or body during the surgical procedure, the virtual data will move and change location and orientation the same way how the surgeon moves his/her head or body, typically reflecting the change in perspective or view angle that the surgeon obtained by moving his or her head or body. The virtual data can include a 3D representation of a surgical tool or instrument such as a needle for kyphoplasty or vertebroplasty or an interbody device, a spinal screw, a spinal rod, where the virtual representation of the needle shows its intended location, orientation or path in relationship to the spine and/or a pedicle. The virtual data can also include a medical device, such as a pedicle screw, wherein the virtual data of the pedicle screw shows its intended location, orientation or path in relationship to the spine, and/or a pedicle, and/or a vertebral body. The display of the virtual data can be maintained in relationship to the physical spine if the surgeon's head moves (with only a change of the 3D perspective or view angle, while maintaining superimposition and/or alignment of the virtual data with the physical structures, e.g. a physical screw, an endplate, a vertebral body).

Registration Using Spatial Mapping

Live data, e.g. live data of the patient, the position and/or orientation of a physical instrument, the position and/or orientation of an implant component, the position and/or orientation of one or more HMDs, can be acquired or registered, for example, using a spatial mapping process. This process creates a three-dimensional mesh describing the surfaces of one or more objects or environmental structures using, for example and without limitation, a depth sensor, laser scanner, structured light sensor, time of flight sensor, infrared sensor, or tracked probe. These devices can generate 3D surface data by collecting, for example, 3D coordinate information or information on the distance from the sensor of one or more surface points on the one or more objects or environmental structures. The 3D surface points can then be connected to 3D surface meshes, resulting in a three-dimensional surface representation of the live data. The surface mesh can then be merged with the virtual data using any of the registration techniques described in the specification.

The live data can be static, or preferably, it can be intermittently, continuously, or in real time updated with additional information to incorporate changes in the position or surface of the one or more objects or environmental structures. The additional information can, for example be acquired by a depth sensor, laser scanner, structured light sensor, time of flight sensor, infrared sensor, or tracked probe.

For initial spatial mapping and updating of mapping data, commonly available software code libraries can be used. For example, this functionality can be provided by the Microsoft HoloToolkit or the Google Project Tango platform. Various techniques have been described for spatial mapping and tracking including those described in U.S. Pat. No. 9,582,717, which is expressly incorporated by reference herein in its entirety.

Automatic or semi-automatic registration of virtual patient data in relationship to live patient anatomy can be performed using image processing and/or pattern recognition and matching techniques. In some embodiments, image processing techniques, pattern recognition techniques or deep learning/artificial neural-network based techniques can be used to match virtual patient data and physical anatomic data, or virtual instruments/devices with physical instruments/devices.

Registration of Virtual Patient Data and Live Patient Data Using Anatomic Landmarks In some embodiments, a surgeon can identify select anatomic landmarks on virtual data of the patient, e.g. on an electronic preoperative plan of the patient, and on live data of the patient. For example, the surgeon can identify a landmark by placing a cursor or a marker on it on an electronic image of the virtual data of the patient and by clicking on the landmark once the cursor or marker is in the desired location. In a spine, such a landmark can be, for example, the posterior tip of a spinous process, a spinal lamina, an inferior facet on the patient's left side, a superior facet on the patient's left side, an inferior facet on the patient's right side, a superior facet on the patient's right side, a tip of a facet joint, a bone spur, an osteophyte etc.

The surgeon can then identify the same landmarks live in the patient. For example, as the surgeon looks through the HMD, the surgeon can point with the finger or with a pointing device, e.g. a pointer or a surgical instrument or tool, at the corresponding anatomic landmark in the live data. The tip of the pointer or the tip of the finger can, optionally, include a tracker which locates the tip of the pointer or the finger in space. Such locating can also be done visually using image and/or video capture and/or a 3D scanner, e.g. in a stereoscopic manner through the HMD for more accurate determination of the distance and location of the pointer or finger in relationship to the HMD. An image and/or video capture system and/or a 3D scanner can also be attached to, integrated with or coupled to the HMD. Virtual and live data can include an osteophyte or bone spur or other bony anatomy or deformity. Optionally, the surgeon can perform a surface tracing of the anatomy and a computer processor can be configured to match a pre-operative imaging study, e.g. a CT or MRI, with a corresponding surface to the intra-operative patient surface detected with the pointing device.

Representative anatomic landmarks that can be used for registration of virtual and live data of the patient can include (but are not limited to):

In spine: A portion or an entire spinous process; a portion or an entire spinal lamina; a portion or an entire spinal articular process; a portion of or an entire facet joint; a portion of or an entire transverse process; a portion of or an entire pedicle; a portion of or an entire vertebral body; a portion of or an entire intervertebral disk; a portion of or an entire spinal osteophyte; a portion of or an entire spinal bone spur; a portion of or an entire spinal fracture; a portion of or an entire vertebral body fracture or combinations of any of the foregoing.

Use of Robotic Systems

In some embodiments, an HMD, optionally an optical see-through HMD or a non-see-through HMD using a video camera with live stream of video images of the surgical field into the HMD display, can display a virtual surgical guide, e.g. a virtual plane or a virtual trajectory, superimposed onto and/or aligned with a bone of a patient, e.g. an anatomic structure of a spine. The virtual surgical guide, e.g. a virtual plane or virtual trajectory, can be at a predetermined position, predetermined orientation and/or predetermined position and/or orientation, e.g. for a predetermined or intended osteotomy location in a spine.

In some embodiments, a bone resection can be executed by an end effector, e.g. a drill, a burr, a saw attached to or integrated into a robot. In any of the embodiments throughout the specification, a robot can be active, e.g. with an actively guided robotic arm and attached or integrated end effector, actively resecting or removing the bone, or semi-active, e.g. letting a surgeon perform the bone removal, but stopping a movement of the end effector or covering the end effector, if the end effector is moved outside a predetermined or intended area of bone removal or volume of bone removal (e.g. a predetermined trajectory) or coordinates for bone removal, or passive, e.g. positioning a guide for the surgeon making the bone removal. A robot can be attached to an arm or to a base via an arm. A robot can be handheld. A robot can be attached to an arm and handheld. Any end effector known in the art can be used, e.g. reciprocating saws or oscillating saws, burrs, drills, curettes, etc.

A bone removal or bone preparation can be executed using a robot, for example using a predetermined virtual surgical plan. The predetermined virtual surgical plan can be generated using an imaging study, e.g. an ultrasound, CT or MRI scan of the patient. The predetermined virtual surgical plan can be generated by touching select landmarks of a joint, e.g. portions of a spine or osteophytes, or by "painting" portions of the spine, e.g. portions of a facet, followed by optional point cloud generation. The predetermined virtual surgical plan can be generated using augmented reality techniques described in the specification, for example by virtually placing, fitting, sizing, selecting and/or aligning a virtual tools, instruments, devices, implant component on the live physical spine or portions thereof of the patient and/or by utilizing one or more coordinates of the virtually placed virtual implant component, including coordinates and geometry. Information and/or data from pre- or intra-operative imaging study, touching of landmarks, surface painting and/or point cloud generation and/or augmented reality techniques can be combined.

When the robot executes a surgical plan (e.g. a predetermined trajectory with a drill or burr) or, in case of a semi-active or passive robot, assists the surgeon in executing the surgical plan, e.g. a bone removal, the end effector attached to the robotic system can deviate from the predetermined and/or intended bone removal, for example in the presence of sclerotic bone, which can cause the end effector to deviate from its predetermined or intended path and/or which can cause the end effector to bend and/or to deviate from its predetermined or intended path ("end effector skiving'). End effector deviation (e.g. saw blade skiving) can be difficult to detect for a surgeon. Thus, it is possible that a surgeon trusts the surgical plan and bone removal executed by the robot or with assistance by the robot, while in fact the actual bone removal in the physical bone can deviate significantly from the predetermined and/or intended cut. Optionally, an end effector can be tracked using, for example, optical markers, e.g. with geometric patterns, navigation markers, e.g. using infrared or RF markers, or IMUs or any other marker or tracking mechanism known in the art or described in the specification. The end effector can be tracked using a 3D scanner, a laser scanner and/or a video imaging system. The end effector can be attached to a bone saw or other power instrument. The end effector can be attached to or integrated into an active, semi-active or a passive robot. Any deviation of the physical end effector from its predetermined position, location, and/or orientation and/or predetermined or intended path can be detected, e.g. automatically or semi-automatically and can, optionally, trigger an alert, e.g. an acoustic or visual alert, e.g. displayed by the HMD, to the surgeon. Thus, physical end effector deviation from its intended or predetermined path can be detected using the display of a virtual surgical guide, e.g. a virtual plane, by one or more HMDs, for example, configured to visualize deviation of the physical saw blade from the virtual surgical guide, e.g. a virtual plane or a virtual trajectory; physical saw blade deviation from its intended or predetermined path can also be detected using tracking and measurement of the coordinates of the end effector, or any combination of both. Physical end effector deviation from its intended or predetermined path can be detected using the display of a virtual surgical guide, e.g. a virtual plane, by one or more HMDs and using tracking and measurement of the coordinates of the physical end effector.

With the physical end effector, e.g. a cutting tool (e.g. a pin, a drill, a mill, a reamer), e.g. attached to a robotic arm, being tracked, the percent superimposition of the physical end effector with the virtual surgical guide, e.g. a virtual plane or virtual axis, can be determined. The percent superimposition can be displayed on a computer monitor or via the HMD display. The percent superimposition can be color coded, e.g. with the color changing from red to green when greater than 90, 95, 97, 98, 99% or any other percentage of superimposition is achieved. When the percent superimposition of the physical end effector, e.g. attached to a robotic arm, with the virtual surgical guide, e.g. a virtual plane or a virtual axis, falls below a predefined or predetermined threshold value, an alarm can be generated, which can be visual, acoustic, vibratory or haptic feedback. A computer processor tracking the coordinates of the physical end effector, e.g. held by a robotic arm, and comparing the coordinates of the physical end effector with the coordinates of the virtual surgical guide, e.g. a virtual plane or a virtual axis, can also determine the absolute time or percentage of time of the total "on-time" of the physical end effector, e.g. a drill or a burr, when the end effector is operating above a predefined or predetermined percentage superimposition, e.g. 90, 95, 97, 98, or 99% or any other percentage. In some embodiments, a hole or void can be created by a pin or a drill or a burr or a mill or a reamer attached to or integrated into a robot. The robot can be active, e.g. with an actively guided robotic arm and attached or integrated pin, or drill, or burr, or mill or reamer, actively pinning or drilling or burring or milling or reaming the bone, or semi-active, e.g. letting a surgeon perform the pinning or drilling or burring or milling or reaming, but stopping a movement of the pin or drill or burr or mill or reamer or covering the pin, or drill, or burr, or mill or reamer, if the pin, or drill, or burr, or mill or reamer is moved outside a predetermined or intended area of pinning or drilling or burring or milling or reaming or volume of pinning or drilling or burring or milling or reaming or coordinates for pinning or drilling or burring or milling or reaming, or passive, e.g. positioning a guide for the surgeon to perform a pinning or drilling or burring or milling or reaming. The robot can be attached to an arm or to a base via an arm. The robot can be handheld. The robot can be attached to an arm and handheld. Any pinning or drilling or burring or milling or reaming mechanism known in the art can be used.

The pinning or drilling or burring or milling or reaming can be executed using a robot, for example using a predetermined virtual surgical plan. The predetermined virtual surgical plan can be generated using an imaging study, e.g. an ultrasound, CT or MRI scan of the patient. The predetermined virtual surgical plan can be generated using touching of landmarks, surface painting of a joint followed by optional point cloud generation. The predetermined virtual surgical plan can be generated using augmented reality techniques described in the specification, for example by virtually placing, fitting, sizing, selecting and/or aligning a virtual implant component, e.g. an interbody device, in the live physical spine of the patient and/or by using one or more coordinates of the virtually placed implant component. Information and/or data from pre- or intra-operative imaging study, touching of landmarks, surface painting and/or optional point cloud generation and/or augmented reality techniques, e.g. virtual placement of virtual implant components in the live physical spine of the patient, can be combined.

In any of the embodiments, a robot can be used to place or assist with placement of screws, e.g. pedicle screws, cortical screws, spinal rods, interbody devices, and/or other spinal devices. The screws, e.g. pedicle screws, cortical screws, spinal rods, interbody devices, and/or other spinal devices can optionally be attached to a robotic arm for placement or to an end effector (e.g. a power drill or instrument) for placement. The screws, e.g. pedicle screws, cortical screws, interbody devices, and/or other spinal devices can optionally be attached to a screwdriver and/or an inserter; the screwdriver and/or inserter can optionally be attached to the robotic arm.

Optionally, a pin or drill or burr or mill or reamer, or any other end effector, can be tracked using, for example, optical markers, e.g. with geometric patterns, navigation markers, e.g. using infrared or RF markers, or IMUs or any other marker or tracking mechanism known in the art or described in the specification. The pin or drill or burr or mill or reamer, or any other end effector, can be tracked using a 3D scanner, a laser scanner and/or a video imaging system. The pin or mill or drill or burr or reamer or any other end effector can be attached to a power instrument. The pin or mill or drill or burr or reamer or any other end effector and/or power instrument can be attached to or integrated into an active, semi-active or a passive robot. Any deviation of a physical saw pin or drill or burr or mill or reamer or any other end effector from its predetermined position, location, and/or orientation and/or predetermined or intended path can be displayed, for example, using a targeting tool as described in U.S. Pat. No. 11,533,969, which is hereby incorporated by reference in its entirety.

Additional circles, visual indicators and/or directional indicators can be used, for example to indicate and/or display the position and/or orientation of a robotic arm, components of a robotic system, an end effector of a robot, an attachment mechanism for an end effector, a drill guide, tool guide, instrument, saw guide, or other end effector guide of a robot.

If one or more circles, visual indicators and/or directional indicators indicate that at least a portion of the robotic arm, components of the robotic system, the end effector of the robot, the attachment mechanism for an end effector, the drill guide, tool guide, instrument, saw guide, or other end effector guide of the robot are misaligned, for example, with regard to a predetermined bone entry point, tissue.

With minimally invasive surgery for spinal fusion, a spinal rod cannot be seen during insertion into tulips since it is hidden underneath a patient's skin and/or subcutaneous and/or muscle tissue. While a surgeon may use external aiming devices, for example attached to a rod inserter and located above the skin surface, and tactile feedback, the passing of the rod through the rod receiving portion of the screwhead can be challenging, in particular when the rod has been bent to accommodate a spinal curvature or to achieve a desired or predetermined deformity correction. Similarly, during insertion of an interbody device, it can be challenging or not possible to see the device.

Aspects of the present disclosure relate to systems, devices and methods for guiding minimally invasive surgery in a spine, for example for spinal fusion, using navigation system, augmented reality and/or robots. In some embodiments, systems, devices and methods are disclosed that are configured to determine the shape of a spinal rod after bending the spinal rod, for example for fusing a spine or correcting a deformity. In other embodiments, systems, devices and methods are disclosed that are configured to determine the shape of an interbody device, for example without the use of CAD files or design files. The determined shapes can be used for display, e.g. by a computer monitor and/or an augmented reality display device, or for placement of the device(s) using a robot.

Systems, techniques, devices and methods are described for determining an axis, a curvature, and/or a 3D shape of spinal rods for optional display on a computer monitor and/or an augmented reality display. Systems, techniques, devices and methods are described for determining a leading edge, a curvature, and/or a 3D shape of interbody devices for optional display on a computer monitor and/or an augmented reality display.

Aspect of the disclosure relate to systems and methods for determining the shape of spinal rods and spinal interbody devices.

The terms "screw head" and "tulip" are used interchangeably throughout the disclosure. A tulip is a body structure having two opposing sides spaced by a slotted opening to receive a spinal rod.

The tulip often employs internal threads to receive a rod locking set screw to anchor or fix the rod in the tulip.

An interbody device, also referred as spinal interbody device, as used herein, comprises any implantable device placed between the endplates of two vertebral bodies. For example, it can include cages, e.g. for spinal fusion, spacers, expandable cages, expandable spacers, disc replacement materials, artificial disks, and any other known device designed for or intended to be inserted into the intervertebral space, e.g. with or without removal of native disk material. An interbody device can comprise metal, e.g. titanium, and non-metal components, e.g. polyetheretherketone (PEEK), or combinations thereof. An interbody device can have coatings or complex surface features, e.g. for bone ingrowth. An interbody device can be 3D printed, e.g. using metal or PEEK or other materials.

When minimally invasive surgery (MIS) is performed without or with only limited exposure of select spinal elements, it can be difficult to pass a spinal rod from a first screw head to a second, third, fourth etc. screw head, since the screw heads may be hidden by tissue, e.g. muscle, fascia, subcutaneous tissue and/or skin and may not be directly visible. The spinal rod has a proximal end, for example attached to an inserter, and a distal end, for example for insertion into the screw head and intended to be passed through the screw head to the next screw. The surgeon has to insert the distal tip of the spinal rod into the screw head, e.g. the so-called tulip; with MIS approaches, the distal tip of the spinal rod cannot be visible under the skin, muscle or fascia. The surgeon has to find the screw head by aiming the inserter holding the spinal rod, and optionally any aiming devices, in relationship to optional extenders, extender tabs, retractors, breakoff retractors extending from the screw head through a mini-incision in the skin. The physical screw head may not be visible during this processes and the surgeon has to rely on aiming outside the skin, for a rod that is located underneath the skin, and on tactile feedback from the inserter, which can be difficult. This difficulty may cause a surgeon to "skip" a screw head at times, bypassing the screw head with the spinal rod (with some possible loss in fixation quality or fusion quality). The difficulty is increased when the rod is bent, for example when a straight rod is bent to accommodate a curvature of the spine and/or to correct a deformity.

The shape of the spinal rod post-bending cannot be known. Aspects of the present disclosure provide for systems, techniques, devices and methods to determine the curvature and/or 3D shape of a spinal rod post bending, e.g. with a rod bender, and to optionally display a virtual 3D representation of the physical spinal rod, superimposed and aligned with the physical spinal rod, underneath the patient's skin, fascia and/or muscle using an augmented reality (AR) display, e.g. a see through optical head mounted display (HMD). While a surgeon cannot see the physical spinal rod underneath the patient's skin, fascia and/or muscle, the surgeon can see the virtual spinal rod underneath the patient's skin, fascia and/or muscle which is superimposed and/or aligned with the physical spinal rod. In this manner, a surgeon can aim the virtual spinal rod (and with that the physical spinal rod) towards a virtual display/virtual representation of screw heads, in particular rod receiving portions of screw heads superimposed onto the corresponding physical screw heads by the AR display underneath the patient's skin, muscle, and/or fascia.

Aspects of the present disclosure provide for systems, techniques, devices and methods to determine the shape of a physical interbody device and to optionally display a virtual 3D representation of the physical interbody device, superimposed and aligned with the physical interbody device, underneath the patient's skin, fascia and/or muscle using an augmented reality display, e.g. a see-through optical head mounted display (HMD). In this manner, a surgeon can aim the virtual interbody device (and with that the physical interbody device) towards a virtual display/virtual representation of a target area, e.g. an intervertebral space, for example with display of virtual endplates or portions of virtual vertebral bodies superimposed onto the corresponding physical endplates or portions of physical vertebral bodies underneath the patient's skin, muscle, and/or fascia. In some embodiments, the systems and methods can be used to correct spinal deformity in a patient in need thereof.

In some embodiments, the system can comprise a stereoscopic head mounted display (HMD), e.g. an optical see-through or video see-through head mounted display, and at least one computer processor. In some embodiments, the system comprises a graphical user interface, e.g. a virtual user interface, as described, for example in U.S. Pat. No. 9,861,446 and International Application Serial No. PCT/US20019/015522, which are hereby incorporated by reference in their entirety. In some embodiments, the system comprises an imaging device for example, but limited to, a C-arm, 3D C-arm or intra-operative CT scanner, camera and/or navigation system and/or 3D scanner and/or Lidar scanner. In some embodiments, the system comprises a physical rod or a spinal interbody device. In some embodiments, the system comprises one or more markers, subarrays and/or arrays of markers. A subarray can be formed by one or more markers. An array can be formed by one or more markers and/or one or more subarrays. A marker can comprise an optical marker, a geometric pattern, a retroreflective marker, an infrared marker, an RF marker, an LED, an IMU or a combination thereof. Markers, subarrays, and/or arrays as described, for example, in U.S. Pat. No. 9,861,446 and International Application Serial No. PCT/US20019/015522 can be used, which are hereby incorporated by reference in their entirety.

In some embodiments of the disclosure, a stereoscopic optical head mounted display can be configured to display at least a portion of a virtual rod, as described also in U.S. Pat. No. 9,861,446 and International Application Serial No. PCT/US20019/015522, which are hereby incorporated by reference in their entirety. In some embodiments, the at least a portion of the virtual rod corresponds, at least in part, to a portion of a physical rod. The physical rod can be a physical rod for spinal fusion surgery, for example attached and/or connected to one or more screws or screw heads, e.g. tulip, for spinal fusion surgery.

The physical rod can be bent and/or aligned for a desired deformity correction, e.g. a scoliotic deformity. The deformity correction can comprise a correction of scoliotic deformity, kyphotic and/or lordotic deformity, rotatory deformity, C-curve deformity, S-curve deformity, and any other type of deformity known in the art. The physical spinal rod can be used for stabilization of a fracture, e.g. attached and/or connected to spinal, e.g. pedicle, screws and/or plates. The physical rod can be bent and/or aligned for a desired fracture deformity correction. The physical spinal rod can be used, bent and/or aligned for stabilization of one or more spinal segments and optional deformity correction in tumor surgery, e.g. when used in conjunction with a tumor resection.

The deformity correction can be planned pre-operatively and/or intra-operatively. In some embodiments, the deformity correction can be planned pre-operatively and/or intra-operatively using a graphical user interface, for example displayed on a computer monitor or by an optical head mounted display. The graphical user interface can be a virtual user interface displayed by an optical head mounted display, for example with gaze tracking, gesture recognition, collision detection and other systems and devices for interacting with the virtual interface.

The deformity correction can be planned pre-operatively and adjusted and/or modified intra-operatively, for example using a virtual user interface, e.g. an augmented reality man machine interface as described, for example, in U.S. Pat. No. 9,861,446 and International Application Serial No. PCT/US20019/015522 can be used, which are hereby incorporated by reference in their entirety.

In some embodiments, the position of two or more screws can be determined intra-operatively following their placement in the spine; the screws can be, for example, pedicle screws or cortical screws. The screw position and/or orientation can be determined, for example, with use of an imaging test, e.g. x-rays, a C-arm, 3D C-arm or intra-operative CT scanner to determine the screw position and/or orientation, including, for example, the x, y, and z coordinates of the screw tip, screw shaft, screw axis, cannulated portion of the screw, screw head (also referred as screw tulip), retractor (e.g. tubular retractor), optionally attached to the screw (e.g. a breakoff retractor).

In some embodiments, an augmented reality display unit, e.g. an optical see-through head mounted display, can display a virtual representation, e.g. stereoscopic, of a screw head, e.g. a polyaxial screw head. A virtual spinal rod can be displayed. In some embodiments, the screw position and/or orientation, including, for example, the x, y, and z coordinates of the screw tip, screw shaft, screw axis, cannulated portion of the screw, screw head (also referred herein as screw tulip), retractor (e.g. tubular retractor), optionally attached to the screw (e.g. a breakoff retractor) can be determined using a camera and/or navigation system and/or 3D scanner and/or Lidar scanner, e.g. placed over the surgical site for imaging at least portions of the screw, screw head, screw tulip, retractor (e.g. tubular retractor), optionally attached to the screw (e.g. a breakoff retractor).

In some embodiments, one or more attachments or device can be integrated or attached to the screw, screw head (also referred herein as screw tulip), retractor (e.g. tubular retractor), optionally attached to the screw (e.g. a breakoff retractor), wherein the attachment or device can comprise one or more markers, subarrays and/or arrays of markers, e.g. an optical marker, a geometric pattern, a retroreflective marker, an infrared marker, an RF marker, an LED, an IMU or a combination thereof. The screw, screw head, rod receiving area position and/or orientation and/or coordinates can be determined using, for example, a camera and/or navigation system (with inside-out and/or outside-in tracking) and can be stored.

In some embodiments, a pointer or pointing device or a surgical instrument can comprise an integrated or attached one or more markers, subarrays and/or arrays of markers, e.g. an optical marker, a geometric pattern, a retroreflective marker, an infrared marker, an RF marker, an LED, an IMU or a combination thereof, wherein the one or more markers, subarrays and/or arrays, e.g. using an optical marker, a geometric pattern, a retroreflective marker, an infrared marker, an RF marker, an LED, an IMU or a combination thereof attached to the pointer, pointing device or surgical instrument can be used for determining and, optionally, storing or saving, e.g. on electronic media, the screw position and/or orientation and/or coordinates, e.g. of the screw, screw head, screw tulip, retractor (e.g. tubular retractor), optionally attached to the screw (e.g. a breakoff retractor), when the pointer, pointing device or surgical instrument touches the screw head.

In some embodiments, a screw driver can comprise an integrated or attached one or more markers, subarrays and/or arrays of markers (e.g. an optical marker, a geometric pattern, a retroreflective marker, an infrared marker, an RF marker, an LED, an IMU or a combination thereof), wherein the one or more markers, subarrays and/or arrays (e.g. using an optical marker, a geometric pattern, a retroreflective marker, an infrared marker, an RF marker, an LED, an IMU or a combination thereof) attached to the screw driver can be used for determining and, optionally, storing or saving, e.g. on electronic media, the screw position and/or orientation and/or coordinates, e.g. of the screw, screw head, screw tulip, retractor (e.g. tubular retractor), optionally attached to the screw (e.g. a breakoff retractor).

The position and/or orientation of two or more screws, including, for example, their screw tips, screw shafts, screw axes, cannulated portions of the screws, screw heads, screw tulips, retractors (e.g. tubular retractors), optionally attached to the screw (e.g. a breakoff retractor) can be used for determining the curvature and/or shape of one or more spinal rods, e.g. for connecting or attaching the spinal rod to the two or more screws, optionally for bending the rod, for example to achieve a curvature and/or shape to approximate the shape of a path connecting the screw heads, screw tulips. Optionally, the path can be interpolated to connect multiple screw heads, thereby creating a smooth curvature of the path—and the intended rod post bending.

Rods

In some embodiments, a rod bender can comprise one or more integrated or attached markers, subarrays and/or arrays of markers, e.g. an optical marker, a geometric pattern, a retroreflective marker, an infrared marker, an RF marker, an LED, an IMU or a combination thereof; in this manner, the rod bender can be tracked, for example using a camera, a 3D scanner, a Lidar system or a combination thereof. By tracking the rod bender, a computer processor can display, by an augmented reality device (e.g. a head mounted display), a virtual rod superimposed and/or aligned with the rod bender, for example the opening(s) of a rod bender for holding a rod. The virtual rod can have a shape based on the position and/or orientation of two or more screws, including, for example, their screw tips, screw shafts, screw axes, cannulated portions of the screws, screw heads (also referred herein as screw tulips), retractors (e.g. tubular retractors), optionally attached to the screw (e.g. a breakoff retractor). The rod bender can be used to bend a physical rod template or a physical rod; the bending can be performed so as to superimpose and/or align the bent physical rod (or rod template) with virtual rod displayed superimposed onto the rod bender.

Any other technique can be used for bending a physical rod to adjust the rod shape to pass through the pedicle screws, and/or screw tulips. For example, a rod shape can be preplanned pre-operatively using a computer program and computer processor. The computer processor can be configured to process one or more images of a patient's spine and to display a spinal curvature and/or deformity. The computer processor can be configured to display a desired deformity correction. The information, e.g. the predetermined deformity correction and resultant spinal curvature or shape can be used to derive a predetermined rod shape. The rod bender can then be used to bend a spinal rod to the predetermined rod shape or similar to the predetermined rod shape.

The physical spinal rod can be secured using an "innie" or locking screw. Optionally, the augmented reality device can also display a virtual representation of the locking screw, for example with the virtual display of the locking screw superimposed and aligned with the physical locking screw, e.g. as the physical locking screw is advanced to lock the physical spinal rod, which can be optionally co-displayed as a virtual spinal rod.

In some embodiments, a spinal rod can optionally be reduced, e.g. in situ in the patient. The system can be configured to track coordinates of each screw, e.g. via tracker attached to screw break-off tab for MIS screws or marker attached to screwdriver, capturing the screw position and/or orientation and/or coordinates, for example while the screwdriver is still attached to the screw head. Alternatively, screw coordinates can be captured by placing a tracked pointer or other tracked instrument inside the screw head, for example centered over the screw shaft. If one or more screws are intended to be reduced, optionally the amount of predetermined screw reduction can be accounted for, and optionally entered into a computer processor and/or storage medium. The display of the virtual representation of the spinal rod can optionally be adjusted to reflect the shape of the spinal rod prior to and after reduction.

An interbody device, as used throughout the specification, comprises any implantable device placed between the endplates of two vertebral bodies. For example, it can include cages, e.g. for spinal fusion, spacers, expandable cages, expandable spacers, disc replacement materials, artificial disks, and any other known device designed for or intended to be inserted into the intervertebral space, e.g. with or without removal of native disk material. An interbody device can comprise metal, e.g. titanium, and non-metal components, e.g. polyetheretherketone (PEEK), or combinations thereof. An interbody device can have coatings or complex surface features, e.g. for bone ingrowth. An interbody device can be 3D printed, e.g. using metal or PEEK or other materials.

A spinal interbody device can, for example, be a cage (e.g. made of metal [for example titanium, stainless steel, metal alloys] or plastics [for example polycarbonate or PEEK]), an expandable cage, a wedge shaped cage, a disk replacement device, a motion preservation device, and other interbody devices known in the art. An interbody device can be introduced into the space between two vertebral bodies, i.e. the disk space or intervertebral space, or space between the endplates of two vertebral bodies, by a disk removal followed by insertion of the interbody device. The insertion of the interbody device can be performed via different surgical approaches, for example, posterior, transforaminal, lateral, oblique lateral and/or anterior, e.g. a posterior lumbar interbody fusion (PLIF), transforaminal interbody fusion (TLIF), lateral lumbar interbody fusion (LLIF), oblique lateral interbody fusion (OLIF), and/or anterior lumbar interbody fusion (ALIF).

In some embodiments, pre-operative electronic data from the computer processor, e.g. the predetermined rod shape based on pre-planned screws and screw positions, e.g. using pre-planning software, and/or a rod shape based on the intra-operative position and/or orientation and/or coordinates of the two or more screws, including, for example, their screw tips, screw shafts, screw axes, cannulated portions of the screws, screw heads (screw tulips), retractors (e.g. tubular retractors), optionally attached to the screw (e.g. a breakoff retractor), can be used to estimate a desired or predetermined rod shape.

In some embodiments, pre-operative electronic data from the computer processor, e.g. the predetermined rod shape, can be modified by a rod shape based on the intra-operative position and/or orientation and/or coordinates of the two or more screws, including, for example, their screw tips, screw shafts, screw axes, cannulated portions of the screws, screw heads, screw tulips, retractors (e.g. tubular retractors), optionally attached to the screw (e.g. a breakoff retractor).

In some embodiments, a rod shape based on the intra-operative position and/or orientation and/or coordinates of the two or more screws, including, for example, their screw tips, screw shafts, screw axes, cannulated portions of the screws, screw heads (screw tulips), retractors (e.g. tubular retractors), optionally attached to the screw (e.g. a breakoff retractor) can be modified based on the pre-operative electronic data from the computer processor, e.g. the predetermined rod shape, for example when a pre-operative plan was developed with pre-operatively planned screw positions for achieving a desired deformity correction or reduction of curvature. One skilled in the art would recognize that any combination of pre-operative or intra-operative rod shape data is possible.

Following the use of the rod bender, the resultant shape of the physical rod can deviate, at least in some portions, from the predetermined rod shape based on pre-operative and/or intra-operative data, which may render insertion and/or attachment of the rod into the screw heads, tulips, and/or screw attachment mechanisms difficult. This can be particularly challenging with minimally invasive techniques, when portions of the rod can be hidden underneath the skin.

In some embodiments, the final shape of the physical rod after bending can be determined using one or more markers, subarrays and/or arrays of markers. The marker can be an optical marker, a marker with a geometric pattern, a marker with a predetermined shape, an infrared marker, an RF marker, an LED, a passive marker, an active marker, a navigation marker, an inertial measurement unit (IMU), or a combination thereof; a subarray or an array can have 1, 2, 3 or more markers; an array can comprise 1, 2, 3, or more subarrays.

The marker, subarray or array of markers can be tracked using, for example, a camera, e.g. a camera using infrared light and/or light in the visible spectrum, a surgical navigation system, a scanner, a 3D scanner, a Lidar scanner. The tracking data can comprise coordinate data, e.g. during movement of an instrument, a rod inserter, a rod, or an array, subarray or one or more markers moving along a rod.

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

FIGS. 1A-1I are non-limiting examples of a rod 2000, a rod inserter 2010 including a rod inserter handle 2020. The rod 2000 can be configured to attach to or engageably connect or disconnect from the rod inserter 2010. The rod inserter 2010 can be configured to engageably connect or to from the rod. The mechanism for connecting the rod inserter to the rod can be configured to result in a connection with known geometric relationships between the rod inserter and the portion of the rod, e.g. the proximal end, connecting to the rod inserter. Any mechanism known in the art for engaging, connecting and/or disconnecting the rod from the inserter can be used. Depending on the spinal deformity and/or the predetermined and/or desired and/or intended deformity correction, the rod 2000 can have one or more convex shapes and/or surfaces 2003 or concave shapes and/or surfaces 2005. The rod 2000 can comprise complex shapes, e.g. in function of the spinal deformity and/or the predetermined and/or desired and/or intended deformity correction. The rod 2000 can comprise variable lengths, e.g. in function of the spinal deformity and/or the predetermined and/or desired and/or intended deformity correction and/or the length of the spinal fusion and/or the number of spinal levels to be fused.

Figure 1C:
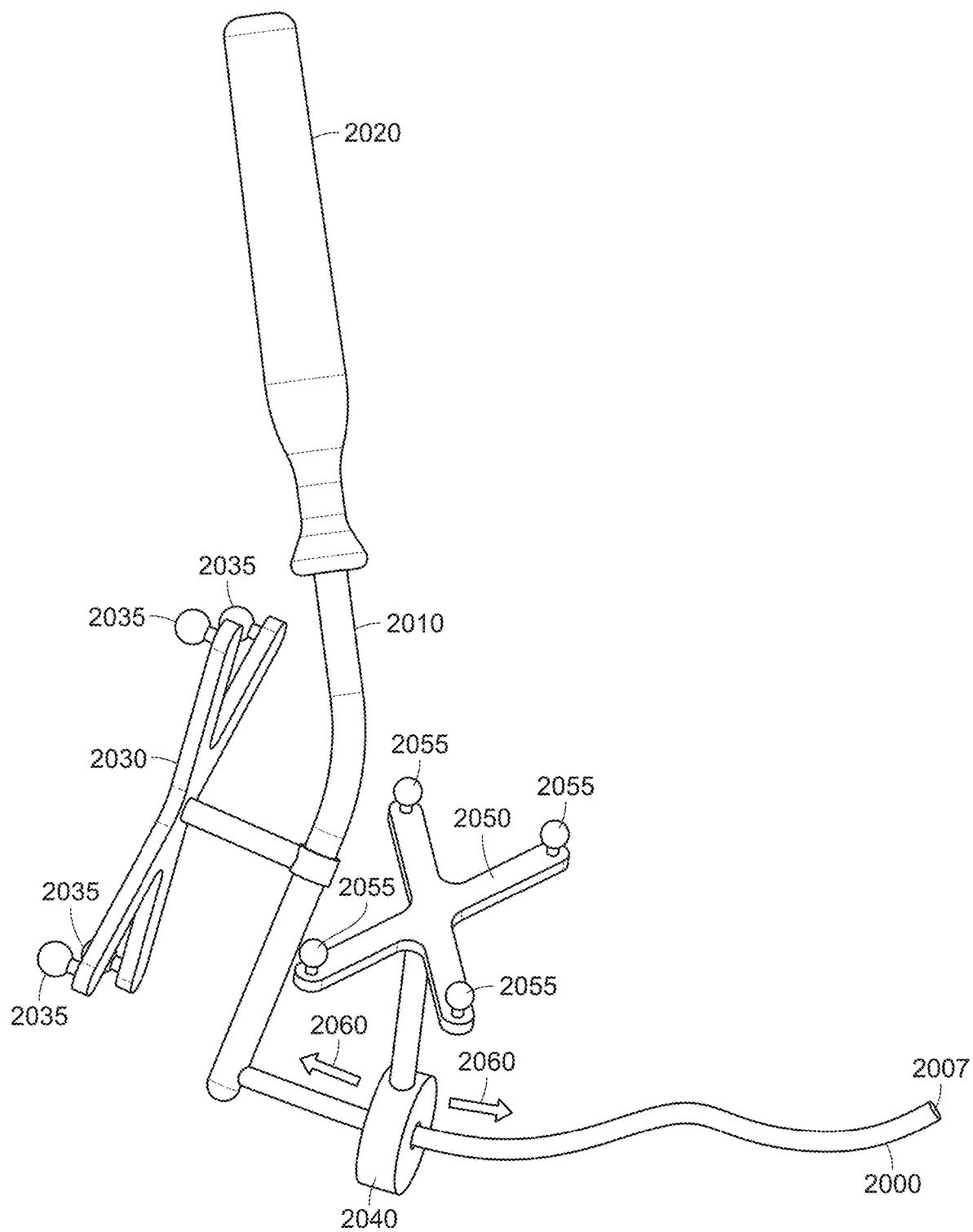
FIG. 1C shows a non-limiting example of a rod inserter with an attached first marker or array and an attached spinal rod with an engagement member with a second marker or array according to some embodiments of the disclosure.
Figure 1D:
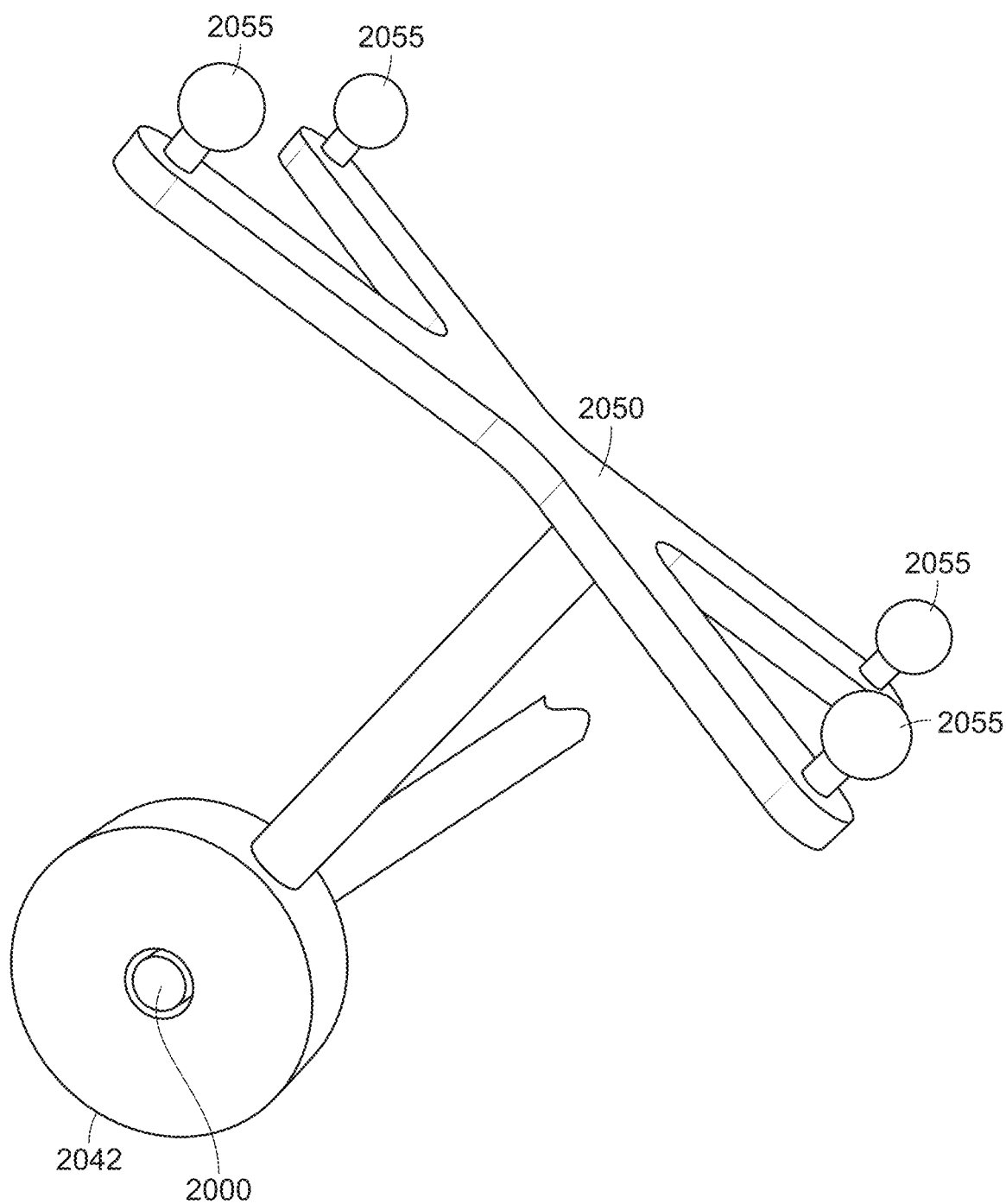
FIG. 1D shows a non-limiting example of an engagement member with a circular opening according to some embodiments of the disclosure.
Figure 1E:
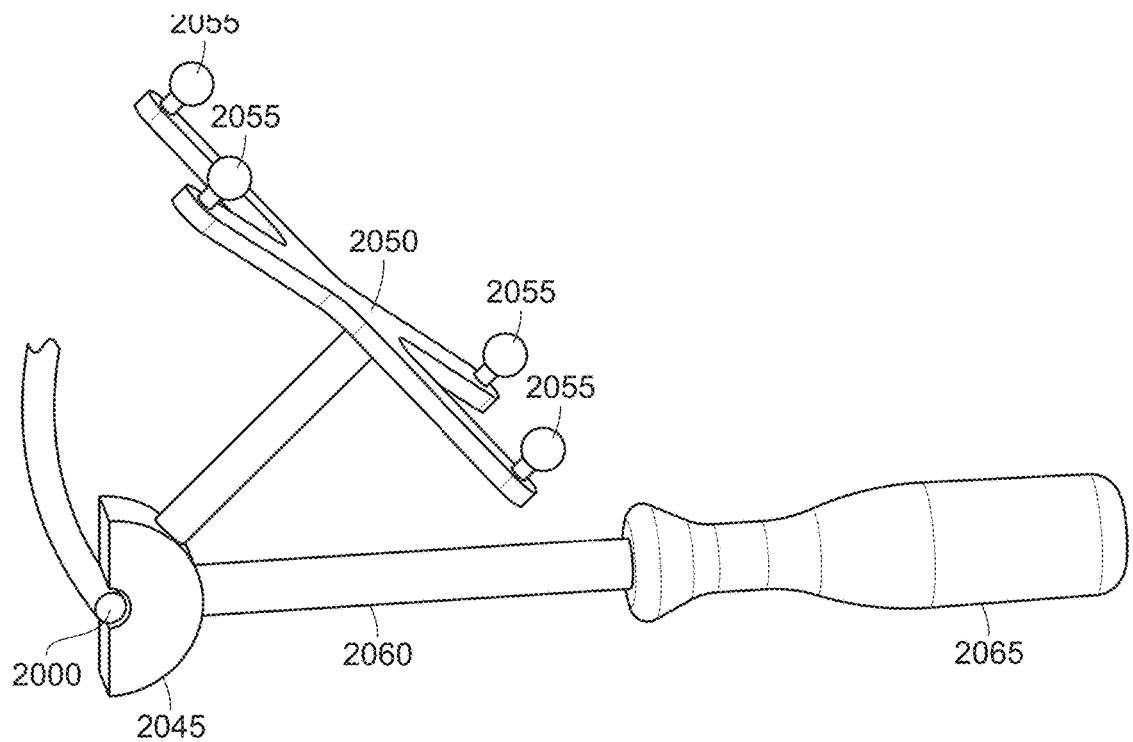
FIG. 1E shows a non-limiting example of an engagement member with a semicircular opening according to some embodiments of the disclosure.
Figure 1F:
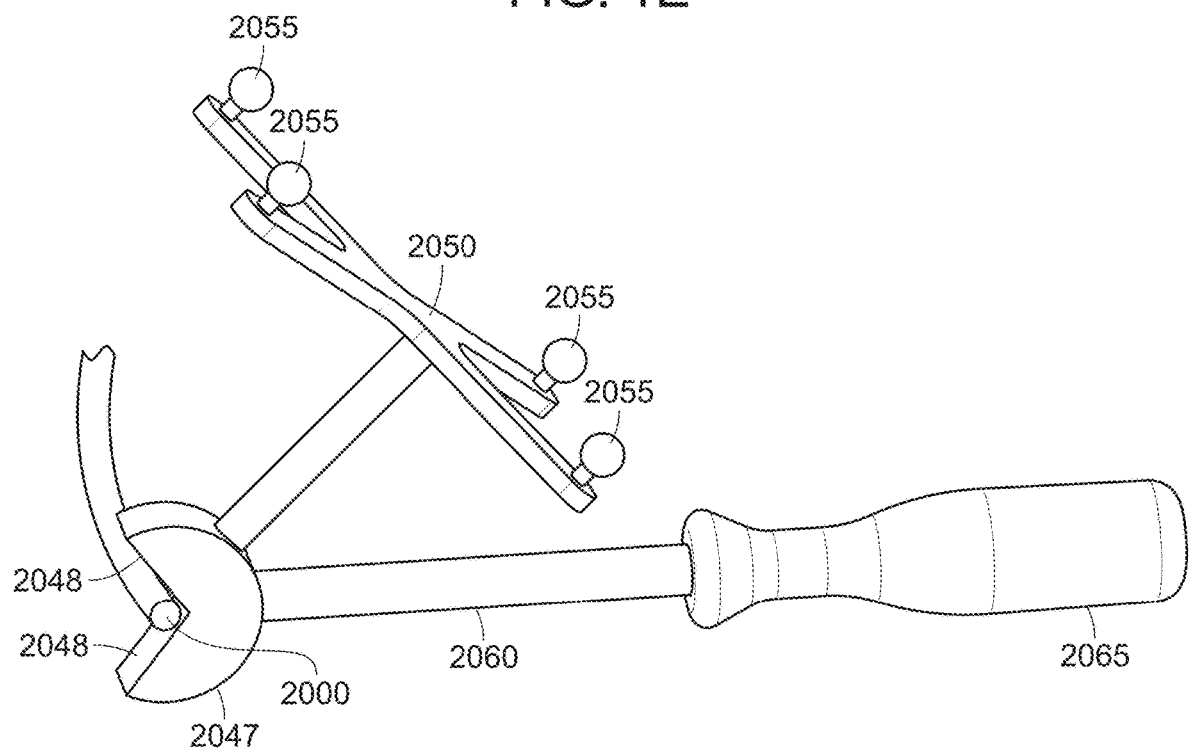
FIG. 1F shows a non-limiting example of an engagement member with a wedge shaped opening according to some embodiments of the disclosure.
Figure 1G:
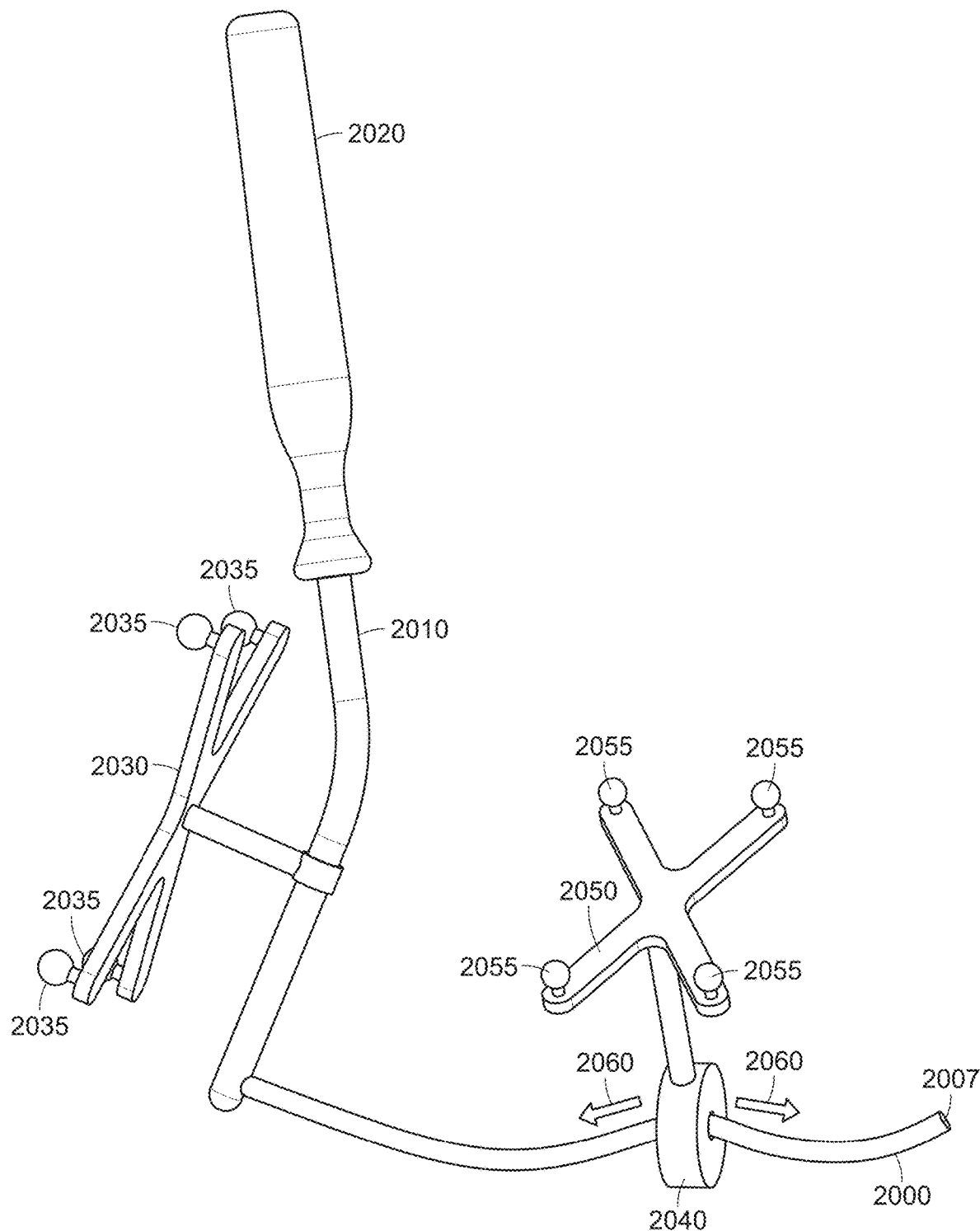
FIG. 1G shows a non-limiting example of a rod inserter with an attached first marker or array and an attached spinal rod with an engagement member with a second marker or array, with the engagement member having moved slightly more than halfway from the proximal end (near the attachment to the inserter) towards a distal end of the spinal rod according to some embodiments of the disclosure.
Figure 1H:
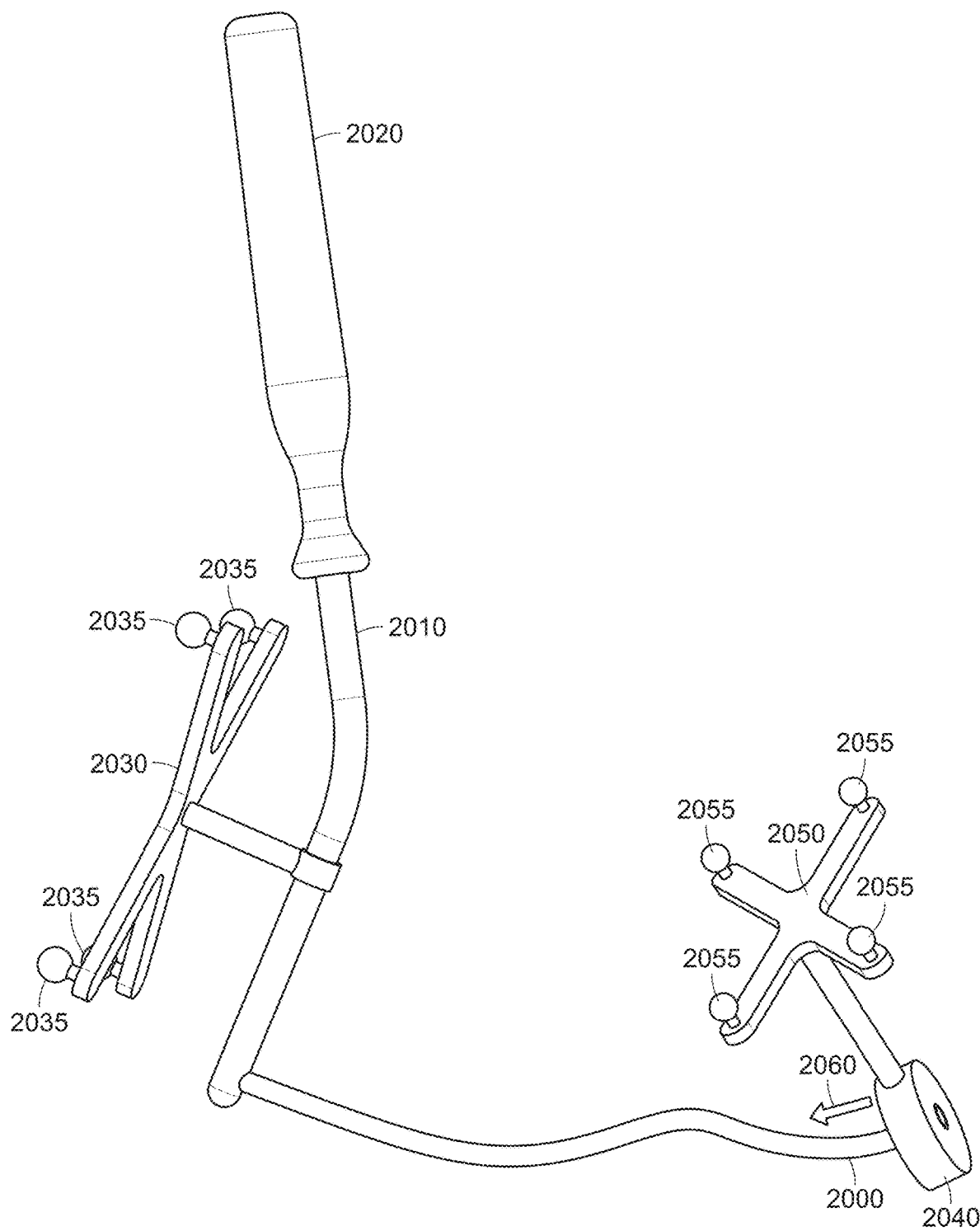
FIG. 1H shows a non-limiting example of a rod inserter with an attached first marker or array and an attached spinal rod with an engagement member with a second marker or array, with the engagement member having moved towards the distal end of the spinal rod according to some embodiments of the disclosure.

In FIG. 1C, FIG. 1G and FIG. 1H, a first array 2030 optionally including one or more markers 2035 can be attached to a rod inserter 2010; the array 2030 can be configured for tracking the rod inserter and, optionally, an attached or connected rod 2000 (based, for example, on the known geometric location and relationship between the rod inserter and the rod), e.g. while the rod 2000 is advanced through soft-tissue underneath a skin towards one or more screws and/or screw heads and/or receiving portions of the screw head(s). In some embodiments, the array 2030 optionally including one or more markers 2035, can be rigidly attached to the rod inserter 2010.

In some embodiments, the spinal rod can comprise a marker and/or subarray and/or array, wherein the marker and/or subarray and/or array can be connected to or attached to the spinal rod, wherein the marker and/or subarray and/or array is configured for tracking the spinal rod. In some embodiments, the spinal rod does not comprise a marker and/or subarray and/or array. In some embodiments, an engagement member 2040 can be configured to be slideably 2060 engaged or engageable with a rod 2000. The engagement member 2040 can comprise one or more attached markers 2055, subarrays and/or arrays 2050. The engagement member 2040 can configured to slide 2060 along the rod 2000 in one or more directions, e.g. forward (for example towards the distal end) and/or backward (for example towards the proximal end, e.g. near the inserter).

In FIG. 1D, the engagement member 2042 can have a ring-like opening. The ring-like or circular opening of the engagement member 2042 can have an inner diameter slightly larger than the outer diameter of the rod 2000.

In FIG. 1E, the engagement member 2045 can have an opening that is semicircular-like or partial ring-like. The semicircle or partial ring-like opening of the engagement member 2045 can have an inner diameter slightly larger than the outer diameter (or radius) of the rod 2000.

In FIG. 1F, the engagement member 2047 can comprise one, two or more flat surfaces 2048, open to accept and to engage with the rod 2000. The opening of the engagement member can be wedge-like. The engagement member 2040, 2042, 2045, 2047 can comprise a holding member 2060 with an optional handle 2065 configured for slideably engaging and moving the engagement member 2040, 2042, 2045, 2047 along the rod 2000.

Figure 1I:
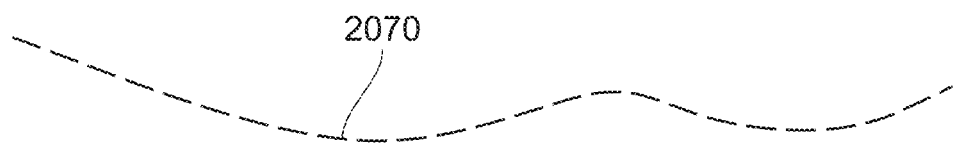
FIG. 1I shows a non-limiting example of an axis of the spinal rod determined based on tracking information of the engagement member obtained while the engagement member is moved along at least portions of the length of the spinal rod according to some embodiments of the disclosure.

As the engagement member 2040, 2042, 2045, 2047 and with it the attached marker(s) 2055 and/or array 2050 are moved 2060 along the rod 2000, e.g. from a first position (e.g. FIG. 1C) to subsequent or additional positions (FIG. 1G), e.g. a $100^{th}$ position, to more subsequent or additional positions (FIG. 1H), e.g. a $200^{th}$ position, the position, orientation and/or coordinates of the marker(s) 2055 and/or array 2050 and, with that the engagement member 2040, 2042, 2045, 2047 can be tracked and recorded using one or more cameras, scanners, 3D scanners, Lidar systems etc, for example in relationship to the coordinate(s) of the marker(s) 2035 and/or array 2030 attached to the rod inserter 2010. One or more computer processors can be configured to compute the coordinates of the position, orientation and/or coordinates of the marker(s) 2055 and/or array 2050 and, with that the engagement member 2040, 2042, 2045, 2047, e.g. in relationship to the coordinate(s) of the marker(s) 2035 and/or array 2030 attached to the rod inserter 2010. FIGS. 1C, 1G, 1H are non-limiting examples of rod coordinates collected by moving the engagement member 2040 along the rod 2000 while tracking the movement along the rod (and coordinates) using the markers 2055 on the array 2050, e.g. in relationship to the array 2030 which is rigidly attached to the rod inserter 2010. FIG. 1I is a non-limiting example that shows how the coordinates can be used to compute, for example, a central axis or central portion 2070 of the rod 2000, including its position and orientation relative to the rod inserter 2010 to which the rod can be attached. In some embodiments, the radius or, optionally, the circumference of the rod can be used to compute a rod shape and/or rod surface, e.g. by applying the radius and/or circumference in a circumferential fashion around the mapped or plotted central axis, central portion or central coordinates of the rod. In some embodiments, the radius of the rod can be known by the manufacturer, e.g. 5 mm, 5.5 mm, 6 mm, 6.5 mm, 7 mm, 7.5 mm, 8 mm, 8.5 mm, 9 mm, 9.5 mm, 10 mm etc. In some embodiments, the radius of the rod can be measured using a caliper. In some embodiments, a pointer, pointing device, and/or surgical instrument tracked using an attached marker, a subarray and/or array can be used for deriving the shape of a spinal rod, for example post bending. The tracked pointer, pointing device, and/or surgical instrument can be moved along the spinal rod, while touching the spinal rod. Rod coordinates can be collected in this manner by moving the tracked pointer, pointing device, and/or surgical instrument along the rod 2000 using the markers, subarray and or array on the tracked pointer, pointing device, and/or surgical instrument, optionally in relationship to the array 2030 which is rigidly attached to the rod inserter 2010.

In some embodiments, the inner geometry of the engagement member, which is typically known, can be used to determine the rod diameter, for example by spinning the engagement member around the circumference of the rod and by using the relative position of the engagement member and its known geometry to compute the center of rotation and the offset of the engagement member relative to the center of rotation; the offset can be used to compute the radius of the rod.

In some embodiments, it can be desirable for a surgeon to know the position and direction of travel of the tip 2007 of the rod 2000 during surgery. The tip of the rod can be determined, for example, using an instrument calibration module and resting the tip 2007 of the rod 2000 in a defined divot or location in a calibration block during an instrument calibration. By applying a calibration in this form, the tip 2007 of the rod 2000 can be stored by a computer medium in relationship to the marker(s) 2035 and/or array 2030 attached to the rod inserter 2010. Alternatively, the end position of the engagement member 2040 (FIG. 1H), e.g. the most distant position relative to the rod inserter 2010 attachment can be used to compute a tip 2007 position of the rod 2000.

In some embodiments, the spinal rod can be attached to or inserted into a calibration or registration device, e.g. on a stand, rather than being attached to an inserter. The calibration or registration device can be in a fixed geometric relationship to a tracking system, e.g. a camera and/or navigation system, in which case the system can be configured without tracking the calibration or registration device, for example based on its known location relative to the camera and/or navigation system. In some embodiments, the calibration or registration device can be tracked, for example using one or more markers, subarrays and/or arrays attached to the calibration or registration device. An axis, curvature, and/or shape of the spinal rod can be determined using any of the foregoing embodiments, while the spinal rod is attached to the calibration or registration device, for example using a tracked engagement member sliding along the rod. In some embodiments, the spinal rod can subsequently be inserted into an inserter, for example using a locking mechanism that will attach the spinal rod to the inserter, e.g. in a predetermined position and/or orientation. If the inserter and/or the spinal rod is tracked, for example using an attached marker, subarray and/or array, a virtual 3D representation of the spinal rod can then be displayed, e.g. by a computer monitor, a navigation system, and/or an augmented reality display, e.g. a see through optical head mounted display.

In some embodiments, a computer processor can be configured to compute a 3D display, optionally a 3D stereoscopic display, of a rod surface (and/or volume) and/or rod tip, i.e. a virtual display of the rod, optionally including its tip. The 3D stereoscopic display or virtual display of the rod can be displayed by a stereoscopic optical head mounted display (HMD). In some embodiments, the head mounted display can be an optical see-through stereoscopic head mounted display. In some embodiments, the head mounted display can be a video see-through stereoscopic head mounted display. The portions of the physical rod directly visible through a optical see-through stereoscopic head mounted display can be superimposed and/or aligned with the 3D stereoscopic display of the virtual rod by the head mounted display (HMD), e.g. a see through stereoscopic optical head mounted display. In those areas where the physical rod is hidden from direct viewing through the see through stereoscopic optical head mounted display, the stereoscopic optical head mounted display can display the virtual rod, e.g. underneath the patient's skin, fascia, muscle tissue etc., superimposed and/or aligned with the physical spinal rod hidden under the patient's skin, fascia, muscle tissue etc. Optionally, the HMD can also display one or more virtual screws, screw heads (tulips), retractors, e.g. tubular retractors, k-wires, tools and/or instruments (superimposed and/or aligned with the corresponding physical screws, screw heads, tulips, retractors, e.g. tubular retractors, k-wires, tools and/or instruments, for example hidden underneath the tissue, e.g. muscle, fascia, subcutaneous tissue, skin), in addition to the virtual rod. In this manner, the surgeon can move the virtual rod, and with it the physical rod, towards the one or more virtual screws, screw heads (tulips), retractors, e.g. tubular retractors, k-wires, tools and/or instruments. The virtual rod can be aimed at the virtual rod receiving portions of the screw, e.g. in the screw head or tulip. As the surgeon looking at the augmented reality display, for example by an optical see through head mounted display, aims the virtual rod at the virtual rod receiving portions of the screw, e.g. in the screw head or tulip, the surgeon will aim the physical rod (onto which the virtual rod is superimposed and aligned with) at the physical rod receiving portions of the screw (onto which the virtual rod receiving portions of the screw are superimposed and aligned with) hidden under the tissue. When one or more portions of the physical screws, screw heads (tulips), retractors, e.g. tubular retractors, k-wires, tools and/or instruments are visible directly through the see through optical head mounted display, the surgeon can move the virtual rod, and with it the physical rod, e.g. hidden underneath the tissue, towards the physical screws, screw heads, tulips, retractors, e.g. tubular retractors, k-wires, tools and/or instruments and/or the superimposed virtual screws, screw heads (tulips), retractors, e.g. tubular retractors, k-wires, tools and/or instruments. Any of the embodiments throughout the specification can also be used to determine the axis, curvature and/or 3D shape of spinal rods used for use with cortical screws.

Spinal Interbody Device Including Cages

In some embodiments, a cage or interbody device inserter or any other tool or instrument configured for holding and/or attaching and/or connecting a cage or any other interbody device can comprise one or more integrated or attached markers, subarrays and/or arrays, e.g. using an optical marker, a geometric pattern, a retroreflective marker, an infrared marker, an RF marker, an LED, an IMU or a combination thereof, wherein the one or more markers, subarrays and/or arrays, e.g. using an optical marker, a geometric pattern, a retroreflective marker, an infrared marker, an RF marker, an LED, an IMU or a combination thereof attached to the cage or interbody device inserter or other tool or instrument can be used for determining and, optionally, storing or saving, e.g. on electronic media, a cage or interbody device position, orientation and/or coordinates.

In some embodiments, the shape and/or geometry and/or dimensions of a cage or interbody device can be known, e.g. provided by the manufacturer. In some embodiments, the shape and/or geometry and/or dimensions of a cage or interbody device can be derived for example by moving the cage and/or interbody device attached to an inserter or any other tool or instrument with an integrated and/or attached marker, subarray or array.

Figure 2A:
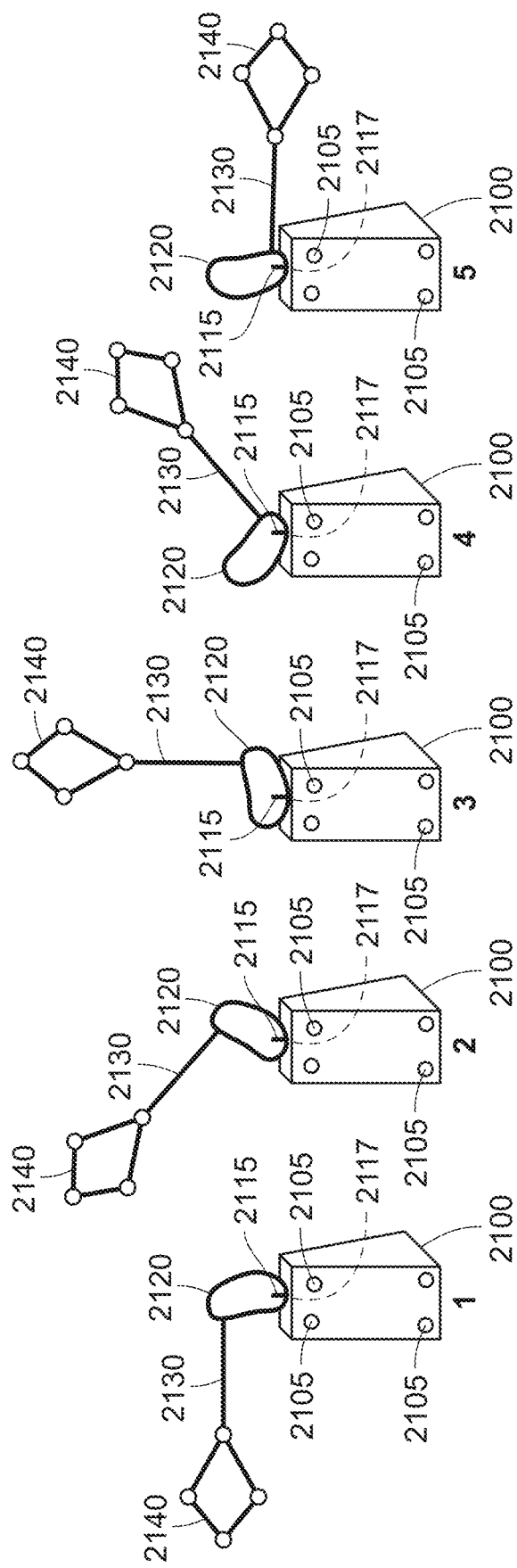
FIG. 2A shows a non-limiting example of a calibration device with a cage or interbody device placed on a superior facing surface of the calibration device according to some embodiments of the disclosure. As an inserter or holding apparatus for the cage or interbody device is moved, the movement of the cage or interbody device on the surface of the calibration device can be tracked to determine at least a portion of its shape.

For example, in some embodiments, a calibration device 2100, also referred herein as registration device or calibration block can be used, as shown in FIG. 2A. A cage or interbody device inserter 2130 or any other tool or instrument configured for holding and/or attaching and/or connecting a cage or any other interbody device 2120 can comprise one or more integrated or attached markers, subarrays and/or arrays 2140. The calibration block 2100 can comprise one or more markers 2105, subarrays, or arrays. The leading edge 2115 (touching the calibration block 2100 in this example) of a cage or interbody device 2120 can have a freeform and/or unknown shape. The top surface 2117 of the calibration block 2100 can be the designated contacted surface for the leading edge 2115 of the cage or interbody device 2120. The top face can be flat, planar, and or curved, e.g. convex or concave. During the calibration or measurement of the shape of the leading edge, the leading edge 2115 is rolling over and or around the calibration block 2100 top surface 2117. The rolling motion can be in a single direction, e.g. for determining the shape of the leading edge in one dimension or direction. The rolling motion can be in multiple directions, e.g. for determining the shape of the leading edge in three dimensions. In some embodiments, the coordinates of the leading edge can be determined in relationship to the marker, subarray or array 2140 rigidly attached to the cage or interbody device inserter 2130 or any other tool or instrument and/or in relationship to the calibration block 2100 including its attached one or more markers 2105, subarrays, or arrays, e.g. by tracking the relative motion and the coordinates of the tracked cage or interbody device (via the attached marker, subarray or array 2140) relative to the tracked calibration block 2100. In some embodiments, an inserter or holding device for an interbody device may not comprise a marker and may not be tracked. For example, a marker, subarray or array can be attached directly to the interbody device.

In some embodiments, the calibration or registration device can be in a fixed geometric relationship to a tracking system, e.g. a camera and/or navigation system, in which case the system can be configured without tracking the calibration or registration device, for example based on its know location relative to the camera and/or navigation system and by tracking the motion and the coordinates of the tracked cage or interbody device (via the attached marker, subarray or array 2140) relative to the known geometric position and/or orientation of the calibration device, e.g. in a coordinate system.

In some embodiments, the geometric relationship between the calibration block 2100 top surface 2117 and the markers 2105 can be predetermined.

In some embodiments, the instrument profile can be determined by approximating the relative position of the calibration block 2100 top surface 2117 in the coordinate system of the instrument 2130 and attached marker, subarray or array 2140.

In some embodiments, the instrument profile can be determined by approximating the relative position of the of the instrument 2130 and attached marker, subarray or array 2140 in the coordinate system of the calibration block 2100 top surface 2117.

Figure 2B:
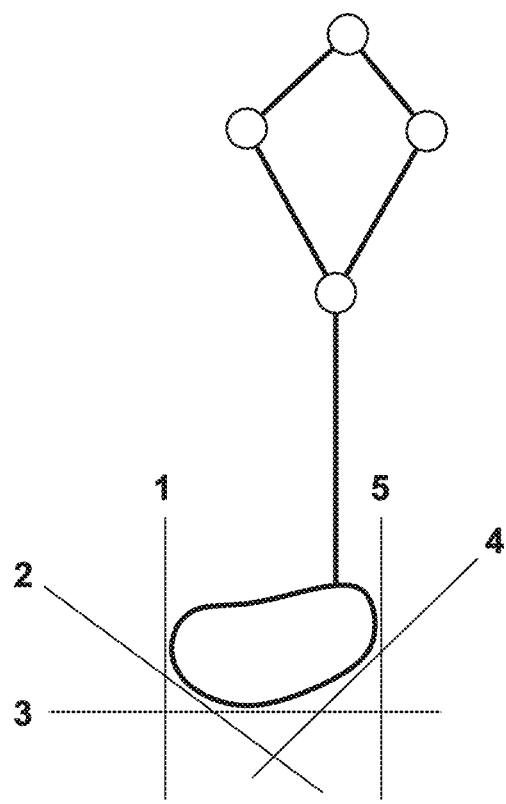
FIG. 2B and FIG. 2C show a non-limiting example how the shape of the cage or interbody device can be determined according to some embodiments of the disclosure.
Figure 2C:
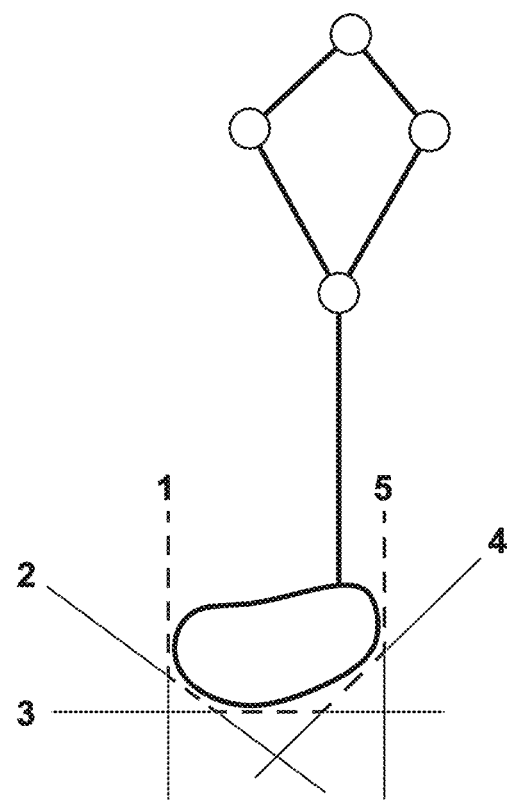

In FIG. 2B, the lines 1, 2, 3, 4, and 5 represent the relative position of the calibration block 2100 top surface 2117 in the instrument 2130 coordinate system during the calibration and/or measurement of the shape of the leading edge 2115 of the cage or other interbody device 2120. The shape and/or profile of the leading edge 2115 of the cage or other interbody device 2120 can be determined by the most inner portion of the intersection of the surfaces 1, 2, 3, 4, and 5 highlighted with stippled lines, as shown in FIG. 2C. The approximation accuracy of the profile depends on the number of the sampling surfaces taken during the calibration; the more sampling surfaces and/or coordinate points (e.g. for a point cloud) are acquired, the more accurate the result of the determination of the shape of the leading edge 2115 of the cage or other interbody device 2120.

In some embodiments, a pointer, pointing device, and/or surgical instrument tracked using an attached marker, a subarray and/or array can be used for deriving the shape of an interbody device. The tracked pointer, pointing device, and/or surgical instrument can be moved along the interbody device, while touching the interbody device. Interbody device surface coordinates can be collected in this manner by moving the tracked pointer, pointing device, and/or surgical instrument along the interbody device using the markers, subarray and or array on the tracked pointer, pointing device, and/or surgical instrument, optionally in relationship to the array of markers 2105 of the calibration device 2100. In this manner, the perimeter shape, leading edge shape, top surface and bottom surface shape of the interbody device can be determined.

In some embodiments, a height can be added to the shape of the leading edge of the cage or interbody device. The height can, for example, be provided by the manufacturer. The height can be determined using a caliper. The height can also be determined by placing, for example, the cage or interbody device on a flat surface (optionally the calibration block top surface) and by acquiring one or more surface points, e.g. from the flat surface (optionally the calibration block top surface) to determine a lower boundary or the undersurface of the cage or interbody device, and by acquiring one or more surface points from the top surface of the cage or interbody device, for example by moving a pointer with one or more markers or an array over the top surface of the cage or interbody device. The pointer can be tracked using a camera, a navigation system, a scanner, a 3D scanner, a Lidar system or a combination thereof.

In some embodiments, the height of a cage or interbody device can be determined by moving a pointer tip over the top surface and the bottom surface of the cage or interbody device and by tracking the pointer tip movement, collecting for example the coordinates and/or surface points, and by generating a 3D surface. The 3D surface can incorporate the leading edge or leading edge or profile shape of the cage or interbody device measured in the preceding embodiments.

In some embodiments, the system can be configured to utilize information about the shape of a subarray or an array for identifying the top and/or bottom part of an interbody device. The system can be configured to determine a first set of coordinates of a physical interbody device when an undersurface of the physical interbody device is placed on a registration device ($1^{st}$ position). The system can be configured to determine a second set of coordinates of the physical interbody device when a top surface of the physical interbody device is placed on the registration device ($2^{nd}$ position). A computer processor can determine a thickness of the physical interbody device based on the difference in coordinates between the first set of coordinates for the $1^{st}$ position and the second set of coordinates for the second position.

In some embodiments, a vice like structure can hold the interbody device, for example attached to a calibration device. The distance between the two vices can optionally be used to determine the thickness of the interbody device. In some embodiments, a computer processor can be configured to compute a 3D display, optionally a 3D stereoscopic display, of an interbody device (e.g. a cage) i.e. a virtual display of the interbody device, for example including its leading edge or profile, e.g. based on a 3D surface of the leading edge or profile generated using one or more of the techniques described in the various embodiments. The 3D stereoscopic display or virtual display of the interbody device can be displayed by a head mounted display (HMD), as described also in U.S. Pat. No. 9,861,446 and International patent application Serial No. PCT/US20019/015522, which are hereby incorporated by reference in their entirety. In some embodiments, the head mounted display can be an optical see-through stereoscopic head mounted display. In some embodiments, the head mounted display can be a video see-through stereoscopic head mounted display. The 3D stereoscopic display or virtual display of the cage or interbody device can also be based on a CAD file, e.g. an STL file, provided by the manufacturer of the cage or interbody device. The portions of the physical cage or interbody device directly visible through the stereoscopic optical see through head mounted display can be superimposed and/or aligned with the 3D stereoscopic display of the virtual cage or interbody device by the head mounted display.

In those areas where the physical interbody device is hidden from the direct view through an optical see-through stereoscopic head mounted display, e.g. while passing through an inserter portal and/or tube, the optical see through stereoscopic head mounted display can display the virtual interbody device, e.g. in the tube, portal, and/or in the disk space etc. Optionally, the HMD can also display one or more virtual endplates or virtual vertebral structures (e.g. edges or margins or side wall of a vertebral body) (optionally in 2D or 3D, stereoscopic or non-stereoscopic), in addition to the virtual interbody device. In this manner, the surgeon can move the virtual interbody device (superimposed and aligned with the physical interbody device), and with it the physical interbody device, towards the correct position and/or orientation within the intervertebral space, e.g. a predetermined position and/or orientation.

In any of the embodiments a curvature, leading edge, tip, and/or shape of a spinal rod and/or interbody device can be used in a surgical plan, for example for a robot. For example, the shape of a spinal rod (e.g. determined after bending) determined using any of the embodiments in the specification can be used to determine coordinates for a robot and/or to program the movements of a robotic arm for advancing the rod attached to the robot (e.g. with the rod attached to a rod inserter or rod holding mechanism used as end effector) from a first screw to a second, third, fourth etc. screw. The 3D shape of the rod (optionally determined after bending) determined using any of the embodiments in the specification, along with the determined and/or planned or combination thereof screw positions can be entered into or programmed into the virtual surgical plan for the robot, thereby determining the desired movement of the robotic arm for placement of the spinal rod through the rod receiving portions of the screw heads. Similarly, the 3D shape of the interbody device determined using any of the embodiments in the specification, along with the determined and/or planned or combination thereof of anatomic structures, e.g. endplates, can be entered into or programmed into the virtual surgical plan for the robot, thereby determining the desired movement of the robotic arm for placement of the interbody device.

EXAMPLES

Example 1

In some embodiments, a system is for performing spinal fusion surgery is provided, the system comprising a tracking system for tracking one or more markers; a computer processor; a physical spinal rod having a length; an inserter configured for insertion of the physical spinal rod; and an engagement member; wherein the rod inserter is configured for connecting to a proximal end of the physical spinal rod, wherein the rod inserter comprises a first marker attached to the rod inserter, wherein the engagement member comprises a second marker attached to the engagement member, wherein the engagement member is configured to slideably engage with the physical spinal rod, wherein the tracking system is configured to track the engagement member during movement of the engagement member from the proximal end to a distal end or from a distal end to the proximal end along a length of the physical spinal rod, and wherein the computer processor is configured to determine an axis, a curvature, a shape or a combination thereof of the physical spinal rod based on the tracking information of the engagement member in relationship to the spinal rod connected to the tracked rod inserter.

The computer processor can be configured to receive information about a radius or a diameter of the physical spinal rod, wherein the computer processor can be configured to determine a shape of the physical spinal rod based on the tracking information generated by the movement of the second marker attached to the engagement member and the information about the radius or the diameter. The axis of the physical spinal rod can be a central axis and the shape can be determined, by the computer processor, based on the radius or the diameter and the central axis. The system can comprise a computer monitor. The system can comprise a robot for placing the spinal rod. The system can comprise an augmented reality display, wherein the system can be configured to display, by the augmented reality display, a virtual spinal rod based on the determined axis, curvature, or shape, or combination thereof of the physical spinal rod, wherein the virtual spinal rod is a virtual representation of the physical spinal rod. The virtual representation can comprise at least a portion of a surface of the physical spinal rod. The augmented reality display cam comprise an optical see through head mounted display or a video see through head mounted display. The system can be configured to display at least a portion of at least one virtual spinal screw, interbody device, physical plate or combination thereof implanted in a patient, wherein the at least one virtual device can be a virtual representation of a physical spinal screw, a physical interbody device, or a physical plate or combination thereof. The system is configured to display at least a portion of a virtual screw corresponding to at least a portion of physical spinal screw, at least a portion of a virtual interbody device corresponding to at least a portion of a physical interbody device, at least a portion of a virtual plate corresponding to at least a portion of a physical plate, at least a portion of a virtual spinal rod corresponding to at least a portion of the physical spinal rod, or a combination thereof. The at least a portion of the virtual screw corresponding to at least a portion of physical spinal screw can be superimposed, aligned or superimposed and aligned with the at least portion of the physical screw, or the at least a portion of the virtual interbody device corresponding to at least a portion of the physical interbody device can be superimposed, aligned or superimposed and aligned with the at least portion of the physical interbody device, or the at least a portion of the virtual plate corresponding to at least a portion of the physical plate can be superimposed, aligned or superimposed and aligned with the at least portion of the physical plate, or the at least a portion of the virtual spinal rod corresponding to at least a portion of the physical rod can be superimposed, aligned or superimposed and aligned with the at least portion of the physical spinal rod. The physical interbody device can be attached to an inserter, or the physical spinal rod can be attached to the inserter. The system can be configured to display a receiving portion of a virtual screw head, and the receiving portion of the virtual screw head can be configured to receive the virtual spinal rod. The display of the virtual screw head can comprise a virtual representation of a thread or of a fastening mechanism of the locking screw for fastening the physical spinal rod. The augmented reality device can be configured to provide a magnified view of the virtual spinal rod, a virtual spinal screw, a virtual screw head, a spinal rod receiving portion of the virtual screw head, or a combination thereof. The magnification can be a 1.5×, 2.0×, 3.0×, 4.0×, 5.0× magnification or any other number. The system can be configured to facilitate advancing the virtual spinal rod towards the receiving portion of one or more virtual screw head, wherein the system can be configured to keep the virtual spinal rod superimposed and aligned with the physical spinal rod during the advancing. The tracking system can be configured to determine one or more coordinates of the one or more markers. The one or more markers can comprise at least one optical marker, at least one geometric pattern, at least one retroreflective marker, at least one infrared marker, at least one radiofrequency emitting and/or receiving marker, at least one light emitting diode, at least one inertial measurement unit or a combination thereof.

The system can be configured to highlight a receiving portion of a virtual screw head using at least one of a color, brightness, shading, transparency, texture or combination thereof different from at least one color, brightness, shading, transparency, texture or combination thereof of a virtual representation of other portions of the screw when the virtual representation of the spinal rod is inserted into the receiving portion of the virtual screw head. The system can be configured to change a color, brightness, shading, transparency, texture or combination thereof of a receiving portion of a virtual screw head when the virtual representation of the spinal rod is inserted into the receiving portion of the virtual screw head. The system can comprise at least one subarray, array, or combination thereof, wherein the least one subarray, array, or combination thereof can comprise the one or more markers are part of at least one subarray, array, or combination thereof. The physical spinal rod can be attached to or engageably connected to the rod inserter, wherein the attachment or connection can be in a defined geometric relationship. The system can comprise a rod bender, wherein the rod bender can be configured for bending the physical spinal rod. The rod bender can comprise at least one marker.

The tracking system can be configured to track the rod bender. An augmented reality display device can be configured to display a virtual spinal rod superimposed onto the rod bender. The rod bender can be configured to facilitate bending of a physical spinal rod to match the shape of a displayed virtual rod. The rod bender can be configured to facilitate bending of a physical spinal rod to superimpose and align the physical spinal rod with the virtual rod. The shape of a virtual spinal rod can be based on one or more intra-operative measurements of the position and/or orientation of one or more physical screws, physical screw heads, or combination thereof inserted into a patient's spine, e.g. as determined based on one or more intra-operative measurements comprising coordinate data obtained from a tracked pointer, screwdriver or instrument inserted into or touching a screw head. The tracking system can be an optical tracking system. The tracking system can comprise one or more cameras. The tracking system can comprise one or more inertial measurement units. The engagement member can comprise an opening, e.g. circular, semi-circular, wedge-shaped or any other shape. The opening can have a radius that is larger than the radius of the spinal rod. The radius of a circular opening can be 0.01, 0.02, 0.03, 0.04, 0.05, 0.1, 0.15, 0.20, 0.25 mm larger than the radius of the spinal rod, or any other value. The opening can be ellipsoid. The engagement member can comprise a semi-circular opening. The engagement member can comprise an opening with at least one flat surface. The opening can be wedge shaped.

The engagement member can be shipped in a kit within the spinal rod. The kit can be sterile. The kit can comprise one or more spinal screws or interbody devices. The size and/or shape of the spinal screws and/or interbody devices included in the kit can be determined based on a pre-operative plan, e.g. using a pre-operative x-ray, CT scan or MRI scan.

The system is configured for minimally invasive surgery of the spine. The system can be configured to change a color, brightness, shading, transparency, texture or combination thereof of a receiving portion of a virtual screw head when the virtual representation of the spinal rod is inserted into the receiving portion of the virtual screw head.

Example 2

In some embodiments, a method for performing minimally invasive spinal fusion surgery is provided, the method of comprising generating tracking information about the surface of a physical spinal rod to determine a curvature, a three dimensional shape or combination thereof of the physical spinal rod; generating a virtual representation of the physical spinal rod based on the determined curvature, three dimensional shape or combination thereof; generating positional or tracking information about one or more physical pedicle screw, herein the one or more pedicle screws are implanted into a spine of a patient; generating a virtual representation of the one or more pedicle screw head; superimposing and aligning the virtual representation of the spinal rod onto the physical spinal rod; advancing a distal end of the virtual representation of the spinal rod toward a receiving portion of the virtual representation of a first pedicle screw head thereby engaging the physical spinal rod with the one or more implanted pedicle screws. A proximal end of the physical spinal rod can be connected to an inserter, and wherein the method comprises receiving tracking information of the inserter while advancing the distal end of the virtual representation of the spinal rod toward a receiving portion of the virtual representation of the pedicle screw head, e.g. the first, second, third, fourth, fifth, sixth etc. pedicle screw head. Any of the foregoing embodiments and examples can also be applied to cortical screws.

Example 3

In some embodiments, a system for performing spinal surgery is provided, the system comprising a tracking system for tracking one or more markers; a computer processor; an inserter configured for insertion of a physical spinal interbody device; a physical spinal interbody device; a registration device; wherein the inserter can be configured for connecting to the physical interbody device, wherein the inserter can comprise a first marker attached to the inserter, wherein the registration device can comprise a second marker attached to the registration device, wherein the registration device can comprise a surface for slideable, rotatable, and/or moveable engagement of the physical interbody device with the registration device, wherein the tracking system can be configured to track the inserter during movement of the physical interbody device on the surface of the registration device, wherein the computer processor can be configured to determine at least a portion of a shape of the physical interbody device based on the tracking information of the inserter with the connected physical interbody device in relationship to the tracking information of the second marker attached to the registration device. The at least a portion of the shape can be an edge of the physical interbody device, wherein the edge can be at least a portion of the leading edge of the physical interbody device configured for insertion into an intervertebral disc space. The computer processor can be configured to determine a dimension of the physical interbody device based on the distance between the leading edge of the physical interbody device and the attachment of the physical interbody device to the inserter. The dimension can be a width or a depth of the physical interbody device. The system can comprise an augmented reality display, wherein the system can be configured to display, by the augmented reality display, a virtual representation of the physical interbody device. The system can be configured to display at least a portion of a virtual interbody device, wherein the at least portion of the virtual interbody device can be a virtual representation of at least a portion of the physical interbody device. The physical interbody device can be attached to an inserter. The virtual interbody device can be superimposed, aligned or superimposed and aligned with the physical interbody device. The first marker attached to the inserter can optionally comprise information about the position and orientation of the attached physical interbody device in relationship to the inserter. The system can be configured to determine a first set of coordinates of the physical interbody device when an undersurface of the physical interbody device is placed on the registration device, wherein the system can be configured to determine a second set of coordinates of the physical interbody device when a top surface of the physical interbody device is placed on the registration device, wherein the computer processor can be configured to determine a thickness of the physical interbody device based on the difference in coordinates between the first set of coordinates and the second set of coordinates. While a number of embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

INCORPORATION BY REFERENCE

All publications, patents mentioned herein are hereby incorporated by reference in their entirety as if each individual publication or patent was specifically and individually indicated to be incorporated by reference.

The invention claimed is:

1. A system for performing spinal fusion surgery, the system comprising:
a tracking system for tracking one or more markers;
a computer processor;
a physical spinal rod having a length;
an inserter configured for insertion of the physical spinal rod; and
an engagement member;
wherein the rod inserter is configured for connecting to a proximal end of the physical spinal rod,
wherein the rod inserter comprises a first marker attached to the rod inserter,
wherein the engagement member comprises a second marker attached to the engagement member,
wherein the engagement member is configured to slideably engage with the physical spinal rod,
wherein the tracking system is configured to track the engagement member during movement of the engagement member from the proximal end to a distal end or from the distal end to the proximal end along a length of the physical spinal rod, and
wherein the computer processor is configured to determine an axis, a curvature, a shape or a combination thereof of the physical spinal rod based on tracking information of the engagement member in relationship to the spinal rod connected to the tracked rod inserter.

2. The system of claim 1,
wherein the computer processor is configured to receive information about a radius or a diameter of the physical spinal rod,
wherein the computer processor is configured to determine a shape of the physical spinal rod based on the tracking information generated by the movement of the second marker attached to the engagement member and the information about the radius or the diameter.

3. The system of claim 2, wherein the axis is a central axis of the physical spinal rod and the shape is determined, by the computer processor, based on the radius or the diameter and the central axis.

4. The system of claim 1, wherein the system comprises an augmented reality device, wherein the system is configured to display, by the augmented reality device, a virtual spinal rod based on the determined axis, curvature, or shape, or combination thereof of the physical spinal rod, wherein the virtual spinal rod is a virtual representation of the physical spinal rod.

5. The system of claim 4, wherein the virtual representation comprises at least a portion of a surface of the physical spinal rod.

6. The system of claim 4, wherein the augmented reality device comprises an optical see-through head mounted device or a video see-through head mounted device.

7. The system of claim 4, wherein the system is configured to display at least a portion of at least one virtual spinal screw, interbody device, physical plate or combination thereof implanted in a patient, wherein the at least one virtual device is virtual representations of a physical spinal screw, a physical interbody device, or a physical plate or combination thereof.

8. The system of claim 4, wherein system is configured to display at least a portion of a virtual screw corresponding to at least a portion of physical spinal screw, at least a portion of a virtual interbody device corresponding to at least a portion of a physical interbody device, at least a portion of a virtual plate corresponding to at least a portion of a physical plate, at least a portion of a virtual spinal rod corresponding to at least a portion of the physical spinal rod, or a combination thereof.

9. The system of claim 8,
wherein the at least a portion of the virtual screw corresponding to at least a portion of physical spinal screw is superimposed, aligned or superimposed and aligned with the at least portion of the physical screw, or
wherein the at least a portion of the virtual interbody device corresponding to at least a portion of the physical interbody device is superimposed, aligned or superimposed and aligned with the at least portion of the physical interbody device, or
wherein the at least a portion of the virtual plate corresponding to at least a portion of the physical plate is superimposed, aligned or superimposed and aligned with the at least portion of the physical plate, or
wherein the at least a portion of the virtual spinal rod corresponding to at least a portion of the physical rod is superimposed, aligned or superimposed and aligned with the at least portion of the physical spinal rod.

10. The system of claim 9, wherein the physical interbody device is attached to an inserter, or wherein the physical spinal rod is attached to the inserter.

11. The system of claim 4, wherein the system is configured to display a receiving portion of a virtual screw tulip, and wherein the receiving portion of the virtual screw tulip is configured to receive the virtual spinal rod.

12. The system of claim 11, wherein the display of the virtual screw tulip comprises a virtual representation of a thread or of a fastening mechanism for a locking screw for fastening the physical spinal rod.

13. The system of claim 4, wherein the augmented reality device is configured to provide a magnified view of the virtual spinal rod, a virtual spinal screw, a virtual screw tulip, a spinal rod receiving portion of the virtual screw tulip, or a combination thereof.

14. The system of claim 11, wherein the system is configured to facilitate advancing the virtual spinal rod towards the receiving portion of one or more virtual screw tulip, wherein the system is configured to keep the virtual spinal rod superimposed and aligned with the physical spinal rod during the advancing.

15. The system of claim 1, wherein the tracking system is configured to determine one or more coordinates of the one or more markers.

16. The system of claim 1, wherein the one or more markers comprise at least one optical marker, at least one geometric pattern, at least one retroreflective marker, at least one infrared marker, at least one radiofrequency emitting and/or receiving marker, at least one light emitting diode, at least one inertial measurement unit or a combination thereof.

17. A system for performing spinal surgery, the system comprising:
a tracking system for tracking one or more markers;
a computer processor;
an inserter configured for insertion of a physical spinal interbody device;
a physical spinal interbody device;
a registration device;
wherein the inserter is configured for connecting to the physical spinal interbody device,
wherein the inserter comprises a first marker attached to inserter,
wherein the registration device comprises a second marker attached to the registration device,
wherein the registration device comprises a surface for slideable, rotatable, and/or moveable engagement of the physical spinal interbody device with the registration device,
wherein the tracking system is configured to track the inserter during movement of the physical spinal interbody device on the surface of the registration device,
wherein the computer processor is configured to determine at least a portion of a shape of the physical spinal interbody device based on tracking information of the inserter with the connected physical interbody device in relationship to the tracking information of the second marker attached to the registration device.

18. The system of claim 17, wherein the at least a portion of the shape is an edge of the physical spinal interbody device, wherein the edge is at least a portion of a leading edge of the physical spinal interbody device configured for insertion into an intervertebral disc space.

19. The system of claim 18, wherein the computer processor is configured to determine a dimension of the physical spinal interbody device based on a distance between the leading edge of the physical spinal interbody device and the attachment of the physical spinal interbody device to the inserter.

20. The system of claim 19, wherein the dimension is a width or a depth of the physical spinal interbody device.

* * * * *